United States Patent
Ueno et al.

(10) Patent No.: US 11,037,438 B2
(45) Date of Patent: *Jun. 15, 2021

(54) ROADSIDE DEVICE, PEDESTRIAN DEVICE, COMMUNICATION SYSTEM, ABNORMALITY DETECTION METHOD, AND ABNORMALITY COMMUNICATION METHOD

(71) Applicant: PANASONIC INTELLECTUAL PROPERTY MANAGEMENT CO., LTD., Osaka (JP)

(72) Inventors: Tsuyoshi Ueno, Kanagawa (JP); Hiroaki Sudo, Kanagawa (JP); Yoshiyuki Okubo, Kanagawa (JP); Jun Ishida, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/643,780

(22) PCT Filed: Jun. 4, 2018

(86) PCT No.: PCT/JP2018/021358
§ 371 (c)(1),
(2) Date: Mar. 2, 2020

(87) PCT Pub. No.: WO2019/049444
PCT Pub. Date: Mar. 14, 2019

(65) Prior Publication Data
US 2020/0211368 A1 Jul. 2, 2020

(30) Foreign Application Priority Data
Sep. 6, 2017 (JP) .............................. JP2017-171080

(51) Int. Cl.
*G08G 1/005* (2006.01)
*H04W 4/90* (2018.01)
(Continued)

(52) U.S. Cl.
CPC ............. *G08G 1/005* (2013.01); *G06Q 40/08* (2013.01); *G08B 21/02* (2013.01); *G08G 1/0116* (2013.01);
(Continued)

(58) Field of Classification Search
CPC ...... G08G 1/005; G08G 1/0116; G08G 1/166; G08G 1/0129; H04W 4/40; H04W 4/90; G06Q 40/08
(Continued)

(56) References Cited

U.S. PATENT DOCUMENTS

| | | | |
|---|---|---|---|
| 10,089,862 B2 * | 10/2018 | Singh | ..................... G08G 1/005 |
| 2008/0068157 A1 | 3/2008 | Ikemori et al. | |

(Continued)

FOREIGN PATENT DOCUMENTS

| | | |
|---|---|---|
| JP | 2003-223449 | 8/2003 |
| JP | 2008-070981 | 3/2008 |

OTHER PUBLICATIONS

International Search Report issued in International Patent Application No. PCT/JP2018/021358, dated Aug. 28, 2018.
(Continued)

*Primary Examiner* — Kerri L McNally
(74) *Attorney, Agent, or Firm* — Greenblum & Bernstein, P.L.C.

(57) ABSTRACT

A pedestrian terminal transmits a message including pedestrian information to a roadside machine. In a case where the message transmitted from the pedestrian terminal is received, the roadside machine accumulates the pedestrian information included in the message as passage history
(Continued)

information, detects occurrence of an abnormal event for a person possessing the pedestrian terminal based on the passage history information, and transmits the message including information indicating that the abnormal event occurs for the person possessing the pedestrian terminal to a nearby pedestrian terminal.

21 Claims, 39 Drawing Sheets

(51) Int. Cl.
  *H04W 4/40* (2018.01)
  *G06Q 40/08* (2012.01)
  *G08B 21/02* (2006.01)
  *G08G 1/01* (2006.01)
  *G08G 1/16* (2006.01)
(52) U.S. Cl.
  CPC .......... *G08G 1/0129* (2013.01); *G08G 1/166* (2013.01); *H04W 4/40* (2018.02); *H04W 4/90* (2018.02)

(58) Field of Classification Search
  USPC .................. 340/944, 907, 910, 917, 925
  See application file for complete search history.

(56) References Cited

U.S. PATENT DOCUMENTS

| 2011/0090093 | A1* | 4/2011 | Grimm | G08G 1/162 |
| | | | | 340/901 |
| 2011/0254703 | A1* | 10/2011 | Li | G08G 1/166 |
| | | | | 340/944 |
| 2015/0100224 | A1* | 4/2015 | Tsuda | G08G 1/0112 |
| | | | | 701/117 |
| 2015/0304817 | A1* | 10/2015 | Yorifuji | G08G 1/005 |
| | | | | 455/456.1 |
| 2017/0092126 | A1* | 3/2017 | Oshida | G08G 1/005 |

OTHER PUBLICATIONS

U.S. Appl. No. 16/645,738 to Tsuyoshi Ueno et al., filed Mar. 9, 2020.

* cited by examiner

TAILING

STALKING          AMBUSH

ACCOMPANYING STATE

BULLYING

PHYSICAL ABUSE AND VERBAL ABUSE

PERSON HAVING ACCOMPANYING HISTORY

HIT-AND-RUN

COLLISION

FIG. 6A

PEDESTRIAN INFORMATION INCLUDED IN MESSAGE TRANSMITTED TO ROADSIDE MACHINE
FROM PEDESTRIAN TERMINAL

| TIME | TERMINAL ID | LATITUDE | LONGITUDE | SPEED | AZIMUTH | SUBSIDIARY INFORMATION |
|---|---|---|---|---|---|---|
| 10:00 | ID1 | X | Y | | Z | |

FIG. 6B

PEDESTRIAN INFORMATION ACCUMULATED IN ROADSIDE MACHINE AS PASSAGE HISTORY INFORMATION

| TIME | PEDESTRIAN ID | LATITUDE | LONGITUDE | SPEED | AZIMUTH | SUBSIDIARY INFORMATION |
|---|---|---|---|---|---|---|
| 10:00 | ID1 | X | Y | | Z | WARNING |
| 10:00 | ID2 | X | Y | | Z | |
| 10:05 | ID1 | X | Y+1 | | W | WARNING |
| 10:05 | ID2 | X | Y+1 | | W | |
| 10:10 | ID1 | X | Y+2 | | W | WARNING |
| 10:10 | ID2 | X | Y+2 | | W | |

FIG. 6C

ROADSIDE MACHINE INFORMATION INCLUDED IN MESSAGE TRANSMITTED TO PEDESTRIAN TERMINAL
FROM ROADSIDE MACHINE

| TIME | TERMINAL ID | OFFENDER ID | VICTIM ID | LATITUDE | LONGITUDE | SUBSIDIARY INFORMATION |
|---|---|---|---|---|---|---|
| 10:11 | ID101 | ID1 | ID2 | X | Y+2 | KIDNAPPING |

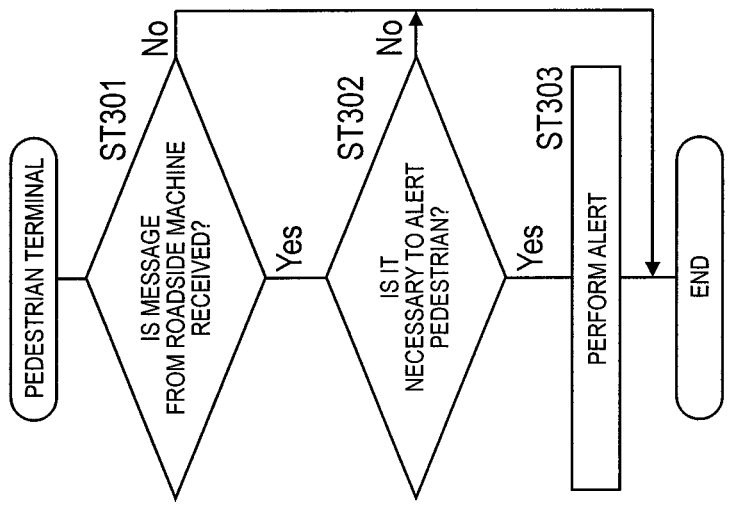

FIG. 8A

PEDESTRIAN INFORMATION INCLUDED IN MESSAGE TRANSMITTED TO ROADSIDE MACHINE FROM PEDESTRIAN TERMINAL

| TIME | TERMINAL ID | LATITUDE | LONGITUDE | SPEED | AZIMUTH | SUBSIDIARY INFORMATION |
|---|---|---|---|---|---|---|
| 10:00 | ID1 | X | Y | | Z | |

FIG. 8B

PEDESTRIAN INFORMATION (IN PAST) ACCUMULATED IN ROADSIDE MACHINE AS PASSAGE HISTORY INFORMATION

| TIME | PEDESTRIAN ID | LATITUDE | LONGITUDE | SPEED | AZIMUTH | SUBSIDIARY INFORMATION |
|---|---|---|---|---|---|---|
| 10:00 | ID1 | X | Y | | Z | ACQUAINTANCE |
| 10:00 | ID2 | X | Y | | Z | ACQUAINTANCE |
| 10:05 | ID1 | X | Y+1 | | W | ACQUAINTANCE |
| 10:05 | ID2 | X | Y+1 | | W | ACQUAINTANCE |

FIG. 8C

PEDESTRIAN INFORMATION (MOST RECENT) ACCUMULATED IN ROADSIDE MACHINE AS PASSAGE HISTORY INFORMATION

| TIME | PEDESTRIAN ID | LATITUDE | LONGITUDE | SPEED | AZIMUTH | SUBSIDIARY INFORMATION |
|---|---|---|---|---|---|---|
| 10:00 | ID1 | X | Y | | Z | ACQUAINTANCE |
| 10:00 | ID2 | X | Y | | Z | ACQUAINTANCE |
| 10:05 | ID1 | X | Y+1 | | W | ACQUAINTANCE |
| 10:05 | ID2 | X | Y+1 | | W | ACQUAINTANCE |
| 10:10 | ID1 | X | Y+2 | | W | ACQUAINTANCE |
| 10:10 | ID2 | X | Y+2 | | W | ACQUAINTANCE |

FIG. 8D

ROADSIDE MACHINE INFORMATION INCLUDED IN MESSAGE TRANSMITTED TO PEDESTRIAN TERMINAL FROM ROADSIDE MACHINE

| TIME | TERMINAL ID | OFFENDER ID | VICTIM ID | LATITUDE | LONGITUDE | SUBSIDIARY INFORMATION |
|---|---|---|---|---|---|---|
| 10:11 | ID101 | ID1 | ID2 | X | Y-2 | ABANDONMENT |

FIG. 10A

PEDESTRIAN INFORMATION INCLUDED IN MESSAGE TRANSMITTED TO ROADSIDE MACHINE
FROM PEDESTRIAN TERMINAL

| TIME | TERMINAL ID | LATITUDE | LONGITUDE | SPEED | AZIMUTH | SUBSIDIARY INFORMATION |
|---|---|---|---|---|---|---|
| 10:00 | ID1 | X | Y |  | Z |  |

FIG. 10B

PEDESTRIAN INFORMATION ACCUMULATED IN ROADSIDE MACHINE AS PASSAGE HISTORY INFORMATION

| TIME | PEDESTRIAN ID | LATITUDE | LONGITUDE | SPEED | AZIMUTH | SUBSIDIARY INFORMATION |
|---|---|---|---|---|---|---|
| 1/1 10:00 | ID1 | X | Y |  | Z |  |
| 1/1 10:05 | ID1 | X | Y+1 |  | W |  |
| 1/2 10:05 | ID1 | X | Y+1 |  |  |  |
|  |  |  |  |  |  |  |
|  |  |  |  |  |  |  |
| 1/8 10:05 | ID1 | X | Y+1 |  |  | CONFINEMENT |

FIG. 10C

ROADSIDE MACHINE INFORMATION INCLUDED IN MESSAGE TRANSMITTED TO PEDESTRIAN TERMINAL
FROM ROADSIDE MACHINE

| TIME | TERMINAL ID | VICTIM ID |  | LATITUDE | LONGITUDE | SUBSIDIARY INFORMATION |
|---|---|---|---|---|---|---|
| 10:11 | ID101 | ID2 |  | X | Y+1 | CONFINEMENT |

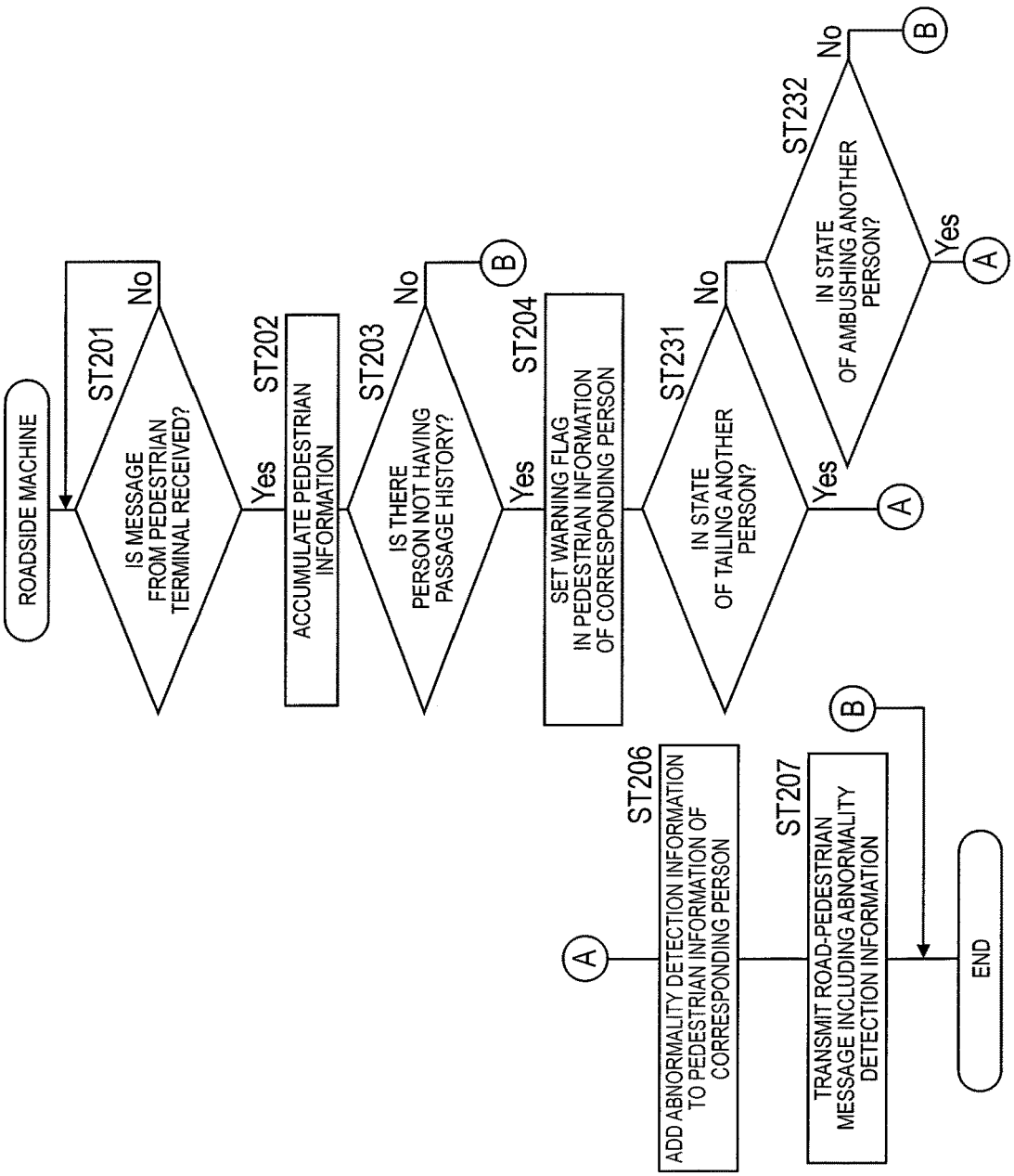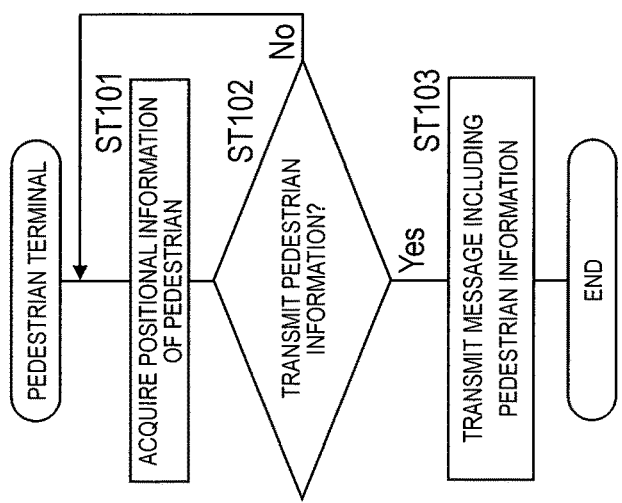

FIG. 12A

PEDESTRIAN INFORMATION INCLUDED IN MESSAGE TRANSMITTED TO ROADSIDE MACHINE FROM PEDESTRIAN TERMINAL

| TIME | TERMINAL ID | LATITUDE | LONGITUDE | SPEED | AZIMUTH | SUBSIDIARY INFORMATION |
|---|---|---|---|---|---|---|
| 10:00 | ID1 | X | Y | | Z | |

FIG. 12B

PEDESTRIAN INFORMATION (IN CASE OF TAILING) ACCUMULATED IN ROADSIDE MACHINE AS PASSAGE HISTORY INFORMATION

| TIME | PEDESTRIAN ID | LATITUDE | LONGITUDE | SPEED | AZIMUTH | SUBSIDIARY INFORMATION |
|---|---|---|---|---|---|---|
| 10:00 | ID1 | X | Y+1 | | Z | |
| 10:00 | ID2 | X | Y | | Z | |
| 10:05 | ID1 | X | Y+2 | | Z | |
| 10:05 | ID2 | X | Y+1 | | Z | |
| 10:10 | ID1 | X | Y+3 | | Z | STALKING |
| 10:10 | ID2 | X | Y+2 | | Z | |

FIG. 12C

PEDESTRIAN INFORMATION (IN CASE OF AMBUSH) ACCUMULATED IN ROADSIDE MACHINE AS PASSAGE HISTORY INFORMATION

| TIME | PEDESTRIAN ID | LATITUDE | LONGITUDE | SPEED | AZIMUTH | SUBSIDIARY INFORMATION |
|---|---|---|---|---|---|---|
| 10:00 | ID1 | X | Y+1 | | Z | |
| 10:00 | ID2 | X | Y | | Z | |
| 10:05 | ID1 | X | Y+1 | | Z | |
| 10:05 | ID2 | X | Y+1 | | Z | |
| 10:10 | ID1 | X | Y+1 | | Z | STALKING |
| 10:10 | ID2 | X | Y+2 | | Z | |

FIG. 12D

INFORMATION INCLUDED IN MESSAGE TRANSMITTED TO PEDESTRIAN TERMINAL FROM ROADSIDE MACHINE

| TIME | TERMINAL ID | OFFENDER ID | VICTIM ID | LATITUDE | LONGITUDE | SUBSIDIARY INFORMATION |
|---|---|---|---|---|---|---|
| 10:11 | ID101 | ID1 | ID2 | X | Y+2 | STALKING |

FIG. 14A
PEDESTRIAN INFORMATION INCLUDED IN MESSAGE TRANSMITTED TO ROADSIDE MACHINE FROM PEDESTRIAN TERMINAL

| TIME | TERMINAL ID | LATITUDE | LONGITUDE | SPEED | AZIMUTH | SUBSIDIARY INFORMATION |
|---|---|---|---|---|---|---|
| 10:00 | ID1 | X | Y |  | Z |  |

FIG. 14B

| TIME | TERMINAL ID | LATITUDE | LONGITUDE | SPEED | AZIMUTH | SUBSIDIARY INFORMATION |
|---|---|---|---|---|---|---|
| 10:00 | ID2 | X | Y |  | Z |  |

FIG. 14C

| TIME | TERMINAL ID | LATITUDE | LONGITUDE | SPEED | AZIMUTH | SUBSIDIARY INFORMATION |
|---|---|---|---|---|---|---|
| 10:10 | ID2 | X | Y+2 |  | W | IMPACT AND VERBAL ABUSE |

FIG. 14D
PEDESTRIAN INFORMATION (IN PAST) ACCUMULATED IN ROADSIDE MACHINE AS PASSAGE HISTORY INFORMATION

| TIME | PEDESTRIAN ID | LATITUDE | LONGITUDE | SPEED | AZIMUTH | SUBSIDIARY INFORMATION |
|---|---|---|---|---|---|---|
| 10:00 | ID1 | X | Y |  | Z | ACQUAINTANCE |
| 10:00 | ID2 | X | Y |  | Z | ACQUAINTANCE |
| 10:05 | ID1 | X | Y+1 |  | W | ACQUAINTANCE |
| 10:05 | ID2 | X | Y+1 |  | W | ACQUAINTANCE |

FIG. 14E
PEDESTRIAN INFORMATION (MOST RECENT) ACCUMULATED IN ROADSIDE MACHINE AS PASSAGE HISTORY INFORMATION

| TIME | PEDESTRIAN ID | LATITUDE | LONGITUDE | SPEED | AZIMUTH | SUBSIDIARY INFORMATION |
|---|---|---|---|---|---|---|
| 10:00 | ID1 | X | Y |  | Z | ACQUAINTANCE |
| 10:00 | ID2 | X | Y |  | Z | ACQUAINTANCE |
| 10:05 | ID1 | X | Y+1 |  | W | ACQUAINTANCE |
| 10:05 | ID2 | X | Y+1 |  | W | ACQUAINTANCE |
| 10:10 | ID1 | X | Y+2 |  | W | ACQUAINTANCE |
| 10:10 | ID2 | X | Y+2 |  | W | IMPACT AND VERBAL ABUSE |

FIG. 14F
ROADSIDE MACHINE INFORMATION INCLUDED IN MESSAGE TRANSMITTED TO PEDESTRIAN TERMINAL FROM ROADSIDE MACHINE

| TIME | TERMINAL ID | OFFENDER ID | VICTIM ID | LATITUDE | LONGITUDE | SUBSIDIARY INFORMATION |
|---|---|---|---|---|---|---|
| 10:11 | ID101 | ID1 | ID2 | X | Y+2 | BULLYING |

FIG. 21

PASSAGE HISTORY INFORMATION

| TIME | TERMINAL ID | LATITUDE | LONGITUDE | SPEED | AZIMUTH | OFFENDER ID | VICTIM ID | LATITUDE | LONGITUDE | SUBSIDIARY INFORMATION | |
|------|-------------|----------|-----------|-------|---------|-------------|-----------|----------|-----------|------------------------|---|
| 10:00 | ID1 | X | Y | | Z | | | | | | ← PEDESTRIAN INFORMATION |
| 10:00 | ID2 | X | Y | | Z | | | | | WARNING ID1 | ← PEDESTRIAN INFORMATION |
| 10:05 | ID1 | X | Y+1 | | W | | | | | | ← PEDESTRIAN INFORMATION |
| 10:05 | ID2 | X | Y+1 | | W | | | | | WARNING ID1 | ← PEDESTRIAN INFORMATION |
| 10:10 | ID1 | X | Y+2 | | W | | | | | | ← PEDESTRIAN INFORMATION |
| 10:10 | ID2 | X | Y+2 | | W | | | | | WARNING ID1 | ← PEDESTRIAN INFORMATION |
| 10:11 | ID101 | | | | | ID1 | ID2 | X | Y+2 | KIDNAPPING | ← ROADSIDE MACHINE INFORMATION |

FIG. 25A

PASSAGE HISTORY INFORMATION (ABNORMALITY DESCRIPTION INFORMATION)

| TIME | TERMINAL ID | LATITUDE | LONGITUDE | SPEED | AZIMUTH | OFFENDER ID | VICTIM ID | LATITUDE | LONGITUDE | SUBSIDIARY INFORMATION |
|---|---|---|---|---|---|---|---|---|---|---|
| 10:00 | ID1 | X | Y | | Z | | | | | |
| 10:00 | ID2 | X | Y | | Z | | | | | WARNING ID1 |
| 10:05 | ID1 | X | Y+1 | | W | | | | | |
| 10:05 | ID2 | X | Y+1 | | W | | | | | WARNING ID1 |
| 10:10 | ID1 | X | Y+2 | | W | | | | | |
| 10:10 | ID2 | X | Y+2 | | W | | | | | WARNING ID1 |
| 10:11 | ID101 | | | | | ID1 | ID2 | X | Y+2 | KIDNAPPING |

FIG. 25B

ROADSIDE MACHINE INFORMATION INCLUDED IN MESSAGE TRANSMITTED TO PEDESTRIAN TERMINAL FROM ROADSIDE MACHINE

| TIME | TERMINAL ID | OFFENDER ID | VICTIM ID | LATITUDE | LONGITUDE | SUBSIDIARY INFORMATION |
|---|---|---|---|---|---|---|
| 10:11 | ID101 | ID1 | ID2 | X | Y | ABNORMALITY PREDICTION |

FIG. 28A
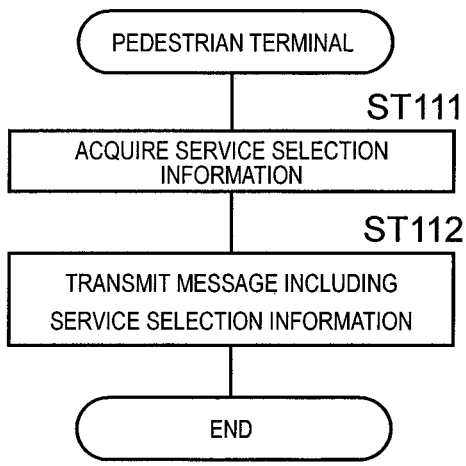
FIG. 28B
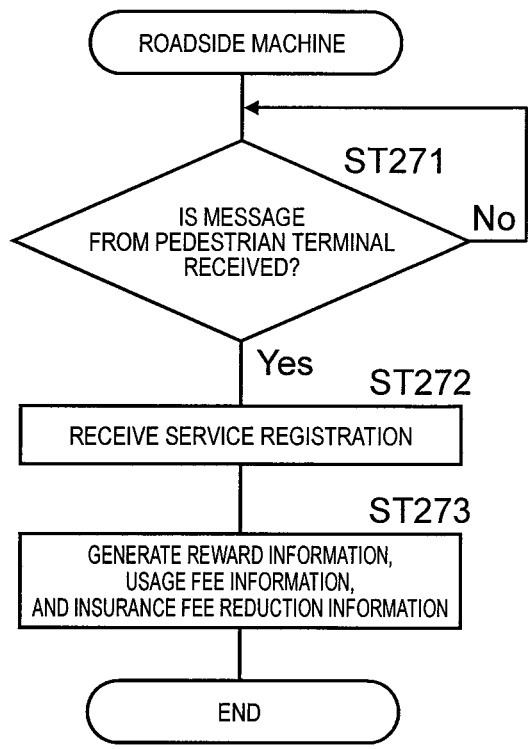
FIG. 29
INFORMATION INCLUDED IN MESSAGE TRANSMITTED TO ROADSIDE MACHINE FROM PEDESTRIAN TERMINAL
| TIME | TERMINAL ID | INFORMATION PROVISION | USE OF SERVICE | SUPPORTER |
|---|---|---|---|---|
| 12:00 | ID1 | REGISTERED | REGISTERED | REGISTERED |

FIG. 33A
PEDESTRIAN INFORMATION INCLUDED IN MESSAGE TRANSMITTED
TO ANOTHER PEDESTRIAN TERMINAL FROM PEDESTRIAN TERMINAL

| TIME | TERMINAL ID | LATITUDE | LONGITUDE | SPEED | AZIMUTH | SUBSIDIARY INFORMATION |
|---|---|---|---|---|---|---|
| 10:00 | ID1 | X | Y | | Z | |

FIG. 33B
PEDESTRIAN INFORMATION INCLUDED IN MESSAGE TRANSMITTED
TO ROADSIDE MACHINE FROM PEDESTRIAN TERMINAL

| TIME | TERMINAL ID | LATITUDE | LONGITUDE | SPEED | AZIMUTH | SUBSIDIARY INFORMATION |
|---|---|---|---|---|---|---|
| 10:00 | ID2 | X | Y | | Z | WARNING ID1 |

FIG. 33C
PEDESTRIAN INFORMATION (MOST RECENT) ACCUMULATED
IN ROADSIDE MACHINE AS PASSAGE HISTORY INFORMATION

| TIME | PEDESTRIAN ID | LATITUDE | LONGITUDE | SPEED | AZIMUTH | SUBSIDIARY INFORMATION |
|---|---|---|---|---|---|---|
| 10:00 | ID2 | X | Y | | Z | |
| 10:05 | ID2 | X+1 | Y | | Z | |
| 10:10 | ID2 | X+2 | Y | | Z | |

FIG. 33D
PEDESTRIAN INFORMATION (IN PAST) ACCUMULATED
IN ROADSIDE MACHINE AS PASSAGE HISTORY INFORMATION

| TIME | PEDESTRIAN ID | LATITUDE | LONGITUDE | SPEED | AZIMUTH | SUBSIDIARY INFORMATION |
|---|---|---|---|---|---|---|
| 10:00 | ID1 | X | Y | | Z | |
| 10:00 | ID2 | X | Y | | Z | WARNING ID1 |
| 10:05 | ID1 | X | Y+1 | | W | |
| 10:05 | ID2 | X | Y+1 | | W | WARNING ID1 |
| 10:10 | ID1 | X | Y+2 | | W | |
| 10:10 | ID2 | X | Y+2 | | W | WARNING ID1 |

FIG. 33E
ROADSIDE MACHINE INFORMATION INCLUDED
IN MESSAGE TRANSMITTED TO PEDESTRIAN TERMINAL FROM ROADSIDE MACHINE

| TIME | TERMINAL ID | OFFENDER ID | VICTIM ID | LATITUDE | LONGITUDE | SUBSIDIARY INFORMATION |
|---|---|---|---|---|---|---|
| 10:11 | ID101 | ID1 | ID2 | X | Y+2 | KIDNAPPING |

FIG. 36A
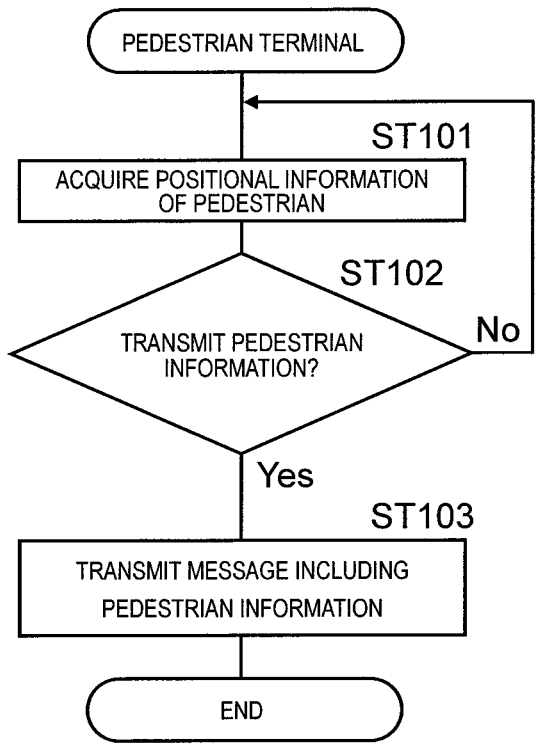
FIG. 36B
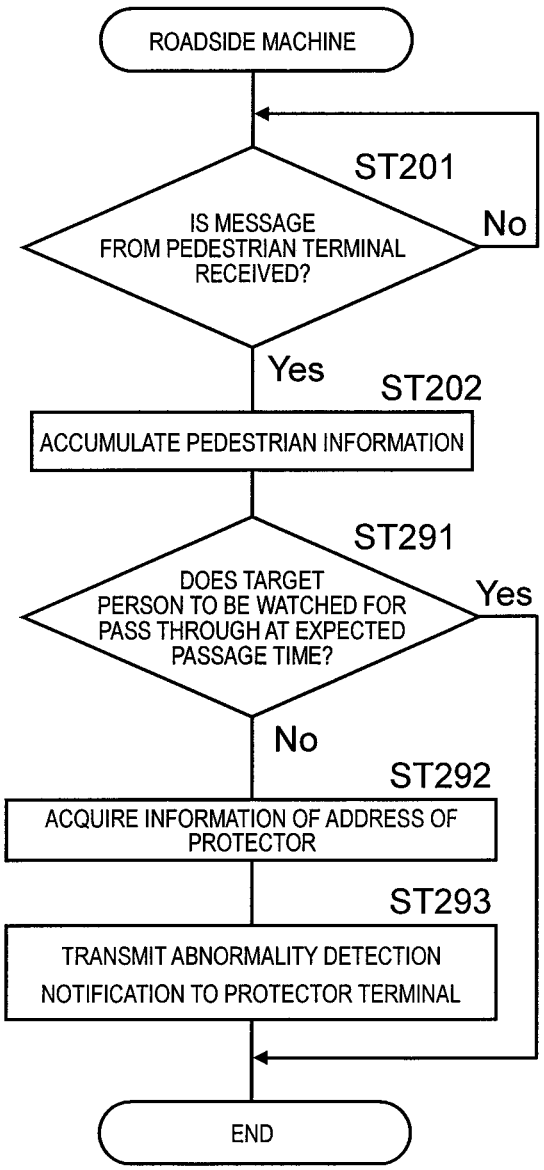
FIG. 37
INFORMATION INCLUDED IN MESSAGE TRANSMITTED TO ROADSIDE MACHIN FROM PEDESTRIAN TERMINAL
| TIME | TERMINAL ID | LATITUDE | LONGITUDE | SPEED | AZIMUTH | SUBSIDIARY INFORMATION |
|---|---|---|---|---|---|---|
| 10:00 | ID1 | X | Y | | Z | PROTECTOR INFORMATION |

ROADSIDE DEVICE, PEDESTRIAN DEVICE, COMMUNICATION SYSTEM, ABNORMALITY DETECTION METHOD, AND ABNORMALITY COMMUNICATION METHOD

TECHNICAL FIELD

The present invention relates to a roadside device that is installed on a road and performs road-pedestrian communication with a pedestrian device which performs a danger determination by exchanging a message including positional information with an on-vehicle device, the pedestrian device, a communication system in which the pedestrian device and the roadside device perform the road-pedestrian communication, an abnormality detection method of detecting occurrence of an abnormal event for a person possessing the pedestrian device, and an abnormality notification method of giving a notification of the occurrence of the abnormal event for the person possessing the pedestrian device from the roadside device.

BACKGROUND ART

In recent years, study for application and wide use of a safe operation assistance wireless system using an intelligent transport system (ITS) has been progressed. In the safe operation assistance wireless system, an operator of a vehicle is alerted to avoid an accident by exchanging a message including positional information and the like of the vehicle by vehicle-vehicle communication of performing communication between on-vehicle terminals mounted on vehicles or road-vehicle communication of performing communication between a roadside machine installed on a road and the on-vehicle terminal.

In addition, in recent years, pedestrian-vehicle communication of performing communication between a pedestrian terminal possessed by a pedestrian and the on-vehicle terminal has been suggested in order to prevent an accident of the pedestrian. In the pedestrian-vehicle communication, the pedestrian terminal and the on-vehicle terminal notify the presence of the pedestrian to the on-vehicle terminal and notify the presence of the vehicle to the pedestrian terminal by directly exchanging the message including the positional information and the like, thereby being able to alert both of the pedestrian and the operator of the vehicle at an appropriate timing. Thus, a significant effect is expected in terms of preventing the accident of the pedestrian.

Furthermore, in a case where an abnormal event such as a crime occurs, it is desirable to detect the abnormal event early and notify the occurrence of the abnormal event to a person capable of handling such as rescue.

As a technology related to such abnormality notification, a technology for acquiring various information related to a path of a moving object by accumulating positional information of the moving object as movement history information and analyzing the movement history information, providing the information to a user, and notifying a preregistered terminal in a case where various abnormal events are detected is known in the related art (refer to PTL 1).

CITATION LIST

Patent Literature

PTL 1: Japanese Patent Unexamined Publication No. 2003-223449

SUMMARY OF THE INVENTION

In the technology of the related art, while various information can be provided to the user based on the movement history information or the occurrence of various abnormal events can be notified, a dedicated terminal needs to be possessed by a person in order to detect the occurrence of the abnormal event for the person. Thus, a problem of an increase in cost is present. Meanwhile, in the safe operation assistance wireless system, as described above, the pedestrian possesses the pedestrian terminal. Thus, it is considered that the occurrence of the abnormal event for the person is detected using the pedestrian terminal. Accordingly, a significant reduction of cost is expected.

Therefore, a main object of the present invention is to provide a roadside device, a pedestrian device, a communication system, an abnormality detection method, and an abnormality notification method capable of detecting occurrence of an abnormal event for a person possessing the pedestrian device.

A roadside device of the present invention is a roadside device that is installed on a road and performs road-pedestrian communication with a pedestrian device which performs a danger determination by exchanging a message including positional information with an on-vehicle device. The roadside device includes a communicator that performs the road-pedestrian communication with the pedestrian device, a storage in which in a case where the message transmitted from the pedestrian device is received by the communicator, pedestrian information included in the received message is accumulated as passage history information, and a controller that detects occurrence of an abnormal event for a person possessing the pedestrian device based on the passage history information.

In addition, a pedestrian device of the present invention is a pedestrian device that performs a danger determination by exchanging a message including positional information with an on-vehicle device. The pedestrian device includes a communicator that performs road-pedestrian communication with a roadside device installed on a road and receives the message transmitted from another pedestrian device, a storage in which pedestrian information included in the message received from the other pedestrian device by the communicator is accumulated as passage history information, and a controller that detects a person as a target of abnormality detection performed by the roadside device based on the passage history information and transmits the message including a detection result to the roadside device from the communicator.

In addition, a communication system of the present invention is a communication system including a pedestrian device that performs a danger determination by exchanging a message including positional information with an on-vehicle device, and a roadside device installed on a road, in which the pedestrian device and the roadside device perform road-pedestrian communication, and the roadside device includes a communicator that performs the road-pedestrian communication with the pedestrian device, a storage in which in a case where the message transmitted from the pedestrian device is received by the communicator, pedestrian information included in the received message is accumulated as passage history information, and a controller that detects occurrence of an abnormal event for a person possessing the pedestrian device based on the passage history information.

In addition, an abnormality detection method of the present invention is an abnormality detection method for a roadside device that is installed on a road and performs road-pedestrian communication with a pedestrian device which performs a danger determination by exchanging a message including positional information with an on-vehicle device. The abnormality detection method includes receiving the message transmitted from the pedestrian device by the road-pedestrian communication, accumulating pedestrian information included in the received message as passage history information, and detecting occurrence of an abnormal event for a person possessing the pedestrian device based on the passage history information.

In addition, an abnormality notification method of the present invention is an abnormality notification method of giving a notification of occurrence of an abnormal event for a person possessing a pedestrian device to a nearby pedestrian device from a roadside device. The abnormality notification method includes by the pedestrian device, transmitting a message including pedestrian information to the roadside device, and by the roadside device, in a case where the message transmitted from the pedestrian device is received, accumulating the pedestrian information included in the message as passage history information, detecting the occurrence of the abnormal event for the person possessing the pedestrian device based on the passage history information, and transmitting the message including information indicating that the abnormal event occurs for the person possessing the pedestrian device to the nearby pedestrian device.

According to the present invention, the occurrence of the abnormal event for the person possessing the pedestrian device can be detected.

BRIEF DESCRIPTION OF DRAWINGS

FIG. 6A is a descriptive diagram illustrating one example of pedestrian information included in a message, passage history information accumulated in roadside machine 5, and roadside machine information included in the message according to the first exemplary embodiment.

FIG. 6B is a descriptive diagram illustrating one example of the pedestrian information included in the message, the passage history information accumulated in roadside machine 5, and the roadside machine information included in the message according to the first exemplary embodiment.

FIG. 6C is a descriptive diagram illustrating one example of the pedestrian information included in the message, the passage history information accumulated in roadside machine 5, and the roadside machine information included in the message according to the first exemplary embodiment.

FIG. 7C is a flowchart illustrating an operation procedure related to abandonment in pedestrian terminal 1 and roadside machine 5 according to the first exemplary embodiment.

FIG. 8A is a descriptive diagram illustrating one example of the pedestrian information included in the message and the pedestrian information accumulated as the passage history information.

FIG. 8B is a descriptive diagram illustrating one example of the pedestrian information included in the message and the pedestrian information accumulated as the passage history information.

FIG. 8C is a descriptive diagram illustrating one example of the pedestrian information included in the message and the pedestrian information accumulated as the passage history information.

FIG. 8D is a descriptive diagram illustrating one example of the pedestrian information included in the message and the pedestrian information accumulated as the passage history information.

FIG. 10A is a descriptive diagram illustrating one example of the pedestrian information included in the message and the pedestrian information accumulated as the passage history information.

FIG. 10B is a descriptive diagram illustrating one example of the pedestrian information included in the message and the pedestrian information accumulated as the passage history information.

FIG. 10C is a descriptive diagram illustrating one example of the pedestrian information included in the message and the pedestrian information accumulated as the passage history information.

FIG. 11A is a flowchart illustrating an operation procedure related to stalking in pedestrian terminal 1 and roadside machine 5 according to the first exemplary embodiment.

FIG. 11B is a flowchart illustrating an operation procedure related to stalking in pedestrian terminal 1 and roadside machine 5 according to the first exemplary embodiment.

FIG. 12A is a descriptive diagram illustrating one example of the pedestrian information included in the message and the pedestrian information accumulated as the passage history information.

FIG. 12B is a descriptive diagram illustrating one example of the pedestrian information included in the message and the pedestrian information accumulated as the passage history information.

FIG. 12C is a descriptive diagram illustrating one example of the pedestrian information included in the message and the pedestrian information accumulated as the passage history information.

FIG. 12D is a descriptive diagram illustrating one example of the pedestrian information included in the message and the pedestrian information accumulated as the passage history information.

FIG. 14A is a descriptive diagram illustrating one example of the pedestrian information included in the message and the pedestrian information accumulated as the passage history information.

FIG. 14B is a descriptive diagram illustrating one example of the pedestrian information included in the message and the pedestrian information accumulated as the passage history information.

FIG. 14C is a descriptive diagram illustrating one example of the pedestrian information included in the message and the pedestrian information accumulated as the passage history information.

FIG. 14D is a descriptive diagram illustrating one example of the pedestrian information included in the message and the pedestrian information accumulated as the passage history information.

FIG. 14E is a descriptive diagram illustrating one example of the pedestrian information included in the message and the pedestrian information accumulated as the passage history information.

FIG. 14F is a descriptive diagram illustrating one example of the pedestrian information included in the message and the pedestrian information accumulated as the passage history information.

FIG. 21 is a descriptive diagram illustrating one example of passage history information accumulated in management server 7 according to the second exemplary embodiment.

FIG. 25A is a descriptive diagram illustrating one example of passage history information accumulated in management server 7 and roadside machine information included in a message according to the third exemplary embodiment.

FIG. 25B is a descriptive diagram illustrating one example of the passage history information accumulated in management server 7 and the roadside machine information included in the message according to the third exemplary embodiment.

FIG. 28A is a flowchart illustrating an operation procedure of pedestrian terminal 1 and roadside machine 5 according to the fourth exemplary embodiment.

FIG. 28B is a flowchart illustrating an operation procedure of pedestrian terminal 1 and roadside machine 5 according to the fourth exemplary embodiment.

FIG. 29 is a descriptive diagram illustrating one example of information included in a message according to the fourth exemplary embodiment.

FIG. 33A is a descriptive diagram illustrating one example of pedestrian information included in a message, passage history information accumulated in roadside machine 5, and roadside machine information included in the message.

FIG. 33B is a descriptive diagram illustrating one example of the pedestrian information included in the message, the passage history information accumulated in roadside machine 5, and the roadside machine information included in the message.

FIG. 33C is a descriptive diagram illustrating one example of the pedestrian information included in the message, the passage history information accumulated in roadside machine 5, and the roadside machine information included in the message.

FIG. 33D is a descriptive diagram illustrating one example of the pedestrian information included in the message, the passage history information accumulated in roadside machine 5, and the roadside machine information included in the message.

FIG. 33E is a descriptive diagram illustrating one example of the pedestrian information included in the message, the passage history information accumulated in roadside machine 5, and the roadside machine information included in the message.

FIG. 36A is a flowchart illustrating an operation procedure of pedestrian terminal 1 and roadside machine 5 according to the sixth exemplary embodiment.

FIG. 36B is a flowchart illustrating an operation procedure of pedestrian terminal 1 and roadside machine 5 according to the sixth exemplary embodiment.

FIG. 37 is a descriptive diagram illustrating one example of pedestrian information included in a message according to the sixth exemplary embodiment.

DESCRIPTION OF EMBODIMENTS

Figure 1:
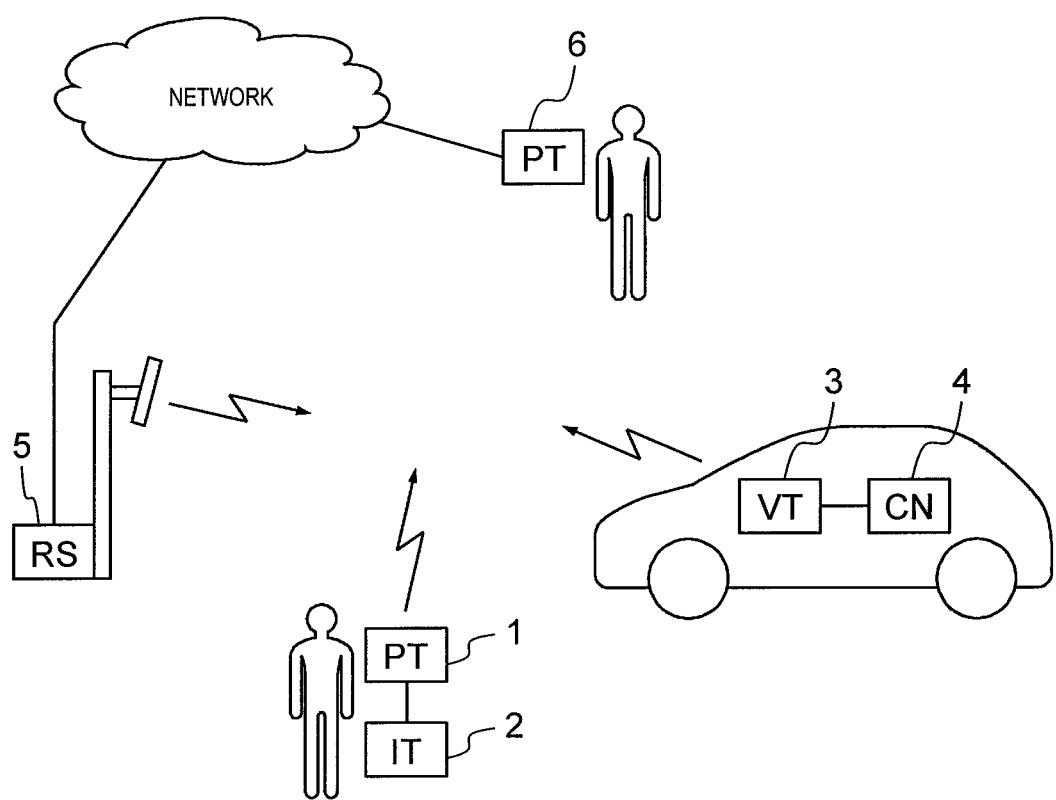
FIG. 1 is an overall configuration diagram of a communication system according to a first exemplary embodiment.

A first invention conceived in order to resolve the object is a roadside device that is installed on a road and performs road-pedestrian communication with a pedestrian device which performs a danger determination by exchanging a message including positional information with an on-vehicle device. The roadside device includes a communicator that performs the road-pedestrian communication with the pedestrian device, a storage in which in a case where the message transmitted from the pedestrian device is received by the communicator, pedestrian information included in the received message is accumulated as passage history information, and a controller that detects occurrence of an abnormal event for a person possessing the pedestrian device based on the passage history information.

Accordingly, the occurrence of the abnormal event for the person possessing the pedestrian device can be detected.

A second invention is such that the controller transmits the message including information indicating that the abnormal event occurs for the person possessing the pedestrian device to a nearby pedestrian device from the communicator.

Accordingly, a notification of the occurrence of the abnormal event for the person can be given to nearby pedestrians.

A third invention is such that the roadside device further includes a network communicator that communicates with a protector device possessed by a protector, in which the controller transmits a notification that the abnormal event occurs for the person possessing the pedestrian device to the protector device from the network communicator.

Accordingly, the notification of the occurrence of the abnormal event for the person can be given to the protector at a remote location.

A fourth invention is such that the communicator receives the message including detection information related to at least one of an acceleration, an azimuth, an impact, and a voice detected by a detector disposed in the pedestrian device, and the controller detects the occurrence of the abnormal event for the person possessing the pedestrian device based on the detection information.

Accordingly, the occurrence of the abnormal event for the person possessing the pedestrian device can be accurately detected.

A fifth invention is such that in a case where a person who does not have a passage history within a predetermined period in the past is in a state of accompanying another person, the controller determines that kidnapping occurs as the abnormal event based on the passage history information.

Accordingly, the occurrence of the kidnapping as the abnormal event can be detected.

A sixth invention is such that in a case where a change is made from an accompanying state of a plurality of persons having an accompanying history within a predetermined period in the past to a non-accompanying state, the controller determines that abandonment occurs as the abnormal event based on the passage history information.

Accordingly, the occurrence of the abandonment as the abnormal event can be detected.

A seventh invention is such that in a case where a person who does not have a change in positional information within a predetermined period in the past is present, the controller determines that confinement occurs as the abnormal event based on the passage history information.

Accordingly, the occurrence of the confinement as the abnormal event can be detected.

An eighth invention is such that in a case where a person who does not have a passage history within a predetermined period in the past is in a state of moving like following another person, or in a case where the person is in a state of standing still and not moving on a movement path of another person, the controller determines that stalking occurs as the abnormal event based on the passage history information.

Accordingly, the occurrence of the stalking as the abnormal event can be detected.

A ninth invention is such that in a case where physical abuse and verbal abuse are performed on the person possessing the pedestrian device, the communicator receives the message including physical abuse and verbal abuse detection information from the pedestrian device, and in a case where the message including the physical abuse and verbal abuse detection information is received in an accompanying state of a plurality of persons having an accompanying history within a predetermined period in the past, the controller determines that bullying occurs as the abnormal event based on the passage history information.

Accordingly, the occurrence of the bullying as the abnormal event can be detected.

A tenth invention is such that in a case where an impact is detected after it is determined that there is a high danger of collision between a vehicle and a pedestrian by a danger determination in pedestrian terminal 1, the communicator receives the message including collision detection information from the pedestrian device and receives the message transmitted from the on-vehicle device, and in a case where the vehicle running away from a collision location is detected based on positional information of the vehicle included in the message transmitted from the on-vehicle device after the message including the collision detection information is received, the controller determines that hit-and-run occurs as the abnormal event.

Accordingly, the occurrence of the hit-and-run as the abnormal event can be detected.

An eleventh invention is such that in a case where the person does not pass through in an expected passage time range, the controller determines that the abnormal event occurs based on the passage history information.

Accordingly, a notification of a fact that a target person to be watched for does not pass through at a time at which the target person always passes through can be given to the protector.

A twelfth invention is a pedestrian device that performs a danger determination by exchanging a message including positional information with an on-vehicle device. The pedestrian device includes a communicator that performs road-pedestrian communication with a roadside device installed on a road, a detector that detects a predetermined impact or a predetermined voice with respect to the pedestrian device, and a controller that transmits the message including detection information detected by the detector to the roadside device from the communicator.

Accordingly, in the roadside device, the occurrence of the abnormal event for the person possessing the pedestrian device can be accurately detected based on the detection information.

A thirteenth invention is a pedestrian device that performs a danger determination by exchanging a message including positional information with an on-vehicle device. The pedestrian device includes a communicator that performs road-pedestrian communication with a roadside device installed on a road and receives the message transmitted from another pedestrian device, a storage in which pedestrian information included in the message received from the other pedestrian device by the communicator is accumulated as passage history information, and a controller that detects a person as a target of abnormality detection performed by the roadside device based on the passage history information and transmits the message including a detection result to the roadside device from the communicator.

Accordingly, even outside a communication area of the roadside device, a suspicious person who is present nearby the host device can be found.

A fourteenth invention is a communication system including a pedestrian device that performs a danger determination by exchanging a message including positional information with an on-vehicle device, and a roadside device installed on a road, in which the pedestrian device and the roadside device perform road-pedestrian communication, and the roadside device includes a communicator that performs the road-pedestrian communication with the pedestrian device, a storage in which in a case where the message transmitted from the pedestrian device is received by the communicator, pedestrian information included in the received message is accumulated as passage history information, and a controller that detects occurrence of an abnormal event for a person possessing the pedestrian device based on the passage history information.

Accordingly, the occurrence of the abnormal event for the person possessing the pedestrian device can be detected in the same manner as the first invention.

A fifteenth invention is such that the communication system further includes a management device that manages the abnormal event detected by the roadside device, in which the management device includes a communicator that communicates with the roadside device, a storage in which in a case where the passage history information transmitted from the roadside device is received by the communicator, the received passage history information is accumulated, and a controller that displays a screen of reconstruction of a situation at a time of occurrence of an abnormality in the past on a display device based on the passage history information.

Accordingly, a manager can check the situation at the time of occurrence of the abnormality in the past afterward.

A sixteenth invention is such that the communication system further includes a management device that manages the abnormal event detected by the roadside device, in which the management device includes a communicator that communicates with the roadside device, a storage in which in a case where the passage history information transmitted from the roadside device is received by the communicator, the received passage history information is accumulated, and a controller that generates behavior pattern information related to characteristics of a behavior of an involved person until the occurrence of the abnormal event based on the passage history information, predicts the occurrence of the abnormal event based on the behavior pattern information and the most recent pedestrian information acquired from the pedestrian device, and transmits an abnormality prediction notification to the roadside device.

Accordingly, since the notification of the occurrence of the abnormal event can be given to the nearby pedestrians or the protector at the remote location in advance, the abnormal event can be prevented in advance.

A seventeenth invention is such that the controller of the pedestrian device transmits service selection information related to information provision in an abnormality notification service to the communicator of the roadside device, and the controller of the roadside device generates information related to payment of an information provision fee to the person possessing the pedestrian device based on the service selection information received by the communicator.

Accordingly, the information provision fee can be paid to a person who cooperates in the information provision in the abnormality notification service.

An eighteenth invention is such that the controller of the pedestrian device transmits service selection information related to use of an abnormality notification service to the communicator of the roadside device, and the controller of the roadside device generates information related to collection of a service usage fee from a user of the abnormality notification service based on the service selection information received by the communicator.

Accordingly, the service usage fee can be collected from a user who uses the abnormality notification service.

A nineteenth invention is such that the roadside device includes a network communicator, and the controller of the roadside device acquires a frequency of occurrence of the abnormal event for each person based on the passage history information, generates information for reducing an insurance fee of an insurance subscribed by the person depending on the frequency, and transmits the information to an external unit from the network communicator.

Accordingly, the insurance fee can be reduced depending on the frequency of occurrence of the abnormal event.

A twentieth invention is an abnormality detection method for a roadside device that is installed on a road and performs road-pedestrian communication with a pedestrian device which performs a danger determination by exchanging a message including positional information with an on-vehicle device. The abnormality detection method includes receiving the message transmitted from the pedestrian device by the road-pedestrian communication, accumulating pedestrian information included in the received message as passage history information, and detecting occurrence of an abnormal event for a person possessing the pedestrian device based on the passage history information.

Accordingly, the occurrence of the abnormal event for the person possessing the pedestrian device can be detected in the same manner as the first invention.

A twenty-first invention is an abnormality notification method of giving a notification of occurrence of an abnormal event for a person possessing a pedestrian device to a nearby pedestrian device from a roadside device. The abnormality notification method includes by the pedestrian device, transmitting a message including pedestrian information to the roadside device, and by the roadside device, in a case where the message transmitted from the pedestrian device is received, accumulating the pedestrian information included in the message as passage history information, detecting the occurrence of the abnormal event for the person possessing the pedestrian device based on the passage history information, and transmitting the message including information indicating that the abnormal event occurs for the person possessing the pedestrian device to the nearby pedestrian device.

Accordingly, the notification of the occurrence of the abnormal event for the person can be given to nearby pedestrians in the same manner as the second invention.

A twenty-second invention is an abnormality notification method of giving a notification of occurrence of an abnormal event for a person possessing a pedestrian device to a protector device from a roadside device. The abnormality notification method includes by the pedestrian device, transmitting a message including pedestrian information to the roadside device, and by the roadside device, in a case where the message transmitted from the pedestrian device is received, accumulating the pedestrian information included in the message as passage history information, detecting the occurrence of the abnormal event for the person possessing the pedestrian device based on the passage history information, and transmitting a notification that the abnormal event occurs for the person possessing the pedestrian device to the protector device.

Accordingly, the notification of the occurrence of the abnormal event for the person can be given to the protector at the remote location in the same manner as the third invention.

Hereinafter, exemplary embodiments of the present invention will be described with reference to the drawings.

First Exemplary Embodiment

FIG. 1 is an overall configuration diagram of a communication system according to a first exemplary embodiment.

The communication system includes pedestrian terminal 1 (pedestrian device) and portable information terminal 2 carried by a pedestrian, on-vehicle terminal 3 (on-vehicle device) and car navigation device 4 mounted on a vehicle (moving object), roadside machine 5 (roadside device), and protector terminal 6 carried by a protector. Pedestrian-vehicle communication is performed between pedestrian terminal 1 and on-vehicle terminal 3, and road-pedestrian communication is performed between pedestrian terminal 1 and roadside machine 5.

In the pedestrian-vehicle communication, a message that includes necessary information such as positional information is transmitted and received between pedestrian terminal 1 and on-vehicle terminal 3. In the pedestrian-vehicle communication, the message is transmitted and received by ITS wireless communication, that is, wireless communication that uses a frequency band (for example, a 700 MHz band or a 5.8 GHz band) employed in a safe operation assistance wireless system which uses an intelligent transport system (ITS).

In the present exemplary embodiment, besides the pedestrian-vehicle communication, the road-pedestrian communication of transmitting and receiving the message between roadside machine 5 and pedestrian terminal 1 and road-vehicle communication of transmitting and receiving the message between roadside machine 5 and on-vehicle terminal 3 are performed. However, the road-pedestrian communication and the road-vehicle communication are the same ITS wireless communication as the pedestrian-vehicle communication, and the message transmitted and received by the pedestrian-vehicle communication, the road-pedestrian communication, and the road-vehicle communication is based on common specifications (data configuration).

Pedestrian terminal 1 is connected to portable information terminal 2. Portable information terminal 2 is a smartphone, a mobile phone, a tablet terminal, a wearable terminal, or the like. In pedestrian terminal 1, in a case where it is determined that alert is necessary by transmitting and receiving the message with on-vehicle terminal 3, an alert instruction is output to portable information terminal 2. In portable information terminal 2, an alert output operation (for example, voice output or vibration) for the pedestrian is performed in response to the instruction from pedestrian terminal 1.

On-vehicle terminal 3 is connected to car navigation device 4. Car navigation device 4 provides path guidance to an operator. In on-vehicle terminal 3, in a case where it is determined that alert is necessary by transmitting and receiving the message with pedestrian terminal 1, the alert instruction is output to car navigation device 4. In car navigation device 4, the alert output operation (for example, voice output or screen display) for the operator is performed in response to the instruction from on-vehicle terminal 3.

Pedestrian terminal 1 may be incorporated in portable information terminal 2. On-vehicle terminal 3 may be incorporated in car navigation device 4.

Pedestrian terminal 1 itself may perform the alert output operation. On-vehicle terminal 3 itself may perform the alert output operation. On-vehicle terminal 3 may communicate with portable information terminal 2 possessed by the operator and cause portable information terminal 2 to perform the alert output operation for the operator.

Figure 2A:
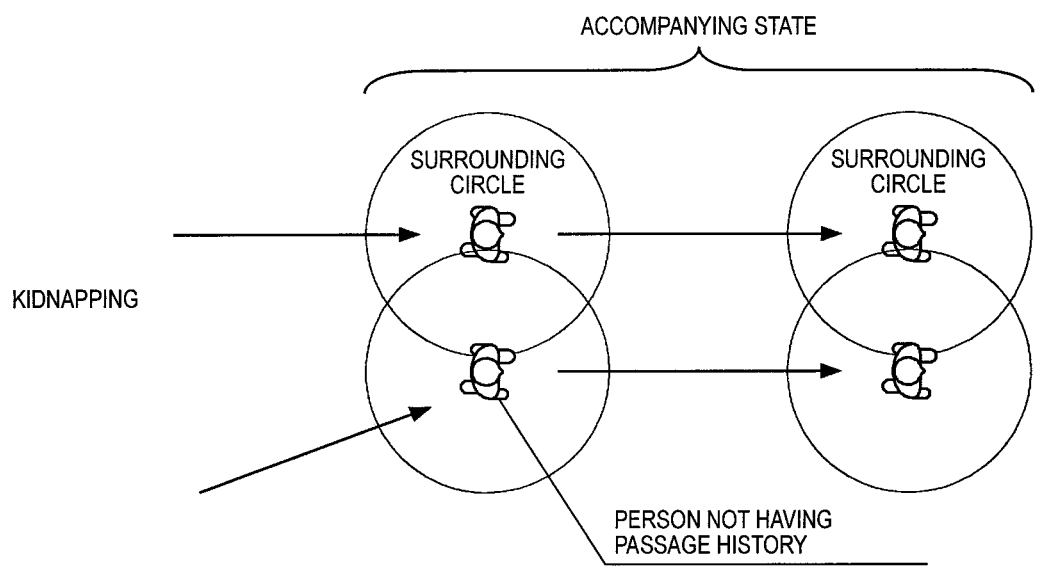
FIG. 2A is a descriptive diagram illustrating a summary of abnormal event detection performed by roadside machine 5 according to the first exemplary embodiment.
Figure 2B:
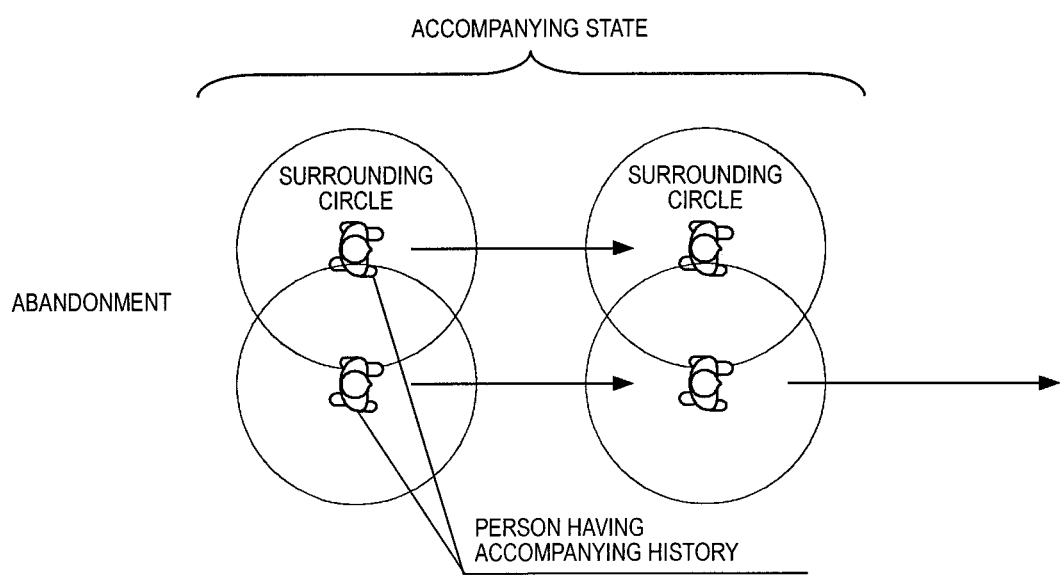
FIG. 2B is a descriptive diagram illustrating a summary of the abnormal event detection performed by roadside machine 5 according to the first exemplary embodiment.

Next, a summary of abnormal event detection performed by roadside machine 5 according to the first exemplary embodiment will be described. FIG. 2A, FIG. 2B, and FIG.

Figure 3A:
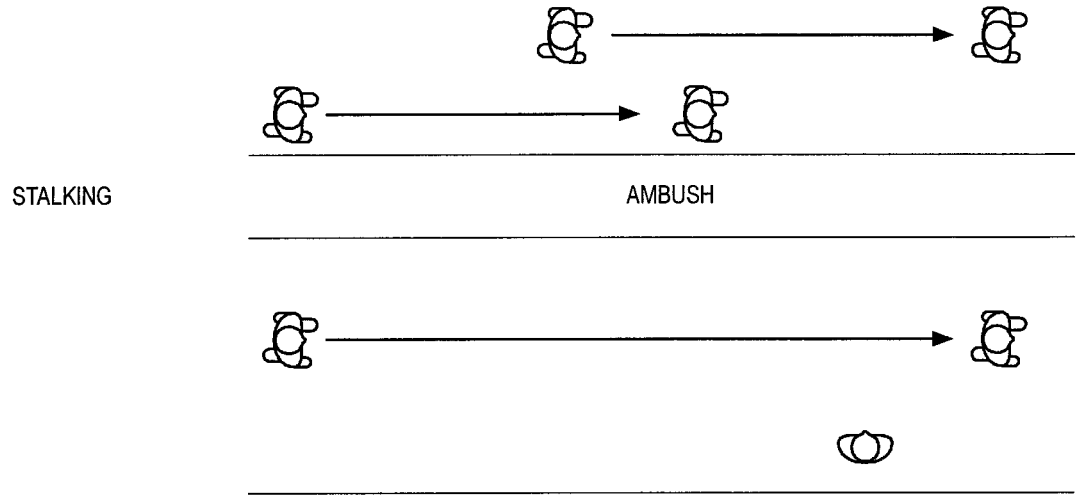
FIG. 3A is a descriptive diagram illustrating a summary of the abnormal event detection performed by roadside machine 5 according to the first exemplary embodiment.
Figure 3B:
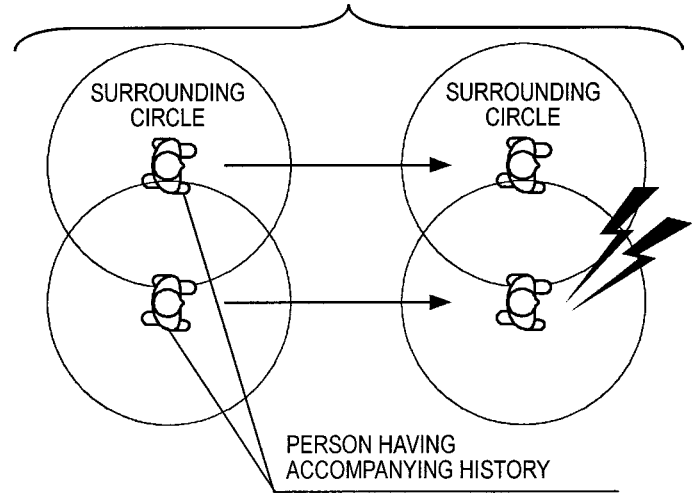
FIG. 3B is a descriptive diagram illustrating a summary of the abnormal event detection performed by roadside machine 5 according to the first exemplary embodiment.
Figure 3C:
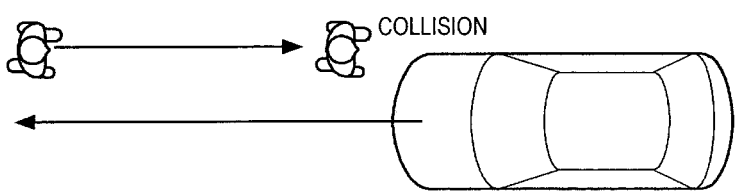
FIG. 3C is a descriptive diagram illustrating a summary of the abnormal event detection performed by roadside machine 5 according to the first exemplary embodiment.

3A to FIG. 3C are descriptive diagrams illustrating the summary of the abnormal event detection performed by roadside machine 5.

In the present exemplary embodiment, in roadside machine 5, the message is received from pedestrian terminal 1 passing nearby roadside machine 5, and an abnormal event of the pedestrian is detected based on pedestrian information such as the positional information included in the message and is notified to another nearby pedestrian or a protector present at a remote location. Particularly, in the present exemplary embodiment, kidnapping, abandonment, confinement, stalking, bullying, and hit-and-run are detected as the abnormal event.

In the kidnapping, as illustrated in FIG. 2A, in a situation at a time of a crime, an offender accompanies a victim, that is, the offender moves together with the victim in the same direction. Therefore, in the present exemplary embodiment, accompanying of a plurality of persons is set as a condition of the kidnapping.

In the present exemplary embodiment, a surrounding circle (a circular area) having a predetermined size (for example, a radius of 10 m) from a position of a person as a center is set around the person, and an accompanying state of two persons with an overlap between the surrounding circles of the two persons is detected. At this point, a condition that the overlapping state between the surrounding circles continues for a predetermined amount of time may be added to the condition.

In addition, the kidnapping is mostly performed by a person who does not frequently pass through the location. Therefore, in the present exemplary embodiment, a person who does not have a passage history within a predetermined period (for example, one week) in the past, that is, a person who does not pass through a communication area of roadside machine 5, is focused as a condition related to the person.

In addition, as in a case of abduction of a child, the offender and the victim are mostly persons who do not know each other, that is, who has not met each other before. Therefore, as a condition related to the person, a person who does not have an accompanying history within the predetermined period (for example, one week) in the past, that is, a person who has not walked together through the communication area of roadside machine 5, may be added to the condition of the kidnapping.

In addition, a target of the kidnapping is mostly a child. Therefore, a condition that the pedestrian is a child may be added to the condition of the kidnapping. In this case, by adding attribute information related to age as the pedestrian information to the message and transmitting the message from pedestrian terminal 1, roadside machine 5 may acquire the attribute information of the pedestrian.

In addition, in a case of the kidnapping, a sudden motion of the victim occurs due to an action of restraining the resisting victim. Therefore, a condition that a sudden acceleration is detected by an acceleration sensor and a sudden rotation (a sudden change in direction) is detected by an azimuth sensor may be added to the condition of the kidnapping.

In addition, the kidnapping may be performed using a vehicle. Therefore, a condition that pedestrian terminal 1 enters the vehicle after a decrease in electric wave intensity of a position measurement satellite after the sudden motion may be added to the condition of the kidnapping. In addition, in the case of the kidnapping, pedestrian terminal 1 may be left on the road. Therefore, a condition that pedestrian terminal 1 is at a standstill and does not have a change in position after the sudden motion may be added to the condition of the kidnapping. In addition, in the case of the kidnapping, pedestrian terminal 1 may be damaged. Therefore, a condition that an electric wave of the position measurement satellite cannot be received after the sudden motion may be added to the condition of the kidnapping.

The abandonment is an action in which one person leaves another person at a certain location and leaves the location as illustrated in FIG. 2B. Therefore, in the present exemplary embodiment, a condition that a change is made from an accompanying state of a plurality of persons to a non-accompanying state, that is, the plurality of persons move together and then, separate, is set as a condition of the abandonment. At this point, a condition that the non-accompanying state continues for a predetermined amount of time or longer may be added to the condition. It is assumed that the abandonment also includes a case where a person such as a missing child strays.

In addition, in the abandonment, the two persons are in an acquaintance relationship like a parent and a child. Therefore, as a condition related to the person, a condition that an accompanying history is present, that is, the person has passed through the communication area of roadside machine 5 together with another person in the past, may be added to the condition.

In addition, the abandonment occurs not only at a location that is regularly passed through, but also a location that is not known well. Therefore, as a condition related to the location, a person who does not have a passage history within a predetermined period in the past, that is, a person who has not passed through in the past, may be added to the condition.

In addition, a target of the abandonment is mostly a child. Therefore, a condition that a person who is abandoned and does not have a change in positional information is a child of less than or equal to a predetermined age may be added to the condition of the abandonment. In addition, a target of abandonment detection is not limited to a person. A pet such as a dog may also be included in the target.

The confinement is an action of restraining a person and confining the person at a certain location. The confined person does not move from a specific location. Therefore, in the present exemplary embodiment, a condition that the person does not move for a predetermined period is set as a condition of the confinement based on positional information of the person.

In addition, in a case where the person is confined outside the communication area of roadside machine 5, the person does not pass through the communication area of roadside machine 5. Therefore, a condition that a state where a person having a passage history does not pass through continues for a predetermined period may be added to the condition of the confinement.

In addition, in a case of the confinement, a sudden motion of the victim occurs due to an action of restraining the resisting victim. Therefore, a condition that a sudden acceleration is detected by an acceleration sensor and a sudden rotation (a sudden change in direction) is detected by an azimuth sensor may be added to the condition of the confinement.

The stalking includes tailing and ambush. As illustrated in FIG. 3A, in a case of the tailing, the offender moves like following after the victim at a predetermined distance. Therefore, based on positional information of the pedestrian, a case where a person moves like following another person is determined as the tailing. Meanwhile, in a case of the ambush, the offender is in a state of standing ahead in a traveling direction of the victim. Therefore, a case where a person is in a state of standing still and not moving on a movement path of another person is determined as the ambush.

In addition, a location at which the stalking is performed is mostly a location through which the victim frequently passes and the offender does not frequently pass. Therefore, as a condition related to the person, a person who does not have a passage history within a predetermined period (for example, one week) in the past may be added to a condition of the stalking.

In addition, in the stalking, the offender and the victim mostly have different sexes. Therefore, a condition that two persons have different sexes may be added to the condition of the stalking. In this case, by adding attribute information related to sex as the pedestrian information to the message and transmitting the message from pedestrian terminal 1, roadside machine 5 may acquire the attribute information of the pedestrian.

The bullying is mostly a case where the offender and the victim behave as a group and frequently behave together. Therefore, in the present exemplary embodiment, a person having an accompanying history is set as a condition of the bullying. In addition, as illustrated in FIG. 3B, since the offender accompanies the victim in a situation at a time of a crime, an accompanying state of a plurality of persons is set as the condition of the bullying.

In addition, in a case of the bullying, physical abuse and verbal abuse are mostly present. Therefore, a condition that an impact caused by physical abuse is detected by an acceleration sensor disposed in pedestrian terminal 1 or a large voice caused by verbal abuse is detected by a microphone disposed in pedestrian terminal 1 is set as the condition of the bullying. In addition, even in a case where the voice is not large, a condition that a predetermined word corresponding to threat or a predetermined word for asking help is detected may be set as the condition of the bullying. In addition, in the bullying, the offender and the victim are mostly children. Therefore, a condition that the person is a child may be added to the condition of the bullying.

In addition, in the physical abuse, a sudden motion of the victim mostly occurs. Therefore, a condition that a sudden acceleration is detected by an acceleration sensor and a sudden rotation (a sudden change in direction) is detected by an azimuth sensor may be added to the condition of the bullying. In addition, in the physical abuse, the victim mostly does not move from a specific location. Therefore, based on positional information of the victim, a condition that the victim does not move for a predetermined period may be added to the condition of the bullying.

As illustrated in FIG. 3C, the hit-and-run is an action in which the operator runs away without performing rescue after the vehicle collides with the pedestrian. Therefore, in the present exemplary embodiment, first, collision between the vehicle and the pedestrian is detected by detecting an impact based on a detection result of a sensor such as the acceleration sensor disposed in pedestrian terminal 1. In pedestrian terminal 1, a danger determination as to whether or not a danger of collision between the vehicle and the pedestrian is high is performed based on positional information and the like of the pedestrian and the vehicle. Thus, in a case where the impact is detected after it is determined that the danger of collision is high in the danger determination, it is determined that the vehicle collides with the pedestrian. In addition, a condition that the pedestrian does not have a motion (a change in positional information) after the collision is detected is added to a determination condition. Furthermore, a condition that the vehicle runs away from a collision location after the collision is detected is added to the determination condition. Whether or not the vehicle runs away may be detected first. In addition, considering a case of a minor collision, whether or not the pedestrian does not have a motion may not be added to the determination condition. In addition, in a case of the hit-and-run, pedestrian terminal 1 may be damaged. Therefore, a condition that the electric wave of the position measurement satellite cannot be received after a sudden motion may be added to a condition of the hit-and-run.

Next, schematic configurations of pedestrian terminal 1 and roadside machine 5 according to the first exemplary embodiment will be described.

Figure 4:
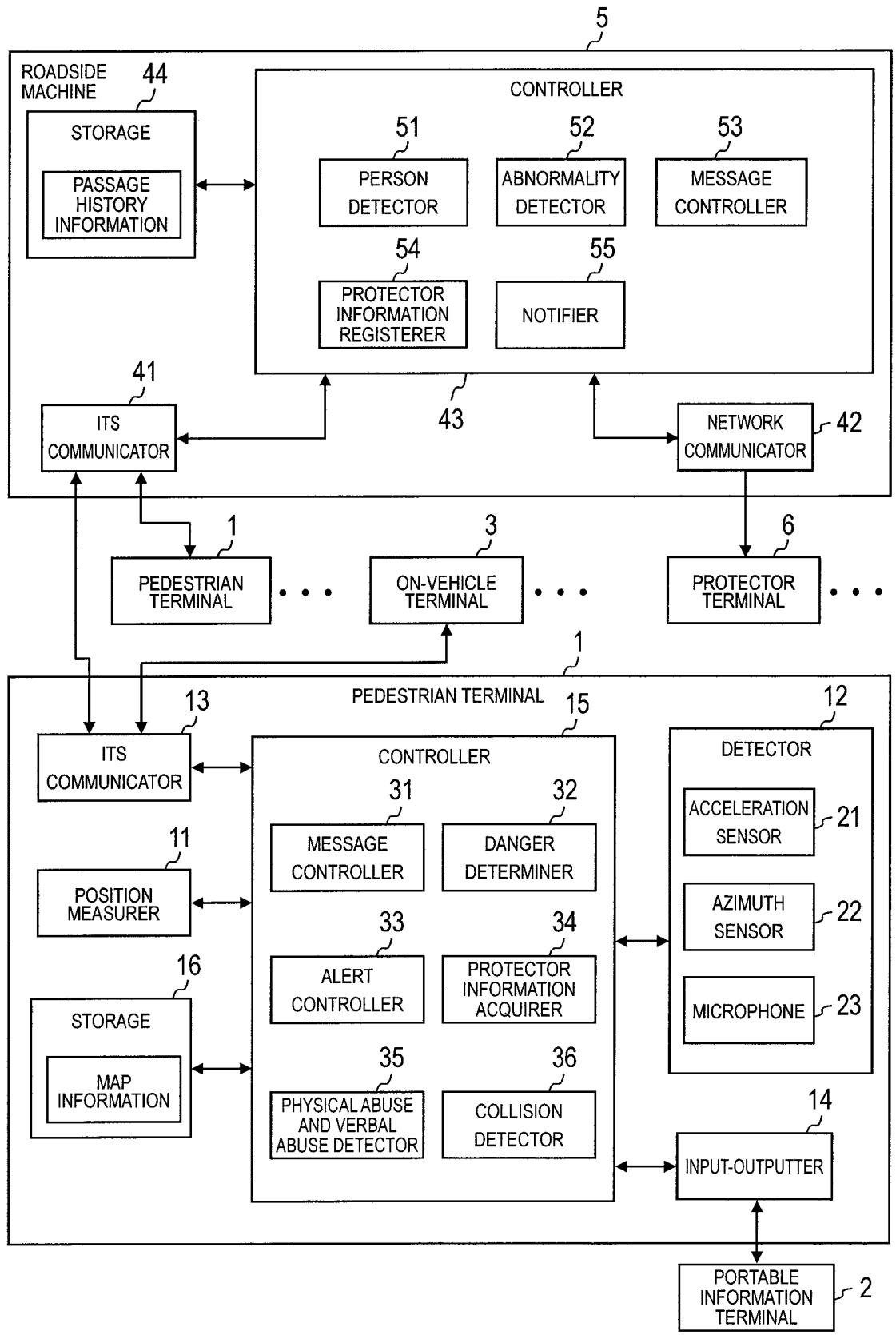
FIG. 4 is a block diagram illustrating schematic configurations of pedestrian terminal 1 and roadside machine 5 according to the first exemplary embodiment.

FIG. 4 is a block diagram illustrating the schematic configurations of pedestrian terminal 1 and roadside machine 5.

Pedestrian terminal 1 includes position measurer 11, detector 12, ITS communicator 13, input-outputter 14, controller 15, and storage 16.

Position measurer 11 acquires positional information of a host device by measuring a position of the host device using a satellite position measurement system such as a global positioning system (GPS) or a quasi-zenith satellite system (QZSS). The positional information of the host device may be acquired using a position measurement function of portable information terminal 2.

Detector 12 detects a state of the host pedestrian (the pedestrian possessing the host device) and includes acceleration sensor 21, azimuth sensor 22, and microphone 23. In the present exemplary embodiment, the impact caused by physical abuse is detected using an acceleration detected by acceleration sensor 21. Alternatively, an impact sensor may be disposed separately from acceleration sensor 21.

ITS communicator 13 transmits and receives the message with roadside machine 5 by ITS communication (road-pedestrian communication) and transmits and receives the message with on-vehicle terminal 3 by ITS communication (pedestrian-vehicle communication).

Input-outputter 14 inputs and outputs information with portable information terminal 2. Based on the information output from input-outputter 14, an alert operation for the pedestrian is performed in portable information terminal 2.

Storage 16 stores map information and a program and the like executed by a processor constituting controller 15. The map information may be acquired from portable information terminal 2.

Controller 15 includes message controller 31, danger determiner 32, alert controller 33, protector information acquirer 34, physical abuse and verbal abuse detector 35, and collision detector 36. Controller 15 is configured with the processor. Each unit of controller 15 is implemented by causing the processor to execute the program stored in storage 16.

Message controller 31 controls transmission of the message including the pedestrian information such as a terminal ID and the positional information.

Danger determiner 32 determines whether or not there is a danger of collision between the vehicle and the host pedestrian based on the positional information of the host pedestrian acquired by position measurer 11 and the positional information of the vehicle included in the message received from on-vehicle terminal 3.

Alert controller 33 alerts the host pedestrian depending on a determination result of danger determiner 32. In the present exemplary embodiment, the alert instruction is output to portable information terminal 2 through input-outputter 14, and the alert output operation (for example, voice output or vibration) for the pedestrian is performed in portable information terminal 2 in response to the instruction.

Protector information acquirer 34 acquires protector information related to an address of the protector, specifically, an address of protector terminal 6. A user may operate portable information terminal 2 and input the protector information. In a case where the protector information is acquired in protector information acquirer 34, message controller 31 transmits the message including the protector information to roadside machine 5 at an appropriate timing.

Physical abuse and verbal abuse detector 35 detects the physical abuse (impact) based on the acceleration detected by acceleration sensor 21. In addition, physical abuse and verbal abuse detector 35 detects the verbal abuse based on the voice detected by microphone 23. The verbal abuse may be detected based on a content of utterance by performing voice recognition.

Collision detector 36 determines that the vehicle collides with the host pedestrian in a case where the collision is detected based on the acceleration detected by acceleration sensor 21 after danger determiner 32 determines that there is a danger of collision between the vehicle and the host pedestrian.

Roadside machine 5 includes ITS communicator 41, network communicator 42, controller 43, and storage 44.

ITS communicator 41 transmits and receives the message with pedestrian terminal 1 by ITS communication (road-pedestrian communication) and transmits and receives the message with on-vehicle terminal 3 by ITS communication (road-vehicle communication).

Network communicator 42 communicates with protector terminal 6 through a network of cellular communication, wireless LAN communication, the Internet, or the like.

Storage 44 stores a program and the like executed by a processor constituting controller 43. In addition, storage 44 stores the pedestrian information included in the message received from pedestrian terminal 1 in the communication area of the roadside machine as passage history information. At this point, the pedestrian information in a predetermined period (for example, one week or one month) is accumulated as the passage history information and is deleted after an elapse of the predetermined period.

Controller 43 includes person detector 51, abnormality detector 52, message controller 53, protector information registerer 54, and notifier 55.

Controller 43 is configured with the processor. Each unit of controller 43 is implemented by causing the processor to execute the program stored in storage 44.

In a case where the message transmitted from pedestrian terminal 1 including the protector information is received by ITS communicator 41, protector information registerer 54 performs a process of registering the protector information and stores the protector information in storage 44.

Person detector 51 detects a person as a monitoring target in a case of detecting an abnormal event of the person by abnormality detector 52 from persons passing through the communication area of roadside machine 5 based on the passage history information of storage 44.

In the present exemplary embodiment, a person (a suspicious person) who does not have a passage history within the predetermined period in the past, that is, a person who has not passed through the communication area, is detected from persons present in the communication area. In addition, in the present exemplary embodiment, a person having an accompanying history, that is, a person who has passed through the communication area before together with another person, is detected from the persons present in the communication area.

Abnormality detector 52 detects occurrence of the abnormal event for the person possessing pedestrian terminal 1 based on the passage history information of storage 44 using the person detected by person detector 51 as the monitoring target. In the present exemplary embodiment, kidnapping, abandonment (missing child), confinement, stalking, bullying, and hit-and-run are detected as the abnormal event.

Specifically, in a case where a person who does not have a passage history within the predetermined period in the past is in a state of accompanying another person, it is determined that the kidnapping occurs as the abnormal event based on the passage history information.

In addition, in a case where a change is made from the accompanying state of a plurality of persons having an accompanying history within the predetermined period in the past to the non-accompanying state, it is determined that the abandonment occurs as the abnormal event based on the passage history information.

In addition, in a case where a person who does not have a change in positional information within the predetermined period in the past is present, it is determined that the confinement occurs as the abnormal event based on the passage history information.

In addition, in a case where a person who does not have a passage history within the predetermined period in the past is in a state of moving like following another person, or in a case where the person is in a state of standing still and not moving on the movement path of another person, it is determined that the stalking occurs as the abnormal event based on the passage history information.

In addition, in a case where a message including physical abuse and verbal abuse detection information is received in the accompanying state of a plurality of persons having an accompanying history within the predetermined period in the past, it is determined that the bullying occurs as the abnormal event based on the passage history information.

In addition, in a case where a state where the pedestrian does not move continues for a predetermined amount of time after a message including collision detection information is received from pedestrian terminal 1, and the vehicle running away from the collision location is detected based on the positional information of the vehicle included in the message transmitted from on-vehicle terminal 3, it is determined that the hit-and-run occurs as the abnormal event based on the passage history information.

In a case where the message transmitted from pedestrian terminal 1 is received by ITS communicator 41, message controller 53 stores the pedestrian information included in the message in storage 44 as the passage history information. In addition, in a case where an abnormality is detected by abnormality detector 52, a message including abnormality detection information is transmitted to pedestrian terminal 1 from ITS communicator 41. Accordingly, a notification of the occurrence of the abnormal event can be given to nearby pedestrians.

In a case where the abnormality is detected by abnormality detector 52, notifier 55 transmits an abnormality detection notification to protector terminal 6 from network communicator 42. Accordingly, the notification of the occurrence of the abnormal event can be given to the protector at a remote location.

Figure 5B:
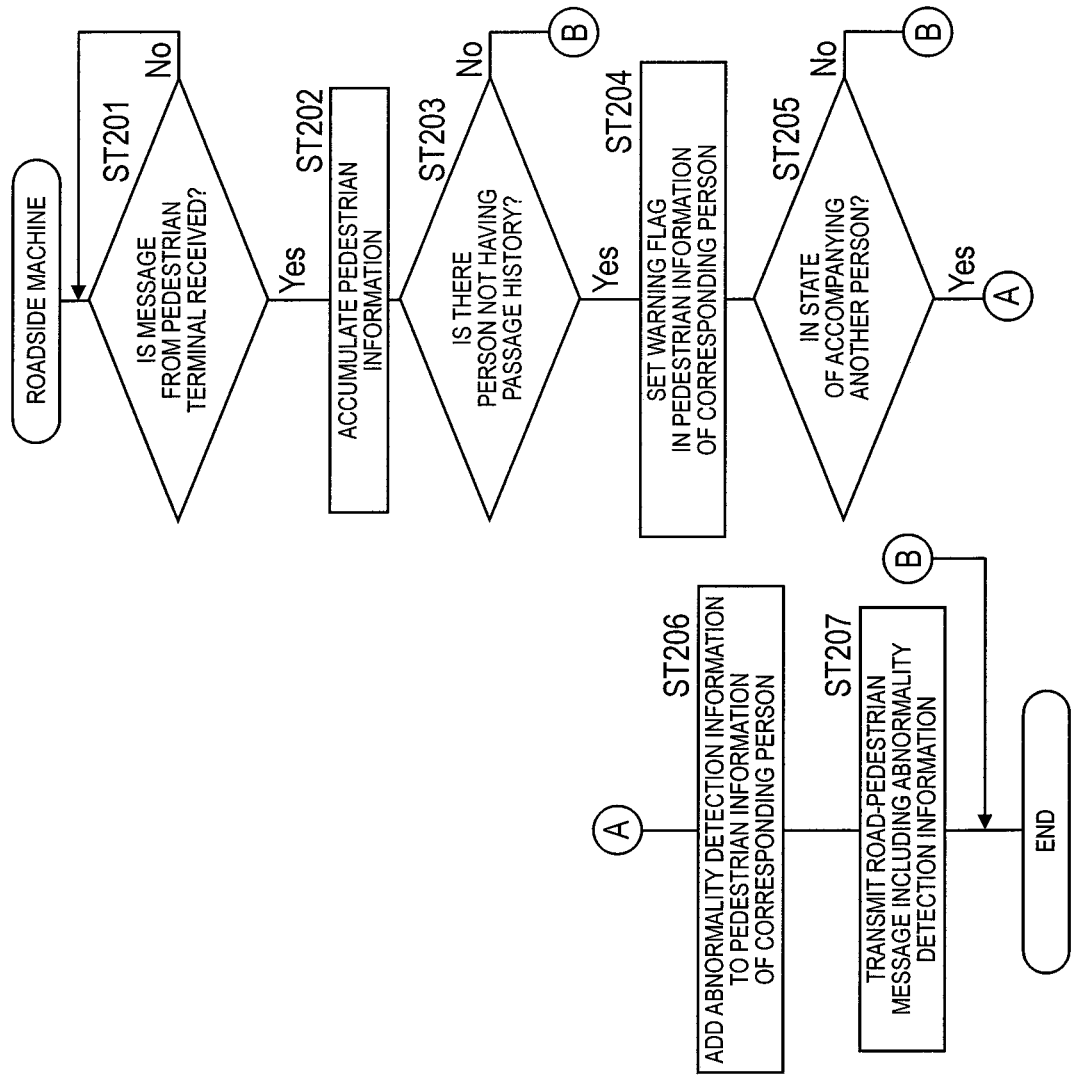
FIG. 5B is a flowchart illustrating an operation procedure related to kidnapping in pedestrian terminal 1 and roadside machine 5 according to the first exemplary embodiment.
Figure 5A:
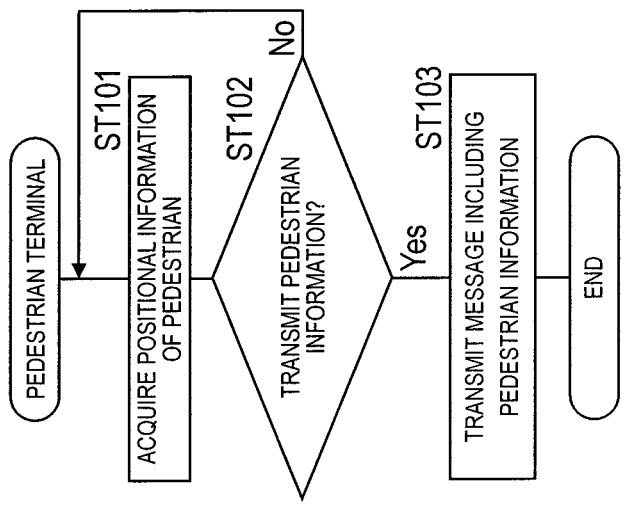
FIG. 5A is a flowchart illustrating an operation procedure related to kidnapping in pedestrian terminal 1 and roadside machine 5 according to the first exemplary embodiment.
Figure 5C:
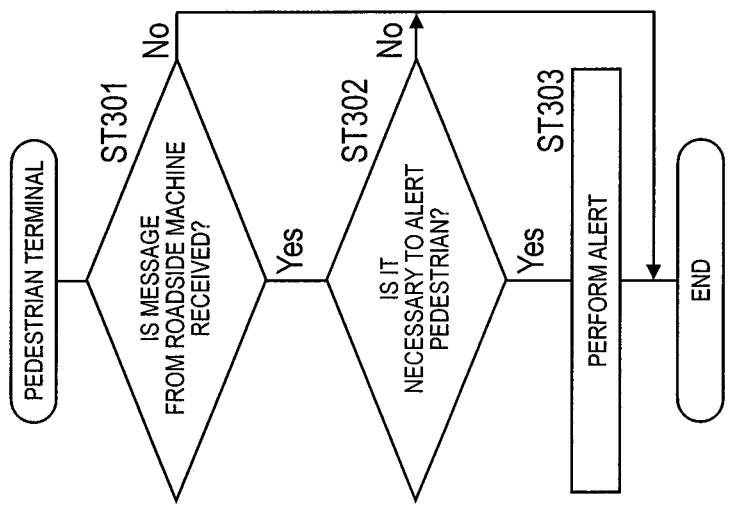
FIG. 5C is a flowchart illustrating an operation procedure related to kidnapping in pedestrian terminal 1 and roadside machine 5 according to the first exemplary embodiment.

Next, an operation procedure related to the kidnapping in pedestrian terminal 1 and roadside machine 5 according to the first exemplary embodiment will be described. FIGS. 5A to 5C are flowcharts illustrating operation procedures of pedestrian terminal 1 and roadside machine 5. FIGS. 6A to 6C are descriptive diagrams illustrating one example of the pedestrian information included in the message, the passage history information accumulated in roadside machine 5, and roadside machine information included in the message.

As illustrated in FIG. 5A, in pedestrian terminal 1, position measurer 11 acquires the positional information of the host pedestrian (ST101). Message controller 31 determines whether or not to transmit the pedestrian information based on the positional information of the host pedestrian (ST102). In a case of transmitting the pedestrian information (other than a case where the pedestrian is at a safe location such as on a footbridge, inside a building, or inside a vehicle) (Yes in ST102), next, the message including the pedestrian information is transmitted to roadside machine 5 from ITS communicator 13 (ST103).

At this point, as illustrated in FIG. 6A, the message transmitted to roadside machine 5 from pedestrian terminal 1 includes, as the pedestrian information, each information of a time, a terminal ID of pedestrian terminal 1, a position (a latitude and a longitude) of pedestrian terminal 1, a speed, and an azimuth and subsidiary information. The subsidiary information is stored in an extended region of the message of ITS communication.

As illustrated in FIG. 5B, in roadside machine 5, in a case where the message transmitted from pedestrian terminal 1 is received by ITS communicator 41 (Yes in ST201), the pedestrian information included in the message is accumulated in storage 44 as the passage history information (ST202). At this point, as illustrated in FIG. 6B, the pedestrian information accumulated in storage 44 as the passage history information includes each information of the time, the terminal ID (pedestrian ID) of pedestrian terminal 1, the position (the latitude and the longitude) of pedestrian terminal 1, the speed, and the azimuth and the subsidiary information.

Next, person detector 51 determines whether or not a person (suspicious person) not having a passage history within the predetermined period (for example, one week) in the past is present in the communication area of roadside machine 5 based on the pedestrian information of each person in the passage history information (ST203). In a case where the person not having a passage history is present (Yes in ST203), a warning flag is set as the subsidiary information in the pedestrian information of the corresponding person in the passage history information of storage 44 (ST204). In the example illustrated in FIG. 6B, the warning flag is set for a person of ID1.

Next, abnormality detector 52 monitors the person for which the warning flag is set, and determines whether or not the person as the monitoring target is in a state of accompanying another person (ST205).

In a case where the person as the monitoring target is in a state of accompanying another person (Yes in ST205), it is determined that the kidnapping occurs, and the abnormality detection information that indicates that the kidnapping is detected as the abnormal event is added to the pedestrian information of the corresponding person in the passage history information of storage 44 (ST206). In the example illustrated in FIG. 6B, a movement path of the person (monitoring target) of ID1 for which the warning flag is set matches a movement path of a person of ID2. Thus, it can be determined that the kidnapping occurs. After the determination of the kidnapping, the abnormality detection information that indicates the kidnapping is set in the subsidiary information of the person of ID1 in FIG. 6B instead of the warning flag.

Next, message controller 53 generates the message including the abnormality detection information that indicates that the kidnapping is detected as the abnormal event, and transmits the message to nearby pedestrian terminal 1 from ITS communicator 41 (ST207).

At this point, as illustrated in FIG. 6C, the message transmitted to pedestrian terminal 1 from roadside machine 5 includes, as the roadside machine information, each information of the time, a roadside machine ID of the host device, the terminal ID of pedestrian terminal 1 of the offender of the kidnapping, the terminal ID of pedestrian terminal 1 of the victim of the kidnapping, and the position (the latitude and the longitude) of pedestrian terminal 1 of the victim of the kidnapping and the abnormality detection information indicating that the abnormal event is the kidnapping.

In a case where the person not having a passage history is not present (No in ST203), or in a case where the person as the monitoring target is not in a state of accompanying another person (No in ST205), the operation procedure is finished without performing a particular process.

As illustrated in FIG. 5C, in another pedestrian terminal 1 that is present nearby, in a case where the message transmitted from roadside machine 5 is received by ITS communicator 13 (Yes in ST301), alert controller 33 determines whether or not it is necessary to alert the host pedestrian (ST302). In a case where it is necessary to alert the host pedestrian (Yes in ST302), the host pedestrian is alerted that the abnormal event occurs for the nearby pedestrian (ST303).

In a case where the message is transmitted to pedestrian terminal 1 from roadside machine 5, the abnormality detection notification that the abnormal event of a target person to be watched for is detected is transmitted to protector terminal 6 from network communicator 42 at the same time. In protector terminal 6, in a case where the abnormality detection notification transmitted from roadside machine 5 is received, alert indicating that the abnormal event occurs for the target person to be watched for is performed.

Figures 7A, 7B:
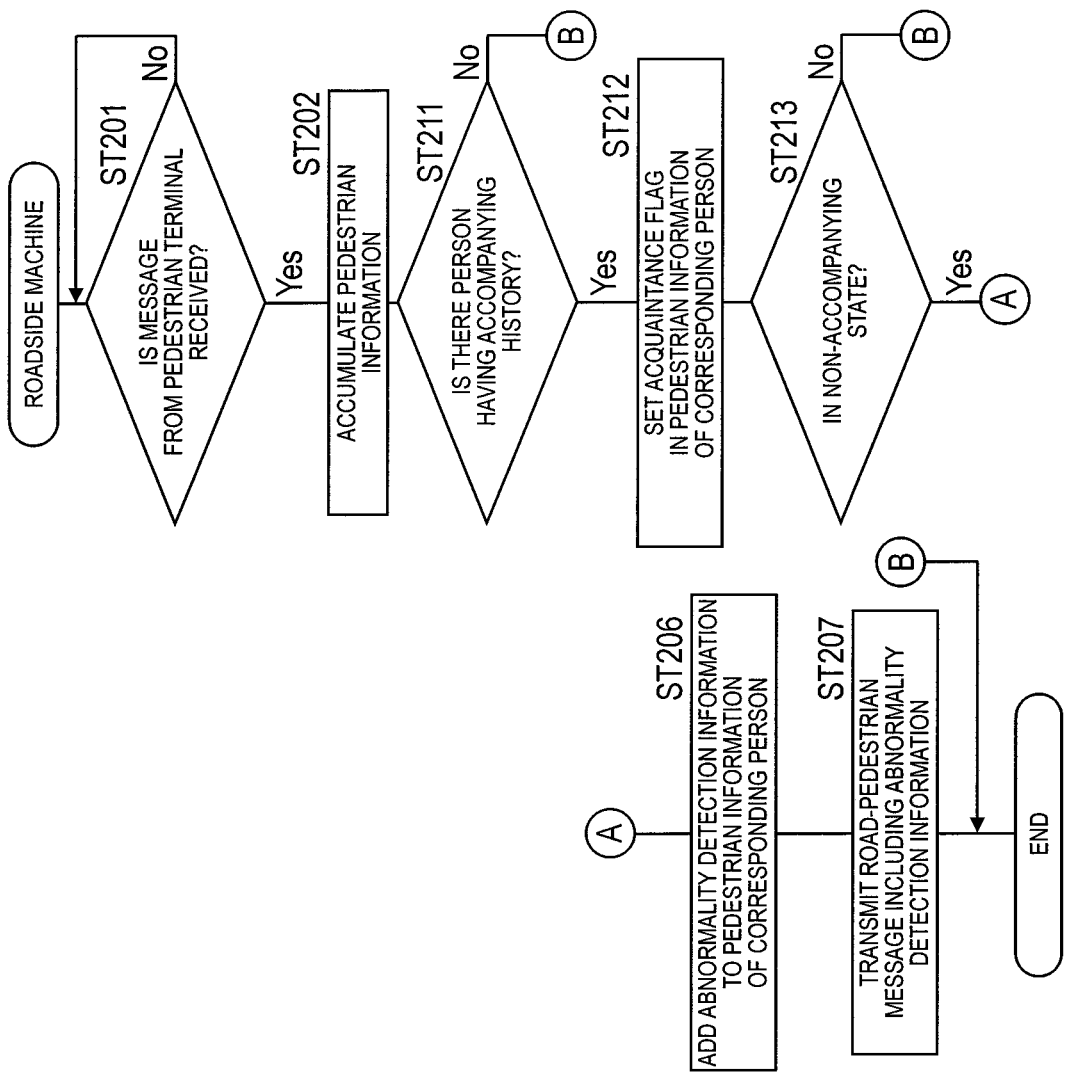
FIG. 7A is a flowchart illustrating an operation procedure related to abandonment in pedestrian terminal 1 and roadside machine 5 according to the first exemplary embodiment.
FIG. 7B is a flowchart illustrating an operation procedure related to abandonment in pedestrian terminal 1 and roadside machine 5 according to the first exemplary embodiment.

Next, an operation procedure related to the abandonment in pedestrian terminal 1 and roadside machine 5 according to the first exemplary embodiment will be described. FIGS. 7A to 7C are flowcharts illustrating operation procedures of pedestrian terminal 1 and roadside machine 5. FIG. 8A to FIG. 8D are descriptive diagrams illustrating one example of the pedestrian information included in the message and the pedestrian information accumulated as the passage history information.

As illustrated in FIG. 7A, the operation procedure of pedestrian terminal 1 is the same as the operation procedure in the case of the kidnapping (refer to FIG. 5A). In addition, as illustrated in FIG. 8A, a content of the message transmitted to roadside machine 5 from pedestrian terminal 1 is the same as the content of the message in the case of the kidnapping (refer to FIG. 6A).

As illustrated in FIG. 7B, in roadside machine 5, in a case where the message transmitted from pedestrian terminal 1 is received by ITS communicator 41 (Yes in ST201), the pedestrian information included in the message is accumulated in storage 44 as the passage history information (ST202). At this point, as illustrated in FIG. 8B and FIG. 8C, the pedestrian information accumulated in storage 44 as the passage history information includes each information of the time, the terminal ID (pedestrian ID) of pedestrian terminal 1, the position (the latitude and the longitude) of pedestrian terminal 1, the speed, and the azimuth and the subsidiary information.

Next, person detector 51 determines whether or not a person (a person in an acquaintance relationship) having an accompanying history within the predetermined period (for example, one week) in the past is present in the communication area of roadside machine 5 based on the pedestrian information of each person in the passage history information (ST211). In a case where the person having an accompanying history is present (Yes in ST211), an acquaintance flag is set as the subsidiary information in the pedestrian information of the corresponding person in the passage history information of storage 44 (ST212). The example illustrated in FIG. 8B is the passage history information in the past. The person of ID1 and the person of ID2 accompany each other (move at the same position), and the acquaintance flag is set for the two persons.

Next, abnormality detector 52 monitors a plurality of persons for which the acquaintance flag is set, and determines whether or not the plurality of persons as the monitoring target change to the non-accompanying state in the middle of accompanying (ST213). At this point, the non-accompanying state is a state where one moves while another stands still. The example illustrated in FIG. 8C is the most recent passage history information. While the person of ID1 is moving, the person of ID2 is not moving, and it can be determined that the abandonment occurs.

In a case where the plurality of persons as the monitoring target change to the non-accompanying state in the middle of accompanying (Yes in ST213), it is determined that the abandonment occurs, and the abnormality detection information that indicates that the abandonment is detected as the abnormal event is added to the pedestrian information of the corresponding person in the passage history information of storage 44 (ST206).

Next, message controller 53 generates the message including the abnormality detection information that indicates that the abandonment is detected as the abnormal event, and transmits the message to nearby pedestrian terminal 1 from ITS communicator 41 (ST207).

At this point, as illustrated in FIG. 8D, the message transmitted to pedestrian terminal 1 from roadside machine 5 includes each information of the time, the roadside machine ID of the host device, the terminal ID of pedestrian terminal 1 of the offender of the abandonment, the terminal ID of pedestrian terminal 1 of the victim of the abandonment, and the position (the latitude and the longitude) of pedestrian terminal 1 of the victim of the abandonment and the abnormality detection information as the subsidiary information indicating that the abnormal event is the abandonment.

In a case where the person having an accompanying history is not present (No in ST211), or in a case where the plurality of persons as the monitoring target do not change to the non-accompanying state in the middle of accompanying (No in ST213), the operation procedure is finished without performing a particular process.

As illustrated in FIG. 7C, the operation procedure of another pedestrian terminal 1 that is present nearby is the same as the operation procedure in the case of the kidnapping (refer to FIG. 5C). In addition, protector terminal 6 is the same as protector terminal 6 in the case of the kidnapping.

Figure 9C:
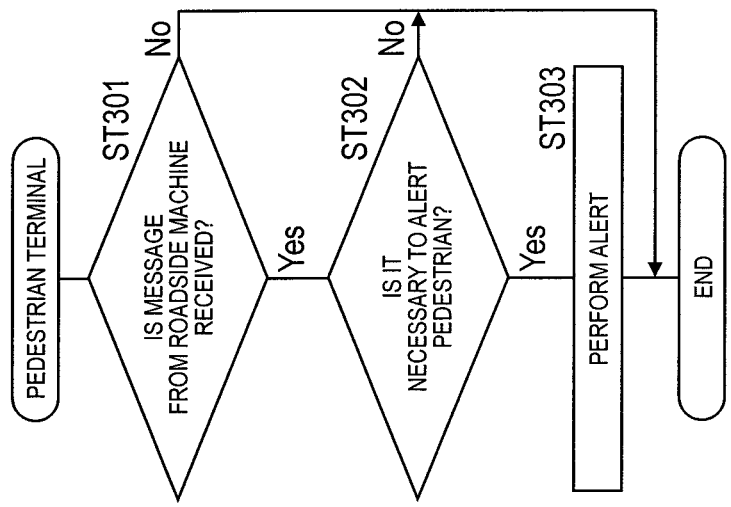
FIG. 9C is a flowchart illustrating an operation procedure related to confinement in pedestrian terminal 1 and roadside machine 5 according to the first exemplary embodiment.
Figure 9B:
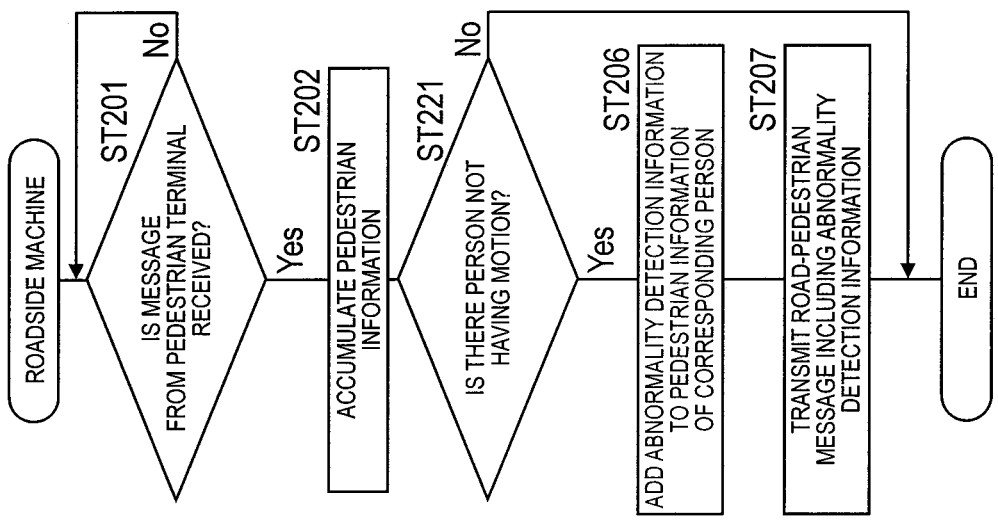
FIG. 9B is a flowchart illustrating an operation procedure related to confinement in pedestrian terminal 1 and roadside machine 5 according to the first exemplary embodiment.
Figure 9A:
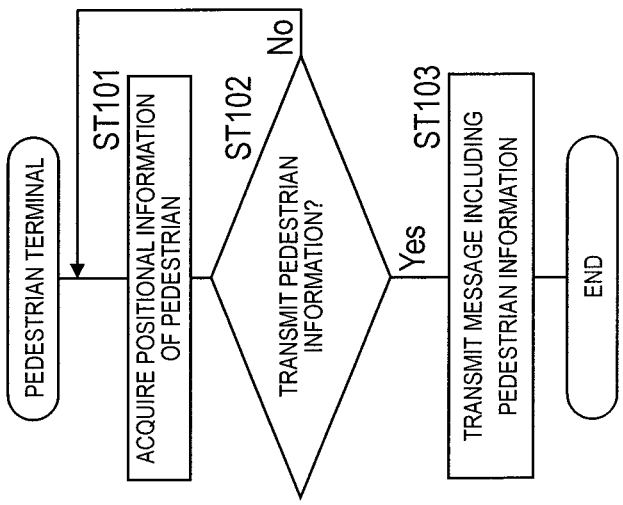
FIG. 9A is a flowchart illustrating an operation procedure related to confinement in pedestrian terminal 1 and roadside machine 5 according to the first exemplary embodiment.

Next, an operation procedure related to the confinement in pedestrian terminal 1 and roadside machine 5 according to the first exemplary embodiment will be described. FIG. 9A to FIG. 9C are flowcharts illustrating operation procedures of pedestrian terminal 1 and roadside machine 5. FIG. 10A to FIG. 10C are descriptive diagrams illustrating one example of the pedestrian information included in the message and the pedestrian information accumulated as the passage history information.

As illustrated in FIG. 9A, the operation procedure of pedestrian terminal 1 is the same as the operation procedure in the case of the kidnapping (refer to FIG. 5A). In addition, as illustrated in FIG. 10A, a content of the message transmitted to roadside machine 5 from pedestrian terminal 1 is the same as the content of the message in the case of the kidnapping (refer to FIG. 6A).

As illustrated in FIG. 9B, in roadside machine 5, in a case where the message transmitted from pedestrian terminal 1 is received by ITS communicator 41 (Yes in ST201), the pedestrian information included in the message is accumulated in storage 44 as the passage history information (ST202). At this point, as illustrated in FIG. 10B, the pedestrian information accumulated in storage 44 as the passage history information includes each information of the time, the terminal ID (pedestrian ID) of pedestrian terminal 1, the position (the latitude and the longitude) of pedestrian terminal 1, the speed, and the azimuth and the subsidiary information.

Next, abnormality detector 52 determines whether or not a person who does not have a motion continuously for a predetermined period is present based on the pedestrian information of each person in the passage history information (ST221).

In a case where the person not having a motion continuously for the predetermined period is present due to confinement or the like inside the building (Yes in ST221), it is determined that the confinement occurs, and the abnormality detection information that indicates that the confinement is detected as the abnormal event is added to the pedestrian information of the corresponding person in the passage history information of storage 44 (ST206). In the example illustrated in FIG. 10B, the person of ID1 remains at a certain position, and the person of ID1 does not appear for one week. Thus, it can be determined that the confinement occurs.

Next, message controller 53 generates the message including the abnormality detection information that indicates that the confinement is detected as the abnormal event, and transmits the message to nearby pedestrian terminal 1 from ITS communicator 41 (ST207).

At this point, as illustrated in FIG. 10C, the message transmitted to pedestrian terminal 1 from roadside machine 5 includes each information of the time, the roadside machine ID of the host device, the terminal ID of pedestrian terminal 1 of the victim of the confinement, and the position (the latitude and the longitude) of pedestrian terminal 1 of the victim of the confinement and the abnormality detection information indicating that the abnormal event is the confinement.

In a case where the person not having a motion is not present (No in ST221), the operation procedure is finished without performing a particular process.

As illustrated in FIG. 9C, the operation procedure of another pedestrian terminal 1 that is present nearby is the same as the operation procedure in the case of the kidnapping (refer to FIG. 5C). In addition, protector terminal 6 is the same as protector terminal 6 in the case of the kidnapping.

Figure 11C:
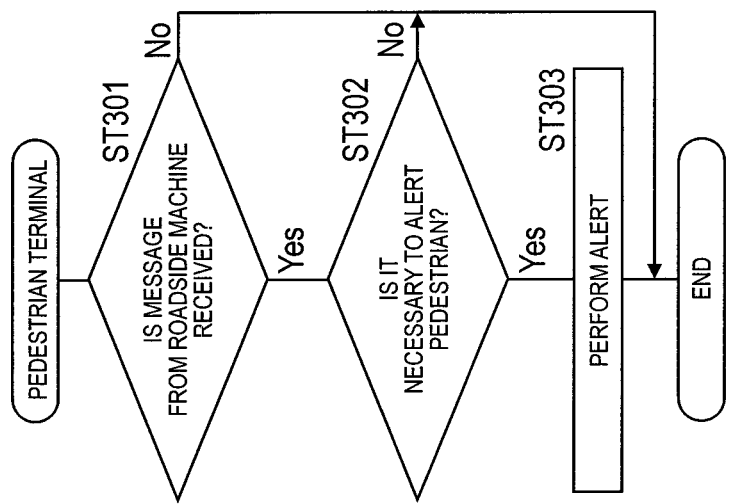
FIG. 11C is a flowchart illustrating an operation procedure related to stalking in pedestrian terminal 1 and roadside machine 5 according to the first exemplary embodiment.

Next, an operation procedure related to the stalking in pedestrian terminal 1 and roadside machine 5 according to the first exemplary embodiment will be described. FIGS. 11A to 11C are flowcharts illustrating operation procedures of pedestrian terminal 1 and roadside machine 5. FIG. 12A to FIG. 12D are descriptive diagrams illustrating one example of the pedestrian information included in the message and the pedestrian information accumulated as the passage history information.

As illustrated in FIG. 11A, the operation procedure of pedestrian terminal 1 is the same as the operation procedure in the case of the kidnapping (refer to FIG. 5A). In addition, as illustrated in FIG. 12A, a content of the message transmitted to roadside machine 5 from pedestrian terminal 1 is the same as the content of the message in the case of the kidnapping (refer to FIG. 6A).

As illustrated in FIG. 11B, in roadside machine 5, in a case where the message transmitted from pedestrian terminal 1 is received by ITS communicator 41 (Yes in ST201), the pedestrian information included in the message is accumulated in storage 44 as the passage history information (ST202). At this point, as illustrated in FIG. 12B and FIG. 12C, the pedestrian information accumulated in storage 44 as the passage history information includes each information of the time, the terminal ID (pedestrian ID) of pedestrian terminal 1, the position (the latitude and the longitude) of pedestrian terminal 1, the speed, and the azimuth and the subsidiary information.

Next, person detector 51 determines whether or not a person (suspicious person) not having a passage history within the predetermined period (for example, one week) in the past is present in the communication area of roadside machine 5 based on the pedestrian information of each person in the passage history information (ST203). In a case where the person not having a passage history is present (Yes in ST203), a warning flag is set as the subsidiary information in the pedestrian information of the corresponding person in the passage history information of storage 44 (ST204).

Next, abnormality detector 52 monitors the person for which the warning flag is set, and determines whether or not the person as the monitoring target is in a state of tailing another person, that is, a state of moving like following another person (ST231).

In a case where the person as the monitoring target is in a state of tailing another person (Yes in ST231), it is determined that the stalking occurs, and a transition is made to ST206. Meanwhile, in a case where the person as the monitoring target is not in a state of tailing another person (No in ST231), next, a determination as to whether or not the person as the monitoring target is in a state of ambushing another person, that is, a state of standing still and not moving on the movement path of another person (ST232). In a case where the person as the monitoring target is in a state of ambushing another person (Yes in ST232), it is determined that the stalking occurs, and a transition is made to ST206.

In ST206, the abnormality detection information that indicates that the stalking is detected as the abnormal event is added to the pedestrian information of the corresponding person in the passage history information of storage 44 (ST206). The example illustrated in FIG. 12B is a case where the tailing is detected. The person of ID1 moves like following after the person of ID2 at a certain distance. In addition, the example illustrated in FIG. 12C is a case where the ambush is detected. The person of ID1 stands still on the path of the person of ID2 and remains still even after passage of the person of ID2.

Next, message controller 53 generates the message including the abnormality detection information that indicates that the stalking is detected as the abnormal event, and transmits the message to nearby pedestrian terminal 1 from ITS communicator 41 (ST207).

At this point, as illustrated in FIG. 12D, the message transmitted to pedestrian terminal 1 from roadside machine 5 includes each information of the time, the roadside machine ID of the host device, the terminal ID of pedestrian terminal 1 of the offender of the stalking, the terminal ID of pedestrian terminal 1 of the victim of the stalking, and the position (the latitude and the longitude) of pedestrian terminal 1 of the victim of the stalking and the abnormality detection information indicating that the abnormal event is the stalking.

In a case where the person not having a passage history is not present (No in ST203), or in a case where the person as the monitoring target is in a state of tailing another person but is not in a state of ambushing the other person (No in ST232), the operation procedure is finished without performing a particular process.

As illustrated in FIG. 11C, the operation procedure of another pedestrian terminal 1 that is present nearby is the same as the operation procedure in the case of the kidnapping (refer to FIG. 5A). In addition, protector terminal 6 is the same as protector terminal 6 in the case of the kidnapping.

Figure 13B:
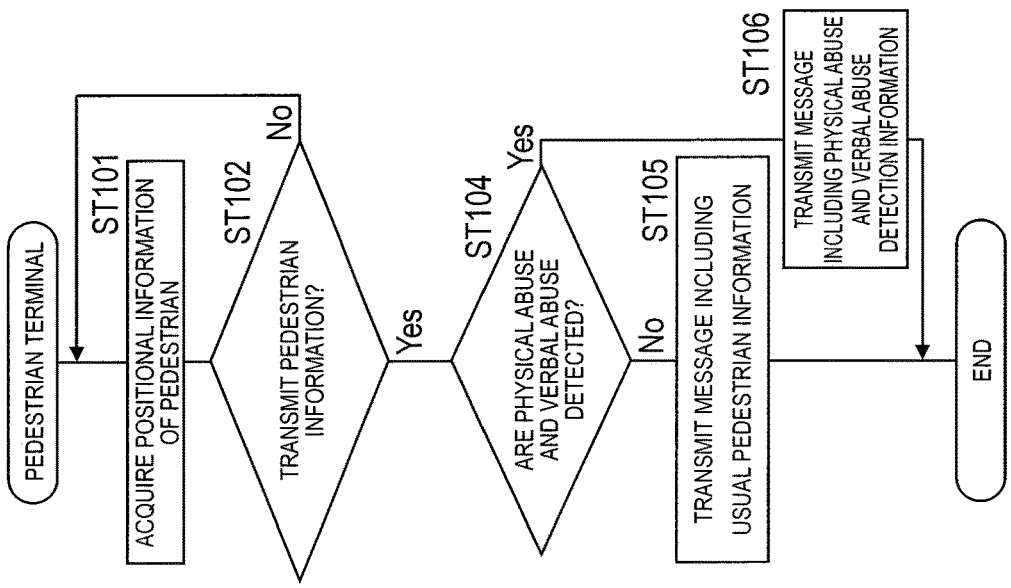
FIG. 13B is a flowchart illustrating an operation procedure related to bullying in pedestrian terminal 1 and roadside machine 5 according to the first exemplary embodiment.
Figure 13A:
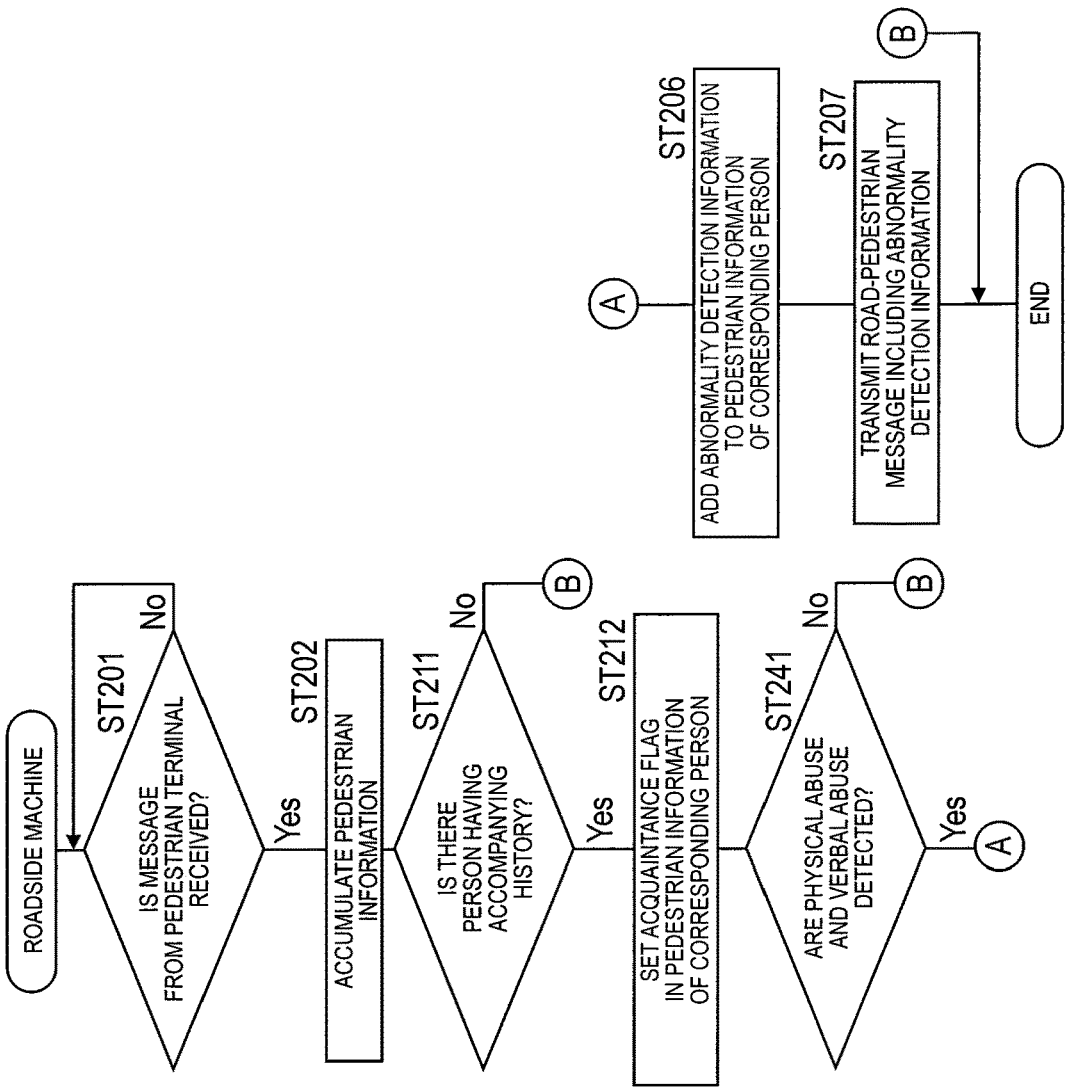
FIG. 13A is a flowchart illustrating an operation procedure related to bullying in pedestrian terminal 1 and roadside machine 5 according to the first exemplary embodiment.
Figure 13C:
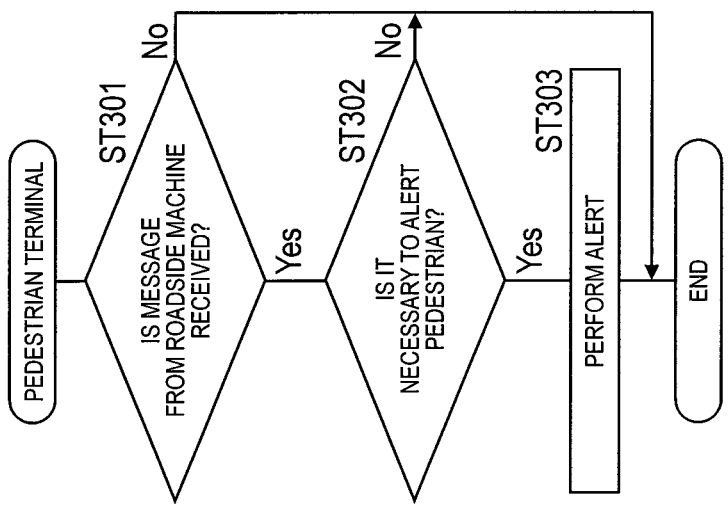
FIG. 13C is a flowchart illustrating an operation procedure related to bullying in pedestrian terminal 1 and roadside machine 5 according to the first exemplary embodiment.

Next, an operation procedure related to the bullying (physical abuse and verbal abuse) in pedestrian terminal 1 and roadside machine 5 according to the first exemplary embodiment will be described. FIGS. 13A to 13C are flowcharts illustrating operation procedures of pedestrian terminal 1 and roadside machine 5. FIG. 14A to FIG. 14F are descriptive diagrams illustrating one example of the pedestrian information included in the message and the pedestrian information accumulated as the passage history information.

As illustrated in FIG. 13A, in pedestrian terminal 1, position measurer 11 acquires the positional information of the host pedestrian (ST101). Message controller 31 determines whether or not to transmit the pedestrian information based on the positional information of the host pedestrian (ST102). In a case of transmitting the pedestrian information (Yes in ST102), next, physical abuse and verbal abuse detector 35 determines whether or not the physical abuse or the verbal abuse is detected (ST104).

In a case where the physical abuse or the verbal abuse is not detected (No in ST104), message controller 31 transmits the message including usual pedestrian information to roadside machine 5 from ITS communicator 13 (ST105). At this point, as illustrated in FIG. 14A and FIG. 14B, the message transmitted to roadside machine 5 from pedestrian terminal 1 includes, as the usual pedestrian information, each information of the time, the terminal ID, the position (the latitude and the longitude) of pedestrian terminal 1, the speed, and the azimuth.

Meanwhile, in a case where the physical abuse or the verbal abuse is detected (Yes in ST104), message controller 31 transmits the message that includes physical abuse and verbal abuse detection information in addition to the usual pedestrian information to roadside machine 5 from ITS communicator 13 (ST106). The physical abuse and verbal abuse detection information indicates that the physical abuse or the verbal abuse is detected. At this point, as illustrated in FIG. 14C, the message transmitted to roadside machine 5 from pedestrian terminal 1 includes, in addition to the usual pedestrian information, the physical abuse and verbal abuse detection information as the subsidiary information indicating that the physical abuse or the verbal abuse is detected.

As illustrated in FIG. 13B, in roadside machine 5, in a case where the message transmitted from pedestrian terminal 1 is received by ITS communicator 41 (Yes in ST201), the pedestrian information included in the message is accumulated in storage 44 as the passage history information (ST202). At this point, as illustrated in FIG. 14D and FIG. 14E, the pedestrian information accumulated in storage 44 as the passage history information includes each information of the time, the terminal ID (pedestrian ID) of pedestrian terminal 1, the position (the latitude and the longitude) of pedestrian terminal 1, the speed, and the azimuth and the subsidiary information.

Next, person detector 51 determines whether or not a person (a person in an acquaintance relationship) having an accompanying history within the predetermined period (for example, one week) in the past is present in the communication area of roadside machine 5 based on the pedestrian information of each person in the passage history information (ST211). In a case where the person having an accompanying history is present (Yes in ST211), an acquaintance flag is set as the subsidiary information in the pedestrian information of the corresponding person in the passage history information of storage 44 (ST212). The example illustrated in FIG. 14D is the passage history information in the past. The person of ID1 and the person of ID2 accompany each other, and the acquaintance flag is set for the two persons.

Next, abnormality detector 52 monitors a plurality of persons for which the acquaintance flag is set, and determines whether or not the physical abuse or the verbal abuse is detected by pedestrian terminal 1 of any of the plurality of persons as the monitoring target (ST241). At this point, a determination as to whether or not the physical abuse and verbal abuse detection information is present in the pedestrian information of the plurality of persons as the monitoring target in the passage history information is performed. The example illustrated in FIG. 14E is the most recent passage history information. The physical abuse or the verbal abuse is detected for the person of ID2.

In a case where the physical abuse or the verbal abuse is detected (Yes in ST241), it is determined that the bullying occurs, and the abnormality detection information that indicates that the bullying is detected as the abnormal event is added to the pedestrian information of the corresponding person in the passage history information of storage 44 (ST206).

Next, message controller 53 generates the message including the abnormality detection information that indicates that the bullying is detected as the abnormal event, and transmits the message to nearby pedestrian terminal 1 from ITS communicator 41 (ST207).

At this point, as illustrated in FIG. 14F, the message transmitted to pedestrian terminal 1 from roadside machine 5 includes each information of the time, the roadside machine ID of the host device, the pedestrian ID of the offender of the bullying, the pedestrian ID of the victim of the bullying, and the position (the latitude and the longitude) of pedestrian terminal 1 of the victim of the bullying and the abnormality detection information as the subsidiary information indicating that the abnormal event is the bullying.

As illustrated in FIG. 13C, the operation procedure of another pedestrian terminal 1 that is present nearby is the same as the operation procedure in the case of the kidnapping (refer to FIG. 5A). In addition, protector terminal 6 is the same as protector terminal 6 in the case of the kidnapping.

Figure 15:
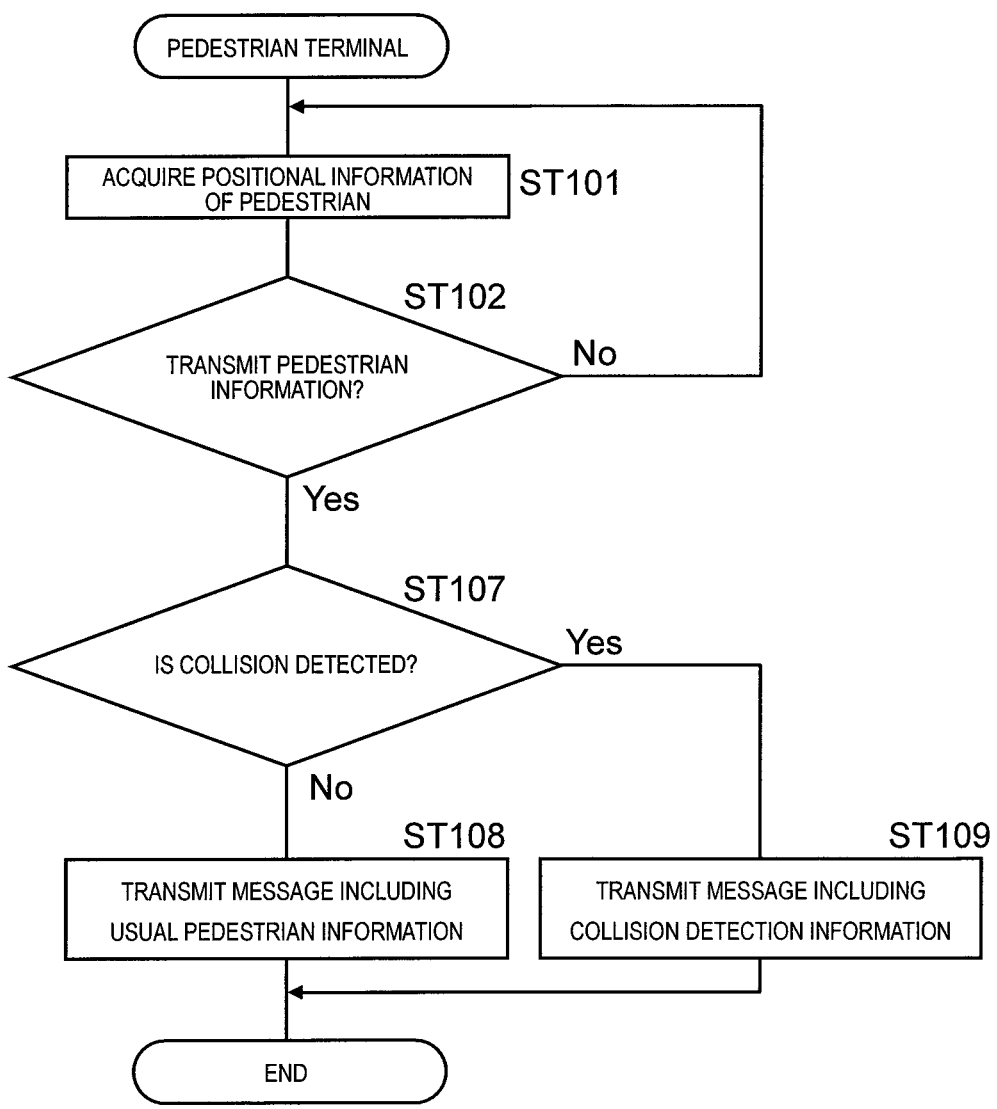
FIG. 15 is a flowchart illustrating an operation procedure related to hit-and-run in pedestrian terminal 1 according to the first exemplary embodiment.
Figure 16B:
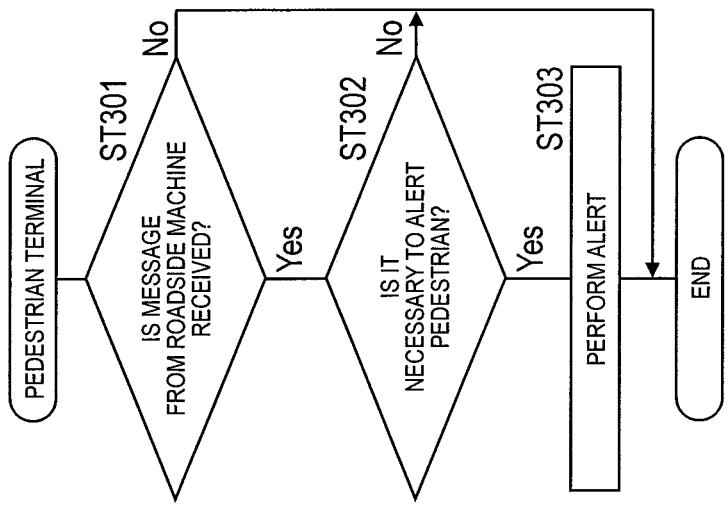
FIG. 16B is a flowchart illustrating an operation procedure related to hit-and-run in pedestrian terminal 1 and roadside machine 5 according to the first exemplary embodiment.
Figure 16A:
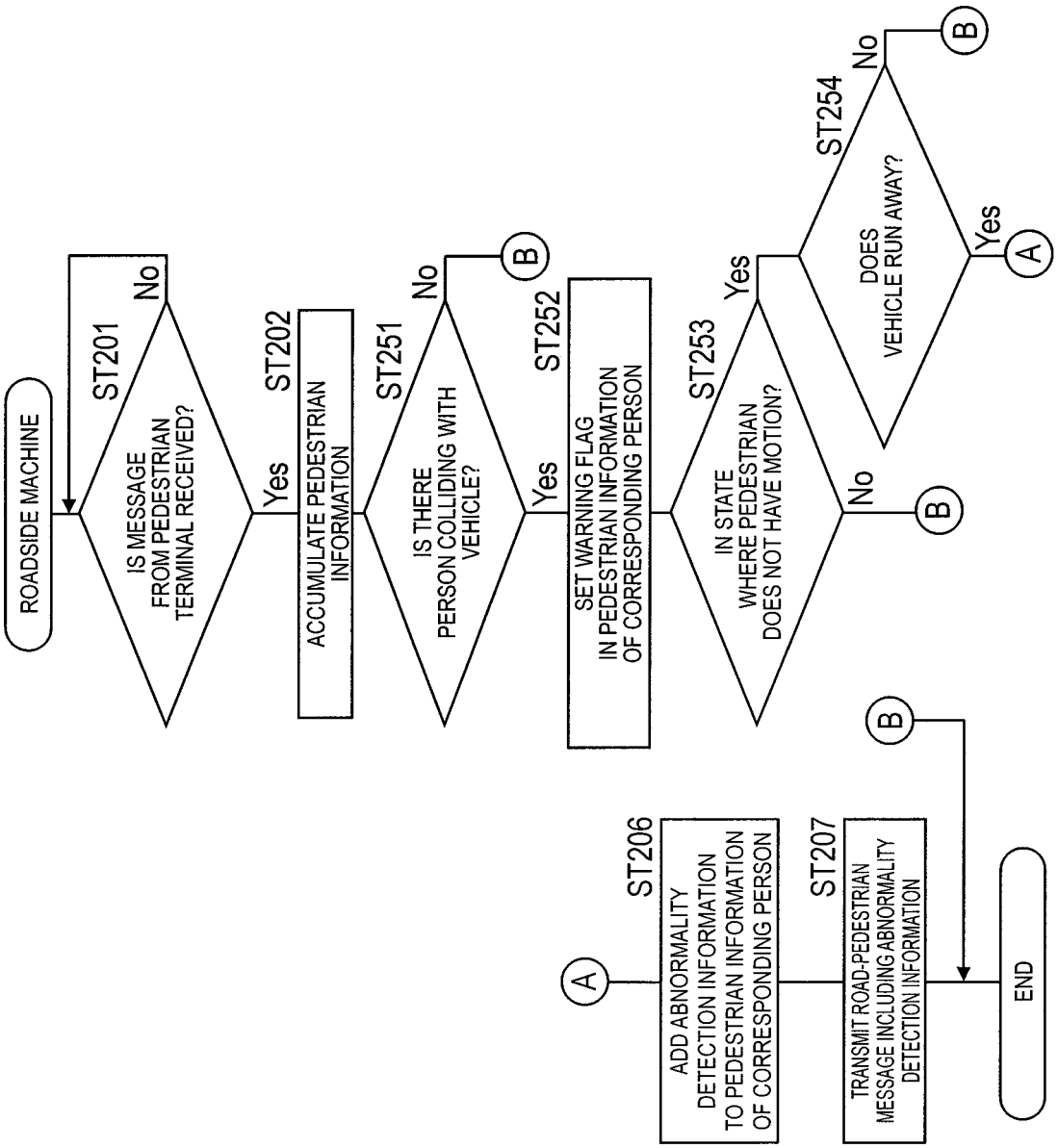
FIG. 16A is a flowchart illustrating an operation procedure related to hit-and-run in pedestrian terminal 1 and roadside machine 5 according to the first exemplary embodiment.

Next, an operation procedure related to the hit-and-run in pedestrian terminal 1 and roadside machine 5 according to the first exemplary embodiment will be described. FIG. 15, FIG. 16A, and FIG. 16B are flowcharts illustrating operation procedures of pedestrian terminal 1 and roadside machine 5.

As illustrated in FIG. 15, in pedestrian terminal 1, position measurer 11 acquires the positional information of the host pedestrian (ST101). Message controller 31 determines whether or not to transmit the pedestrian information based on the positional information of the host pedestrian (ST102). In a case of transmitting the pedestrian information (Yes in ST102), next, collision detector 36 determines whether or not the collision is detected (ST107). Collision detector 36 determines that the collision is detected in a case where the acceleration detected by acceleration sensor 21 is greater than or equal to a predetermined acceleration after danger determiner 32 determines that there is a danger of collision between the vehicle and the host pedestrian.

In a case where the collision is not detected (No in ST107), message controller 31 transmits the message including usual pedestrian information to roadside machine 5 from ITS communicator 13 (ST108).

Meanwhile, in a case where the collision is detected (Yes in ST107), message controller 31 transmits the message including the collision detection information in the subsidiary information in addition to the usual pedestrian information to roadside machine 5 from ITS communicator 13 (ST109). The collision detection information indicates that the collision is detected.

As illustrated in FIG. 16A, in roadside machine 5, in a case where the message transmitted from pedestrian terminal 1 is received by ITS communicator 41 (Yes in ST201), the pedestrian information included in the message is accumulated in storage 44 as the passage history information (ST202).

Next, person detector 51 determines whether or not a person who collides with the vehicle is present based on the pedestrian information of each person in the passage history information (ST251). In a case where the person colliding with the vehicle is present (Yes in ST251), a warning flag is set as the subsidiary information in the pedestrian information of the corresponding person in the passage history information of storage 44 (ST252).

Next, abnormality detector 52 monitors the person for which the warning flag is set, that is, the person colliding with the vehicle, and determines whether or not the person as the monitoring target does not have a motion (a change in positional information) continuously for a predetermined amount of time or longer (ST253).

In a case where the person as the monitoring target does not have a motion continuously for the predetermined amount of time or longer (Yes in ST253), next, a determination as to whether or not the vehicle causing a collision accident runs away from a scene is performed (ST254). This determination is performed based on the positional information included in the message received from the on-vehicle terminal.

In a case where the vehicle causing the collision accident runs away from the scene (Yes in ST254), it is determined that the hit-and-run occurs, and the abnormality detection information that indicates that the hit-and-run is detected as the abnormal event is added to the pedestrian information of the corresponding person in the passage history information of storage 44 (ST206).

Next, message controller 53 generates the message including the abnormality detection information that indicates that the hit-and-run is detected as the abnormal event, and transmits the message to nearby pedestrian terminal 1 from ITS communicator 41 (ST207).

As illustrated in FIG. 16B, the operation procedure of another pedestrian terminal 1 that is present nearby is the same as the operation procedure in the case of the kidnapping (refer to FIG. 5A). In addition, protector terminal 6 is the same as protector terminal 6 in the case of the kidnapping. Besides, a request for dispatching an ambulance or a police officer to the scene may be made by notifying the detection of the hit-and-run to a fire station or a police station.

In addition, in a case where the person colliding with the vehicle is present (Yes in ST251), the abnormality detection information that indicates that a traffic accident is detected may be added to the pedestrian information of the corresponding person as the subsidiary information in the passage history information of storage 44, and a notification of the message including the abnormality detection information indicating that the traffic accident is detected may be given to nearby pedestrian terminal 1 or the protector terminal, the fire station, or the police station. In addition, the determination as to whether or not the person colliding with the vehicle does not have a motion (ST253) may be omitted, and a case where the vehicle runs away may be detected as the hit-and-run regardless of the motion of the person.

In the present exemplary embodiment, roadside machine 5 performs abnormality detection. Alternatively, a management server connected to roadside machine 5 through a network of the Internet or the like may be disposed. The management server may perform the abnormality detection by collecting information from a plurality of roadside machines 5 and accumulating the pedestrian information included in the received messages.

Second Exemplary Embodiment

Figure 17:
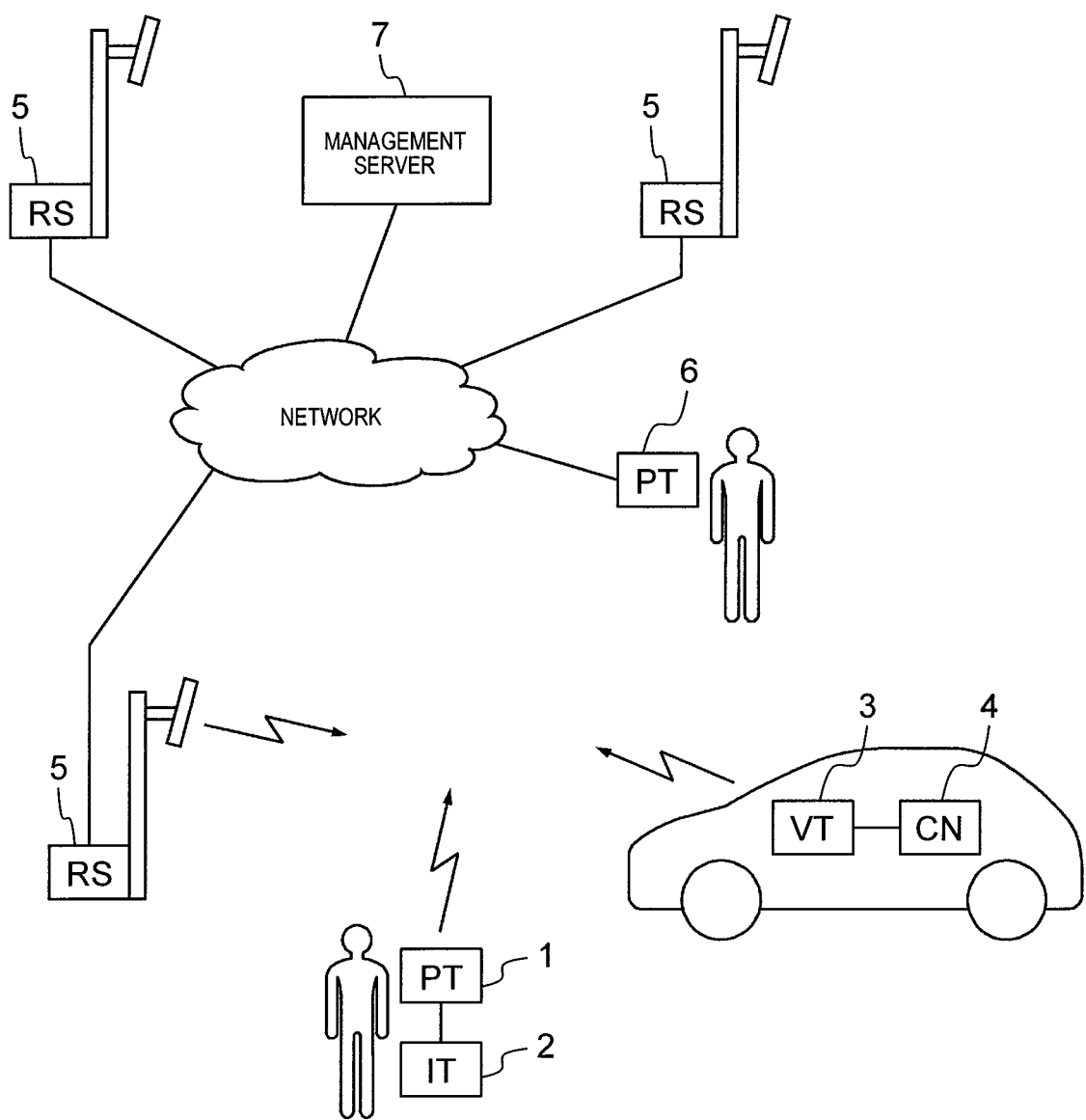
FIG. 17 is an overall configuration diagram of a communication system according to a second exemplary embodiment.

Next, a second exemplary embodiment will be described. Points not particularly mentioned here are the same as the above exemplary embodiment. FIG. 17 is an overall configuration diagram of a communication system according to the second exemplary embodiment.

In the present exemplary embodiment, a situation at a time of occurrence of an abnormality in the past is reconstructed based on the passage history information accumulated in roadside machine 5. Accordingly, a manager can check the situation at the time of occurrence of the abnormality in the past afterward. Particularly, in the present exemplary embodiment, management server 7 that manages the abnormal event detected by roadside machine 5 is disposed. Management server 7 is connected to roadside machine 5 through a network of the Internet or the like and reconstructs the situation at the time of occurrence of the abnormality in the past by collecting the passage history information from a plurality of roadside machines 5.

Figure 18:
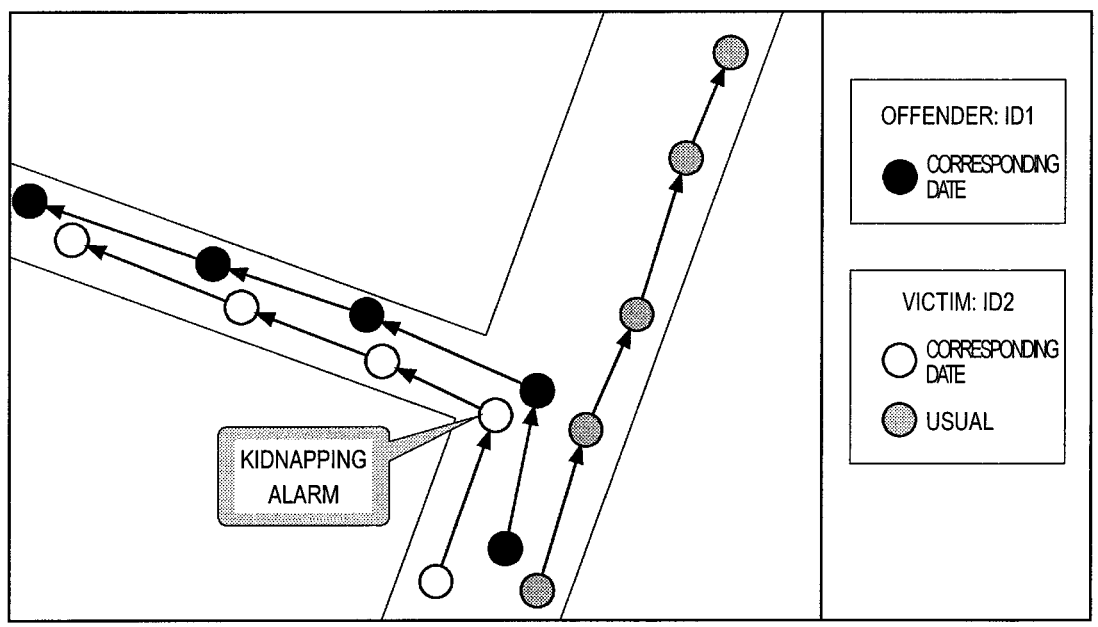
FIG. 18 is a descriptive diagram illustrating an abnormality reconstruction screen displayed on management server 7 according to the second exemplary embodiment.

Next, an abnormality reconstruction screen displayed on management server 7 according to the second exemplary embodiment will be described. FIG. 18 is a descriptive diagram illustrating the abnormality reconstruction screen displayed on management server 7.

In the abnormality reconstruction screen, a movement trajectory of a corresponding date and a usual movement trajectory in the past are displayed on a map by arrows that connect circular marks indicating positions of persons at each time. The example illustrated in FIG. 18 is a case where the person (offender) of ID1 kidnaps the person (victim) of ID2, and is a state where the person of ID2 is accompanied by the person of ID1 in the middle of walking along a usual path. In addition, in the abnormality reconstruction screen, a timing (a tooltip of kidnapping alarm) at which the kidnapping is detected is displayed. The manager can check the situation at the time of occurrence of the abnormality in the past using the abnormality reconstruction screen.

Figure 19:
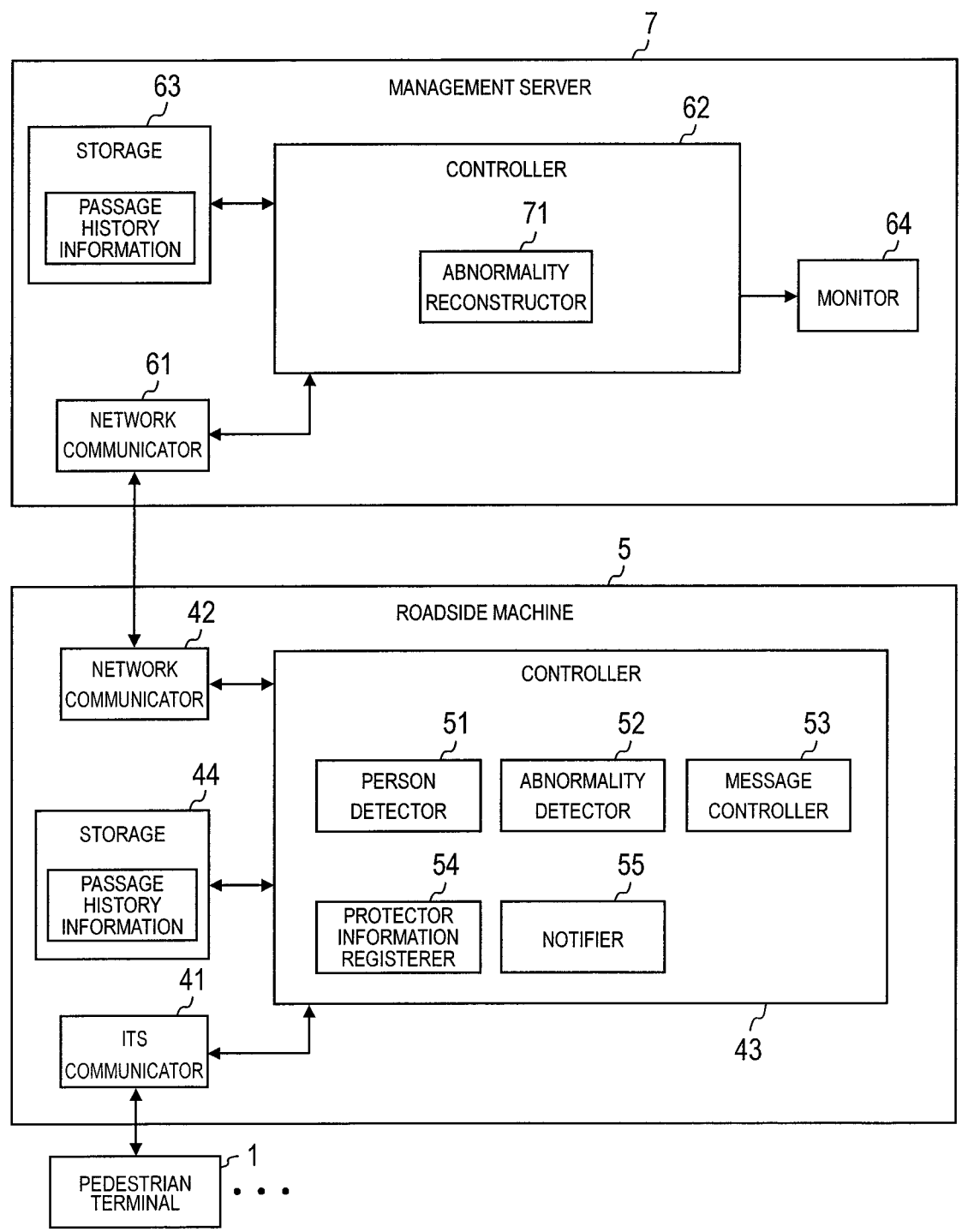
FIG. 19 is a block diagram illustrating schematic configurations of roadside machine 5 and management server 7 according to the second exemplary embodiment.

Next, schematic configurations of roadside machine 5 and management server 7 according to the second exemplary embodiment will be described. FIG. 19 is a block diagram illustrating the schematic configurations of roadside machine 5 and management server 7.

While roadside machine 5 has the same configuration as the first exemplary embodiment (refer to FIG. 4), network communicator 42 communicates with management server 7 through a network of the Internet or the like and transmits the passage history information of storage 44 to management server 7.

Management server 7 includes network communicator 61, controller 62, storage 63, and monitor 64 (display device).

Network communicator 61 communicates with roadside machine 5 through a network of the Internet or the like and receives the passage history information transmitted from roadside machine 5.

Storage 63 stores the passage history information received from roadside machine 5 and a program and the like executed by a processor constituting controller 62.

Controller 62 includes abnormality reconstructor 71. Controller 62 is configured with the processor. Abnormality reconstructor 71 is implemented by causing the processor to execute the program stored in storage 63.

Abnormality reconstructor 71 displays the abnormality reconstruction screen (refer to FIG. 18) on monitor 64 by generating display information of the abnormality reconstruction screen for reconstructing the situation at the time of occurrence of the abnormality in the past based on the passage history information of storage 63, and outputting the display information to monitor 64.

Figure 20A:
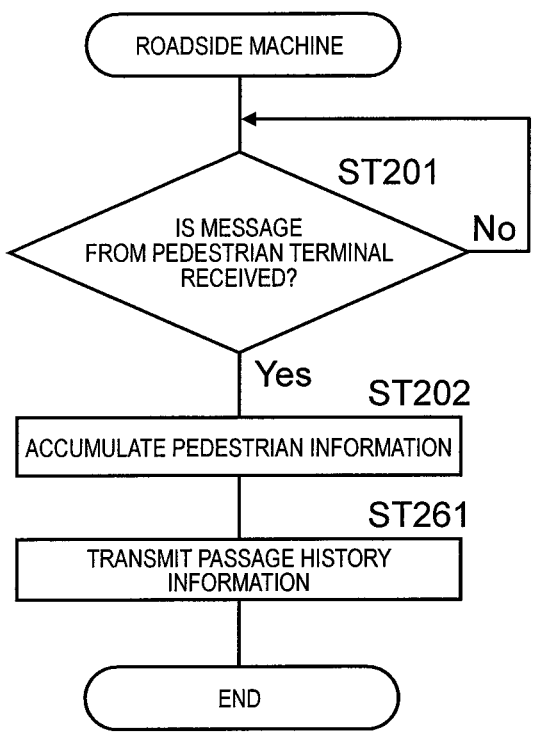
FIG. 20A is a flowchart illustrating an operation procedure of roadside machine 5 and management server 7 according to the second exemplary embodiment.
Figure 20B:
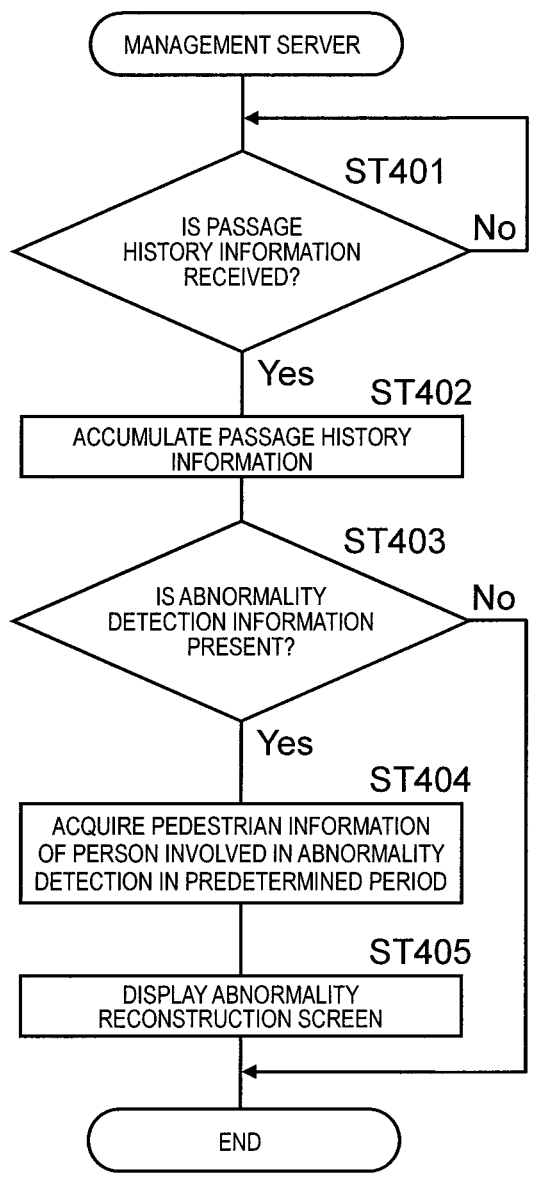
FIG. 20B is a flowchart illustrating an operation procedure of roadside machine 5 and management server 7 according to the second exemplary embodiment.

Next, operation procedures of roadside machine 5 and management server 7 according to the second exemplary embodiment will be described. FIG. 20A and FIG. 20B are flowcharts illustrating the operation procedures of roadside machine 5 and management server 7. FIG. 21 is a descriptive diagram illustrating one example of the passage history information accumulated in management server 7.

As illustrated in FIG. 20A, in roadside machine 5, in a case where the message transmitted from pedestrian terminal 1 is received by ITS communicator 41 (Yes in ST201), the pedestrian information included in the message is accumulated in storage 44 as the passage history information (ST202). The passage history information accumulated in the storage is transmitted to management server 7 from network communicator 42 at an appropriate timing (ST261).

As illustrated in FIG. 20B, in management server 7, in a case where network communicator 61 receives the passage history information transmitted from at least one roadside machine 5 (Yes in ST401), the passage history information is accumulated in storage 63 (ST402). At this point, as illustrated in FIG. 21, the passage history information received from roadside machine 5 includes the pedestrian information received from pedestrian terminal 1 and the roadside machine information generated by roadside machine 5.

Next, abnormality reconstructor 71 determines whether or not the roadside machine information including the abnormality detection information that indicates that the abnormal event occurs is present in the passage history information of storage 63 (ST403). In a case where the roadside machine information including the abnormality detection information is present (Yes in ST403), the roadside machine information and the pedestrian information of persons involved in the abnormality detection, that is, the pedestrian information of the victim and the offender, from the pedestrian information in the past before the abnormality detection are acquired as abnormality description information (ST404).

The example illustrated in FIG. 21 is a case where the person of ID2 kidnaps the person of ID1. The persons (the person of ID1 and the person of ID2) involved in the abnormality detection are specified from the roadside machine information including the abnormality detection information (kidnapping), and the pedestrian information of the involved persons is extracted.

In the abnormality description information, the pedestrian information includes each information of the time, the pedestrian ID, a position (a latitude and a longitude) of the pedestrian, the speed, and the azimuth and the subsidiary information. The subsidiary information includes the terminal ID (warning ID) of pedestrian terminal 1 of the offender (the person for which the warning flag is set). Meanwhile, the roadside machine information includes each information of the time, the roadside machine ID of roadside machine 5, the warning ID, the terminal ID of pedestrian terminal 1 of the victim, and the position (the latitude and the longitude) of pedestrian terminal 1 of the victim and the subsidiary information. The subsidiary information includes the abnormality detection information (kidnapping).

Next, abnormality reconstructor 71 displays the abnormality reconstruction screen on monitor 64 by generating the display information of the abnormality reconstruction screen displaying a trajectory of the involved persons and a crime location on the map based on the pedestrian information of the involved persons (the offender and the victim) and outputting the display information to monitor 64 (ST405).

Third Exemplary Embodiment

Next, a third exemplary embodiment will be described. Points not particularly mentioned here are the same as the above exemplary embodiment.

In the present exemplary embodiment, the occurrence of the abnormal event is predicted, and a notification of the prediction of the abnormal event is given to the nearby pedestrian or the protector at a remote location. Accordingly, the abnormal event can be prevented in advance. Particularly, in the present exemplary embodiment, management server 7 that manages the abnormal event detected by roadside machine 5 is disposed in the same manner as the second exemplary embodiment. Management server 7 predicts the occurrence of the abnormal event by collecting the passage history information from the plurality of roadside machines 5.

Figure 22:
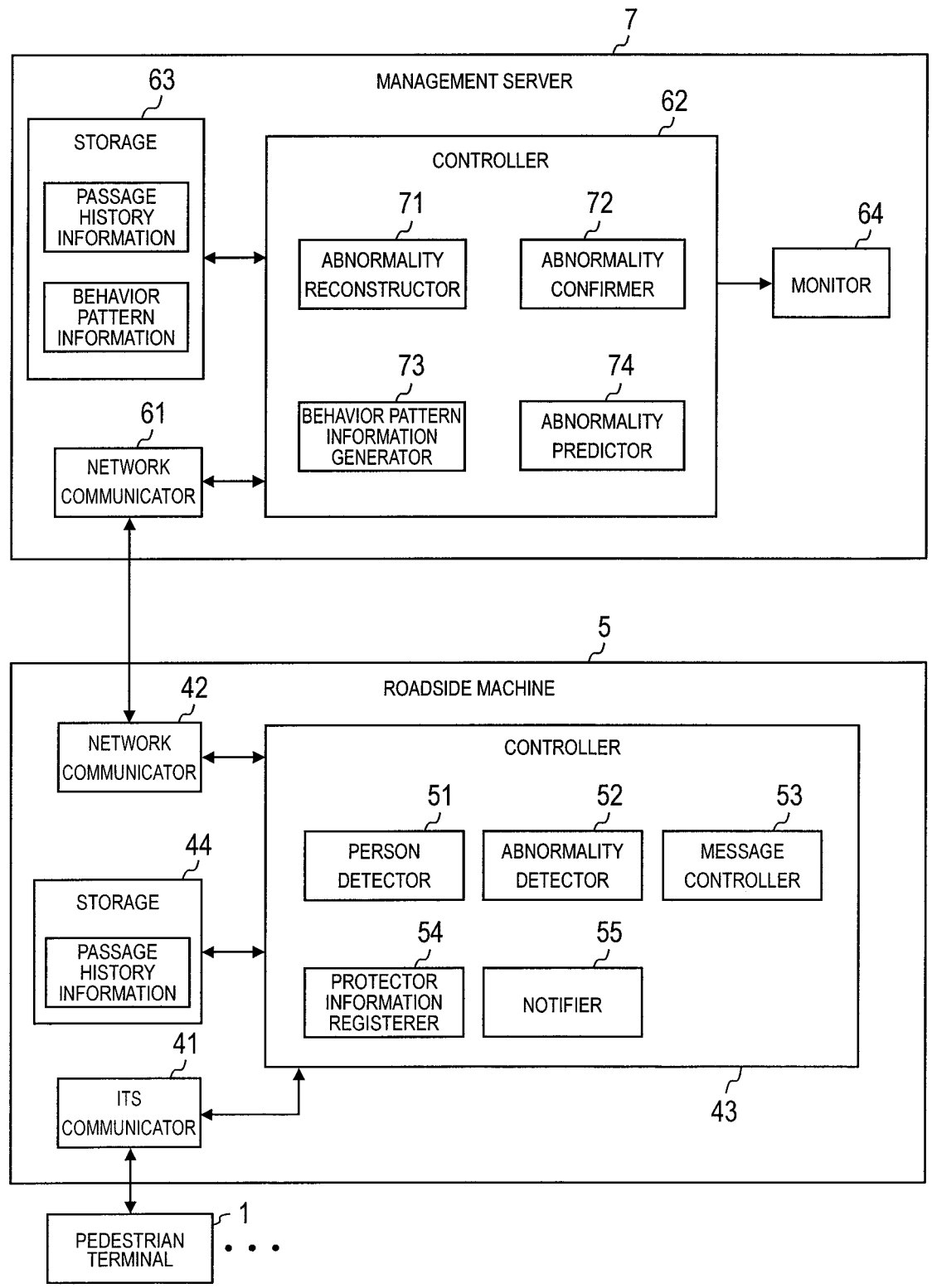
FIG. 22 is a block diagram illustrating schematic configurations of roadside machine 5 and management server 7 according to a third exemplary embodiment.

Next, schematic configurations of roadside machine 5 and management server 7 according to the third exemplary embodiment will be described. FIG. 22 is a block diagram illustrating the schematic configurations of roadside machine 5 and management server 7.

Roadside machine 5 has the same configuration as the second exemplary embodiment (refer to FIG. 19).

While management server 7 has approximately the same configuration as the second exemplary embodiment (refer to FIG. 19), storage 63 stores behavior pattern information for predicting the occurrence of the abnormal event in addition to the passage history information.

In addition, controller 62 includes abnormality confirmer 72, behavior pattern information generator 73, and abnormality predictor 74 in addition to abnormality reconstructor 71.

Abnormality confirmer 72 confirms the occurrence of the abnormal event in a case where the manager who checks the occurrence of the abnormal event on the abnormality reconstruction screen (refer to FIG. 18) displayed by abnormality reconstructor 71 performs an approval operation. The passage history information (the pedestrian information and the roadside machine information) in a predetermined period in the past backward from a timing at which the abnormal event occurs is acquired as the abnormality description information that indicates the situation at the time of occurrence of the abnormality.

Behavior pattern information generator 73 generates behavior pattern information related to characteristics of behaviors of the involved persons until the occurrence of the abnormal event by categorizing (patterning) the pedestrian information of the involved persons (the offender and the victim) included in the abnormality description information. For example, in the case of the kidnapping, the offender tails the victim before committing a crime. Thus, a walking speed at a time of tailing or an interval or the like between the offender and the victim is acquired as the behavior pattern information.

Abnormality predictor 74 monitors the current situation of the pedestrian passing nearby roadside machine 5 based on the most recent pedestrian information acquired from pedestrian terminal 1 through roadside machine 5 and the behavior pattern information. In a case where the current situation of the pedestrian corresponds to a behavior pattern, abnormality predictor 74 determines that there is a high possibility of occurrence of the abnormal event.

Next, operation procedures of roadside machine 5, management server 7, and pedestrian terminal 1 according to the third exemplary embodiment will be described. FIG. 23A, FIG. 23B, and FIG. 24A to FIG. 24C are flowcharts illustrating the operation procedures of roadside machine 5, management server 7, and pedestrian terminal 1. FIG. 25A and FIG. 25B are descriptive diagrams illustrating one example of the passage history information (abnormality description information) accumulated in management server 7 and the roadside machine information included in the message.

Figure 23A:
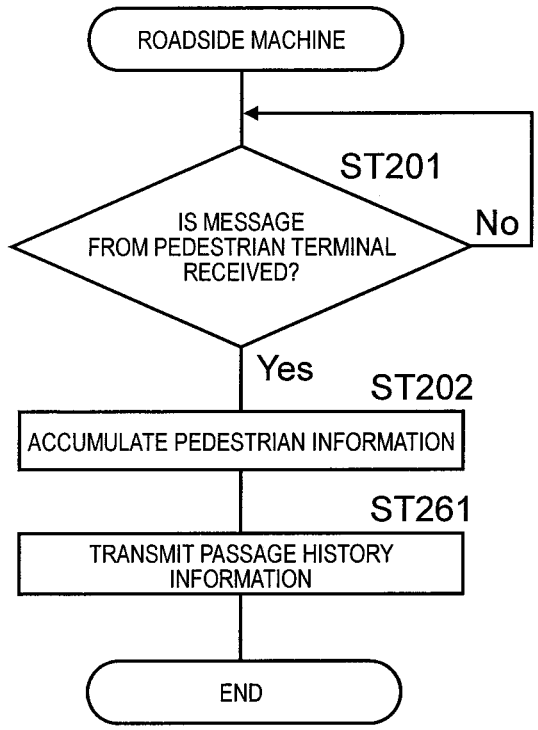
FIG. 23A is a flowchart illustrating an operation procedure of roadside machine 5, management server 7, and pedestrian terminal 1 according to the third exemplary embodiment.

As illustrated in FIG. 23A, roadside machine 5 has the same operation procedure as the second exemplary embodiment (refer to FIG. 20A).

Figure 23B:
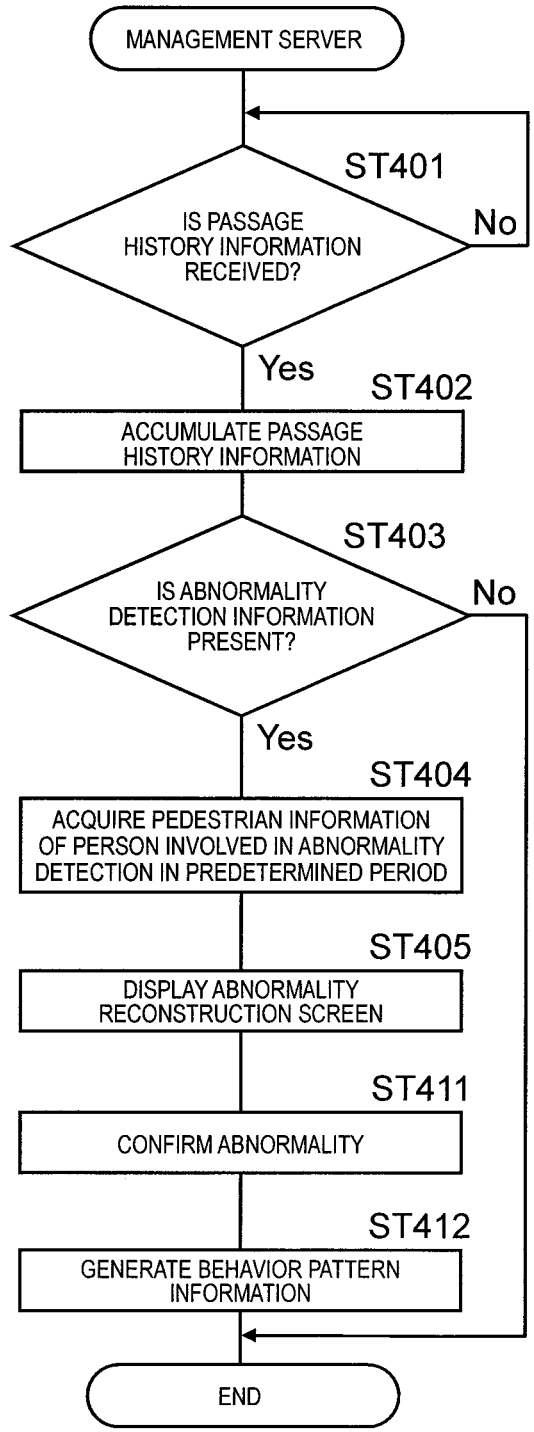
FIG. 23B is a flowchart illustrating an operation procedure of roadside machine 5, management server 7, and pedestrian terminal 1 according to the third exemplary embodiment.

As illustrated in FIG. 23B, in management server 7, each process of ST401 to ST405 is performed in the same manner as the second exemplary embodiment (refer to FIG. 20B).

Next, in a case where the manager who checks the occurrence of the abnormal event on the abnormality reconstruction screen (refer to FIG. 18) performs the approval operation, abnormality confirmer 72 confirms that the abnormal event occurs (ST411). The passage history information (the pedestrian information and the roadside machine information) in a predetermined period in the past backward from a timing at which the abnormal event occurs is acquired as the abnormality description information. At this point, as illustrated in FIG. 25A, the abnormality description information includes the pedestrian information and the roadside machine information in the same manner as the second exemplary embodiment (refer to FIG. 21).

Next, behavior pattern information generator 73 generates the behavior pattern information related to characteristics of behaviors of the involved persons until the occurrence of the abnormal event by categorizing (patterning) the pedestrian information of the involved persons (the offender and the victim) included in the abnormality description information (ST412).

Figure 24C:
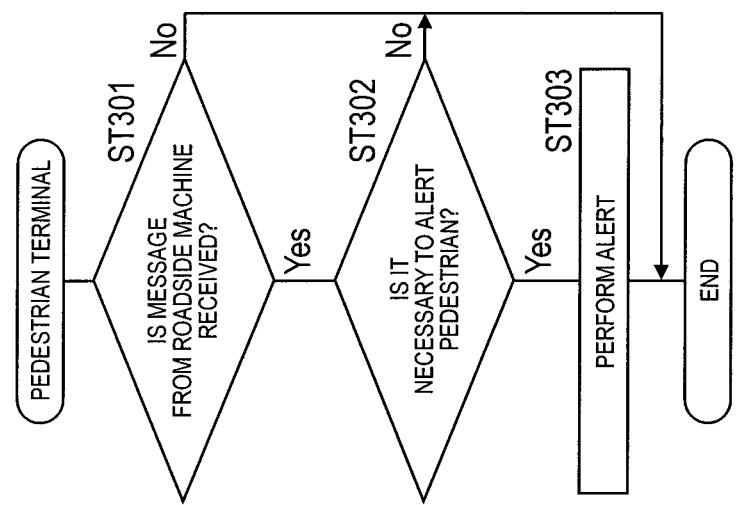
FIG. 24C is a flowchart illustrating an operation procedure of roadside machine 5, management server 7, and pedestrian terminal 1 according to the third exemplary embodiment.
Figure 24B:
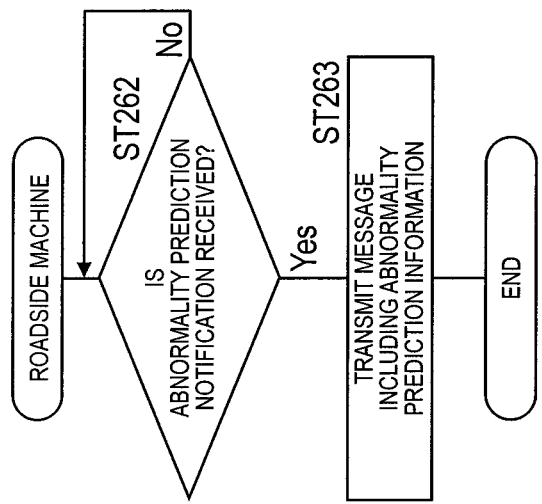
FIG. 24B is a flowchart illustrating an operation procedure of roadside machine 5, management server 7, and pedestrian terminal 1 according to the third exemplary embodiment.
Figure 24A:
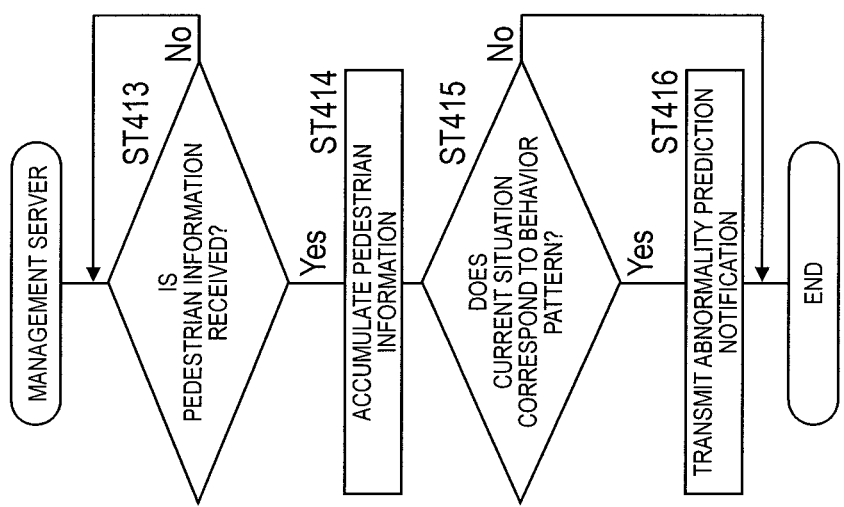
FIG. 24A is a flowchart illustrating an operation procedure of roadside machine 5, management server 7, and pedestrian terminal 1 according to the third exemplary embodiment.

Next, as illustrated in FIG. 24A, in management server 7, in a case where the most recent pedestrian information transmitted from roadside machine 5 is received by network communicator 61 (Yes in ST413), the pedestrian information is accumulated in storage 63 (ST414).

Next, abnormality predictor 74 monitors the current situation of the pedestrian passing nearby roadside machine 5 based on the behavior pattern information and the most recent pedestrian information of storage 63 and determines whether or not the current situation of the pedestrian corresponds to the behavior pattern (ST415).

In a case where the current situation of the pedestrian corresponds to the behavior pattern (Yes in ST415), an abnormality prediction notification that the occurrence of the abnormal event is predicted is transmitted to roadside machine 5 from network communicator 61.

At this point, as illustrated in FIG. 25B, the message transmitted to pedestrian terminal 1 from roadside machine 5 includes each information of the time, the terminal ID of roadside machine 5, the terminal ID (warning ID) of pedestrian terminal 1 of the offender, the terminal ID of pedestrian terminal 1 of the victim, and the position (the latitude and the longitude) of pedestrian terminal 1 of the victim and the subsidiary information. Abnormality prediction information is stored in the subsidiary information.

As illustrated in FIG. 24B, in roadside machine 5, in a case where the abnormality prediction notification transmitted from the management server is received by network communicator 42 (Yes in ST262), the most recent positional information (the latitude and the longitude) of the victim is acquired from the terminal ID of pedestrian terminal 1 of the victim included in the abnormality prediction notification, and message controller 53 transmits the message including the abnormality prediction information to pedestrian terminal 1 from ITS communicator 41 (ST263).

As illustrated in FIG. 24C, in another pedestrian terminal 1 that is present nearby, in a case where the message transmitted from roadside machine 5 is received by ITS communicator 13 (Yes in ST301), alert controller 33 determines whether or not it is necessary to alert the host pedestrian (ST302). In a case where it is necessary to alert the host pedestrian (Yes in ST302), the host pedestrian is alerted to a danger of occurrence of the abnormal event for the host pedestrian or the nearby pedestrian (ST303).

In a case where the message is transmitted to pedestrian terminal 1 from roadside machine 5, the abnormality prediction notification that the occurrence of the abnormal event is predicted is transmitted to protector terminal 6 at the same time. In protector terminal 6, in a case where the abnormality prediction notification transmitted from roadside machine 5 is received, alert indicating a danger for the target person to be watched for is performed.

Fourth Exemplary Embodiment

Figure 26:
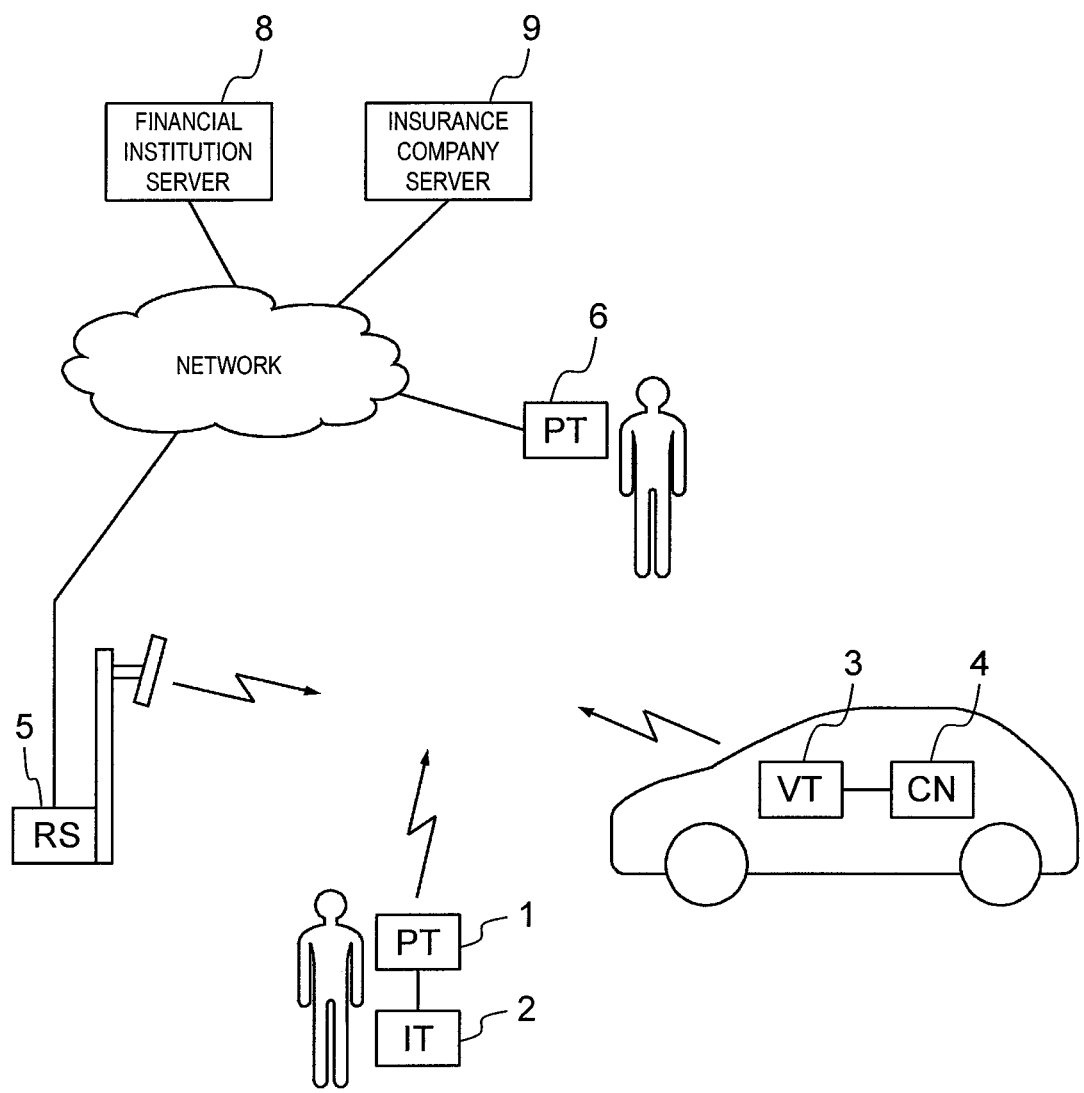
FIG. 26 is an overall configuration diagram of a communication system according to a fourth exemplary embodiment.

Next, a fourth exemplary embodiment will be described. Points not particularly mentioned here are the same as the above exemplary embodiment. FIG. 26 is an overall configuration diagram of a communication system according to the fourth exemplary embodiment.

In the present exemplary embodiment, a registration operation is performed for the user of pedestrian terminal 1 with respect to participation into an abnormality notification service and use of the abnormality notification service. A reward is provided to the user who participates in the abnormality notification service, and a usage fee is collected from the user who uses the abnormality notification service.

Specifically, an information provision fee (for example, 10 yen per month) is paid to a person who cooperates in the abnormality notification service by providing the pedestrian information such as the positional information from pedestrian terminal 1. In addition, a supporter registration fee (for example, 10 yen per month) is paid to a person who registers as a supporter assisting the victim for which the abnormal event occurs. In addition, a support performance fee (for example, 500 yen per action) is paid to the supporter in a case where an action (support) of helping the victim is actually performed. In addition, a service usage fee (for example, 100 yen per month) is collected from a user who receives the abnormality notification service.

Roadside machine 5 can communicate with financial institution server 8 that is installed at a financial institution such as a credit company or a bank through a network of the Internet or the like. Financial institution server 8 performs money transfer (deposit) for payment and money transfer (withdrawal) for collection depending on a request from roadside machine 5.

In addition, in the present exemplary embodiment, various insurance fees are reduced (discounted) depending on the frequency of occurrence of the abnormal event. The insurance fees may be reduced as the frequency of occurrence of the abnormal event is decreased. Roadside machine 5 can communicate with insurance company server 9 that is installed at an insurance company through a network of the Internet or the like. Insurance company server 9 performs a process of reducing (discounting) the insurance fees depending on information from roadside machine 5.

Figure 27:
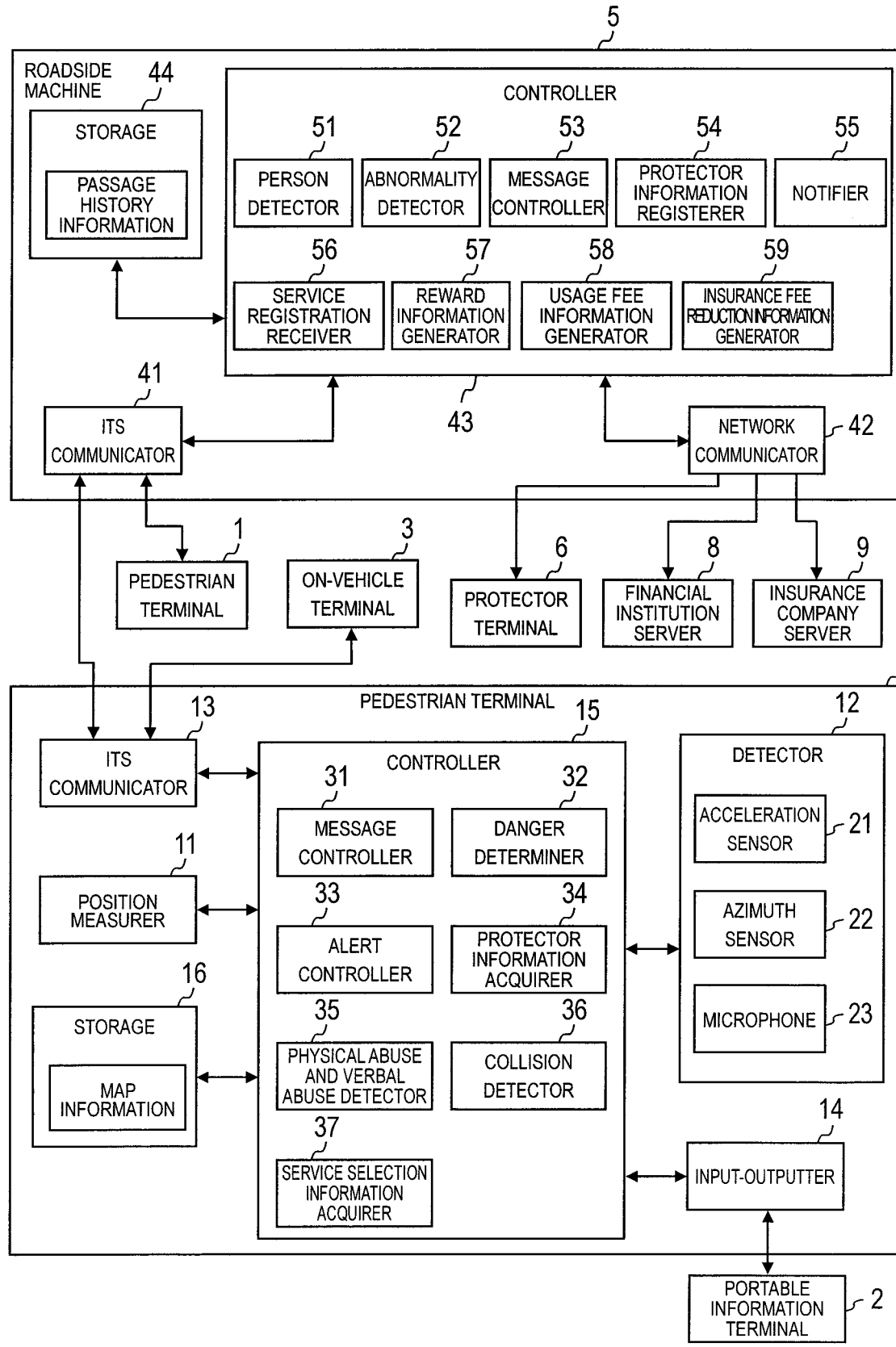
FIG. 27 is a block diagram illustrating schematic configurations of pedestrian terminal 1 and roadside machine 5 according to the fourth exemplary embodiment.

Next, schematic configurations of pedestrian terminal 1 and roadside machine 5 according to the fourth exemplary embodiment will be described. FIG. 27 is a block diagram illustrating the schematic configurations of pedestrian terminal 1 and roadside machine 5.

While pedestrian terminal 1 has approximately the same configuration as the first exemplary embodiment (refer to FIG. 4), controller 15 includes service selection information acquirer 37. Service selection information acquirer 37 causes the user to perform the registration operation related to the participation into the abnormality notification service or the use of the abnormality notification service and acquires service selection information related to the participation and the use of the abnormality notification service. The service selection information is added to the message and is transmitted to roadside machine 5 from ITS communicator 13. A selection operation of the user may be performed in portable information terminal 2.

While roadside machine 5 has approximately the same configuration as the first exemplary embodiment (refer to FIG. 4), network communicator 42 communicates with financial institution server 8 and insurance company server 9.

Controller 43 includes service registration receiver 56, reward information generator 57, usage fee information generator 58, and insurance fee reduction information generator 59.

Service registration receiver 56 receives registration of each user related to the participation into the abnormality notification service and the use of the abnormality notification service based on the service selection information included in the message received from pedestrian terminal 1.

Reward information generator 57 generates reward information related to the payment of the reward for the participation (the information provision and the supporter) into the abnormality notification service. Usage fee information generator 58 generates usage fee information related to the collection of the usage fee for the use of the abnormality notification service. The reward information and the usage fee information are transmitted to financial institution server 8, and financial institution server 8 is requested to perform the money transfer (deposit) for the payment and the money transfer (withdrawal) for the collection.

Insurance fee reduction information generator 59 acquires the frequency of occurrence of the abnormal event based on the passage history information of storage 44 and generates insurance fee reduction information for reducing the insurance fees depending on the frequency. The insurance fee reduction information is transmitted to insurance company server 9, and the insurance company server is requested to reduce the insurance fees.

Next, operation procedures of pedestrian terminal 1 and roadside machine 5 according to the fourth exemplary embodiment will be described. FIG. 28A and FIG. 28B are flowcharts illustrating the operation procedures of pedestrian terminal 1 and roadside machine 5. FIG. 29 is a descriptive diagram illustrating one example of information included in the message.

As illustrated in FIG. 28A, in pedestrian terminal 1, service selection information acquirer 37 causes the user to perform the registration operation related to the participation into the abnormality notification service and the use of the abnormality notification service and acquires the service selection information related to the participation and the use of the abnormality notification service (ST111). Message controller 31 transmits the message including the service selection information to roadside machine 5 from ITS communicator 13 (ST112).

At this point, as illustrated in FIG. 29, the message transmitted to roadside machine 5 from pedestrian terminal 1 includes the time, the terminal ID, and the service selection information including each registration item (the information provision, the use of service, and the supporter).

As illustrated in FIG. 28B, in roadside machine 5, in a case where the message transmitted from pedestrian terminal 1 is received by ITS communicator 41 (Yes in ST271), service registration receiver 56 receives registration of each user related to the participation into the abnormality notification service and the use of the abnormality notification service based on the service selection information included in the message (ST272).

Next, reward information generator 57 generates the reward information related to the payment of the reward for the participation into the abnormality notification service. In addition, usage fee information generator 58 generates the usage fee information related to the collection of the usage fee for the use of the abnormality notification service. In addition, insurance fee reduction information generator 59 acquires the frequency of occurrence of the abnormal event based on the passage history information of storage 44 and generates the insurance fee reduction information for reducing the insurance fees depending on the frequency (ST273).

In the present exemplary embodiment, information related to the reward for the participation into the abnormality notification service and the usage fee of the abnormality notification service is generated in roadside machine 5. Alternatively, a management server may be disposed, and the management server may collect information from roadside machine 5 and generate information related to the reward for the participation into the abnormality notification service and the usage fee of the abnormality notification service.

Fifth Exemplary Embodiment

Next, a fifth exemplary embodiment will be described. Points not particularly mentioned here are the same as the above exemplary embodiment.

In the first exemplary embodiment, roadside machine 5 accumulates the pedestrian information acquired from pedestrian terminal 1 and performs the abnormality detection. However, in the present exemplary embodiment, pedestrian terminal 1 accumulates the pedestrian information acquired from pedestrian terminal 1 present nearby, performs a process of detecting the person as the monitoring target based on the pedestrian information, and transmits a result of person detection to roadside machine 5. Roadside machine 5 performs the abnormality detection based on the result of the person detection of pedestrian terminal 1. Accordingly, even in a case where pedestrian terminal 1 is positioned outside the communication area of roadside machine 5, the pedestrian information can be acquired from pedestrian terminal 1 present nearby, and the person detection can be performed based on the pedestrian information.

Figure 30:
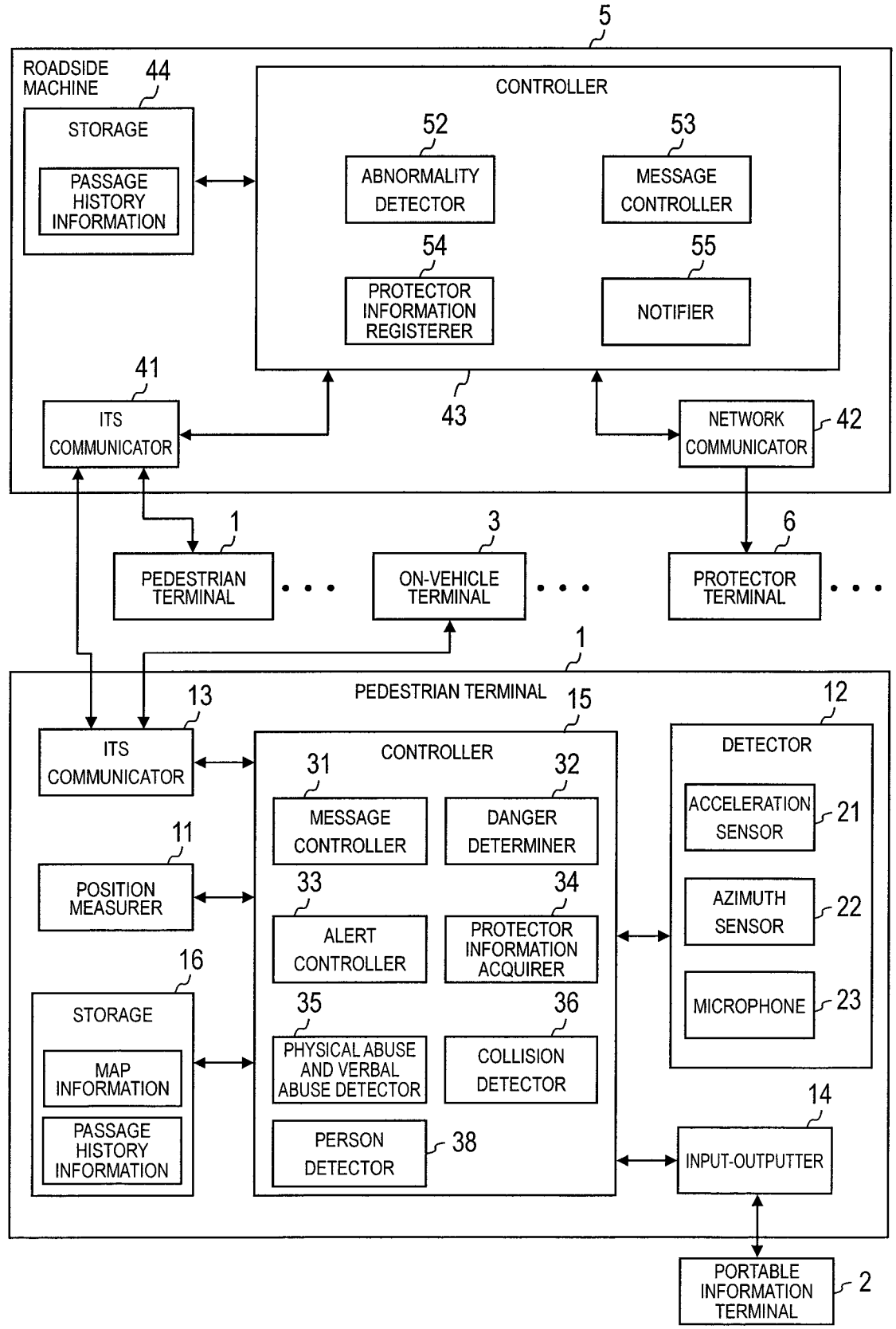
FIG. 30 is a block diagram illustrating schematic configurations of pedestrian terminal 1 and roadside machine 5 according to a fifth exemplary embodiment.

Next, schematic configurations of pedestrian terminal 1 and roadside machine 5 according to the fifth exemplary embodiment will be described. FIG. 30 is a block diagram illustrating the schematic configurations of pedestrian terminal 1 and roadside machine 5.

While pedestrian terminal 1 has approximately the same configuration as the first exemplary embodiment (refer to FIG. 4), storage 16 stores the pedestrian information included in the message received from nearby pedestrian terminal 1 as the passage history information.

Controller 15 includes person detector 38. Person detector 38 detects the person as the monitoring target in a case of detecting the abnormal event of the person by abnormality detector 52 of roadside machine 5 from persons passing nearby the host device based on the passage history information of storage 16.

While roadside machine 5 also has approximately the same configuration as the first exemplary embodiment (refer to FIG. 4), person detector 51 disposed in the first exemplary embodiment is omitted in controller 43, and abnormality detector 52 performs the abnormality detection based on person detection information included in the message transmitted from pedestrian terminal 1.

Next, operation procedures of pedestrian terminal 1 and roadside machine 5 according to the fifth exemplary embodiment will be described. FIG. 31A, FIG. 31B, FIG. 32A, and FIG. 32B are flowcharts illustrating the operation procedures of pedestrian terminal 1 and roadside machine 5. FIG. 33A to FIG. 33E are descriptive diagrams illustrating one example of the pedestrian information included in the message, the passage history information accumulated in roadside machine 5, and the roadside machine information included in the message. An example of the kidnapping will be illustrated here.

Figure 31A:
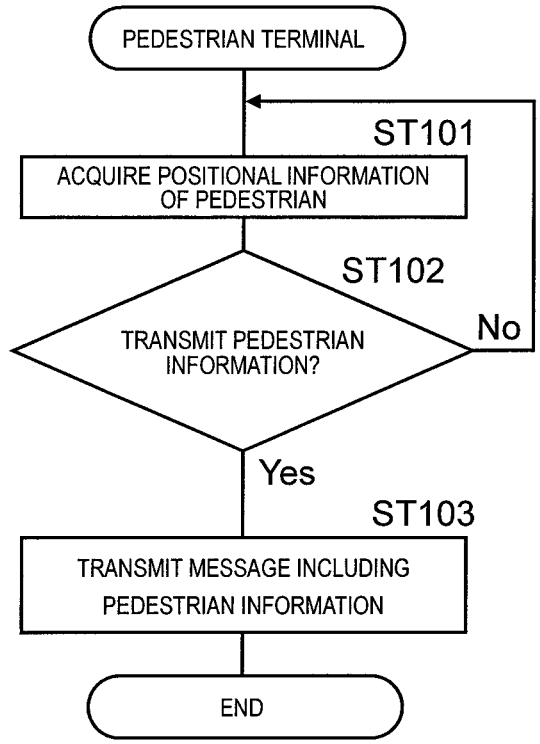
FIG. 31A is a flowchart illustrating an operation procedure of pedestrian terminal 1 and roadside machine 5 according to the fifth exemplary embodiment.

As illustrated in FIG. 31A, in pedestrian terminal 1, position measurer 11 acquires the positional information of the host pedestrian (ST101). Message controller 31 determines whether or not to transmit the pedestrian information based on the positional information of the host pedestrian (ST102). In a case of transmitting the pedestrian information (Yes in ST102), next, the message including the pedestrian information is transmitted from ITS communicator 13.

FIG. 33A to FIG. 33E are descriptive diagrams illustrating one example of the pedestrian information included in the message, the passage history information accumulated in roadside machine 5, and the roadside machine information included in the message.

At this point, as illustrated in FIG. 33A, the message transmitted from pedestrian terminal 1 includes, as the pedestrian information, each information of the time, the terminal ID of pedestrian terminal 1, the position (the latitude and the longitude) of pedestrian terminal 1, the speed, and the azimuth and the subsidiary information.

Figure 31B:
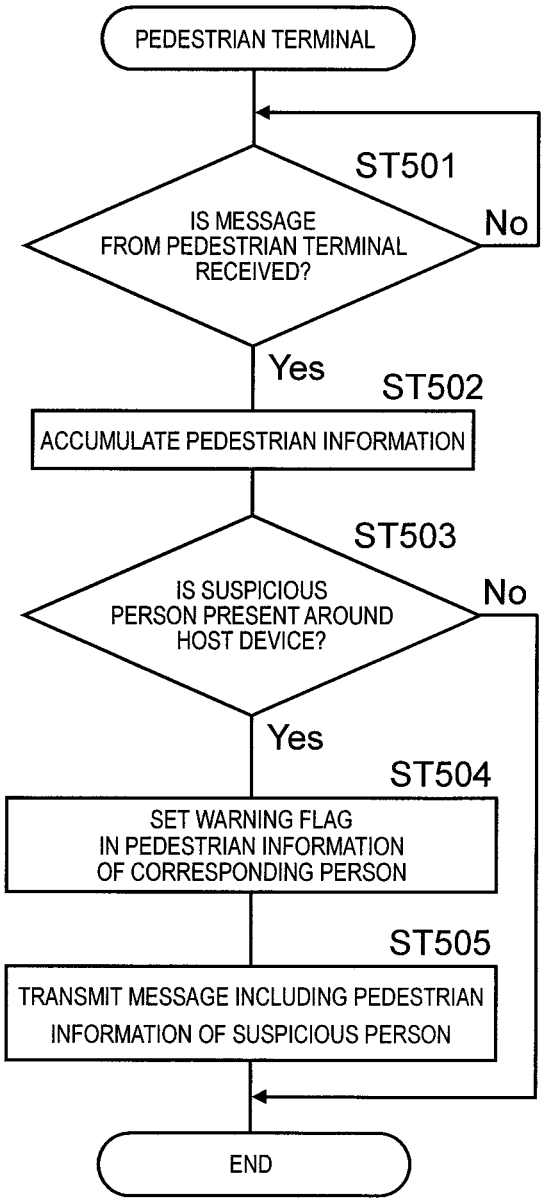
FIG. 31B is a flowchart illustrating an operation procedure of pedestrian terminal 1 and roadside machine 5 according to the fifth exemplary embodiment.

As illustrated in FIG. 31B, in another pedestrian terminal 1, in a case where the message transmitted from another pedestrian terminal 1 is received by ITS communicator 13 (Yes in ST501), the pedestrian information included in the message is accumulated in storage 16 as the passage history information (ST502).

Next, person detector 38 searches for the suspicious person around the host device based on the pedestrian information of each person in the passage history information of storage 16. That is, a determination as to whether or not a person not in the passage history in a predetermined period (for example, one week in the past) continuously appears for a predetermined amount of time within a pre-determined range (for example, a circle of a radius of 10 m) around the host pedestrian is performed.

In a case where the suspicious person is found around the host device (Yes in ST503), the warning flag is set in the pedestrian information of the corresponding person in the passage history information of storage 16 (ST504). Message controller 31 transmits the message including the pedestrian information of the found suspicious person (the person as the monitoring target) to roadside machine 5 from ITS communicator 13 (ST505).

At this point, as illustrated in FIG. 33B, the message transmitted to roadside machine 5 from pedestrian terminal 1 includes, as the pedestrian information, each information of the time, the terminal ID of pedestrian terminal 1 that transmits the message, the position (the latitude and the longitude) of pedestrian terminal 1, the speed, and the azimuth and the subsidiary information. The subsidiary information stores information related to the person as the monitoring target, specifically, the terminal ID (warning ID) of pedestrian terminal 1 of the person for which the warning flag is set as the suspicious person.

Figure 32A:
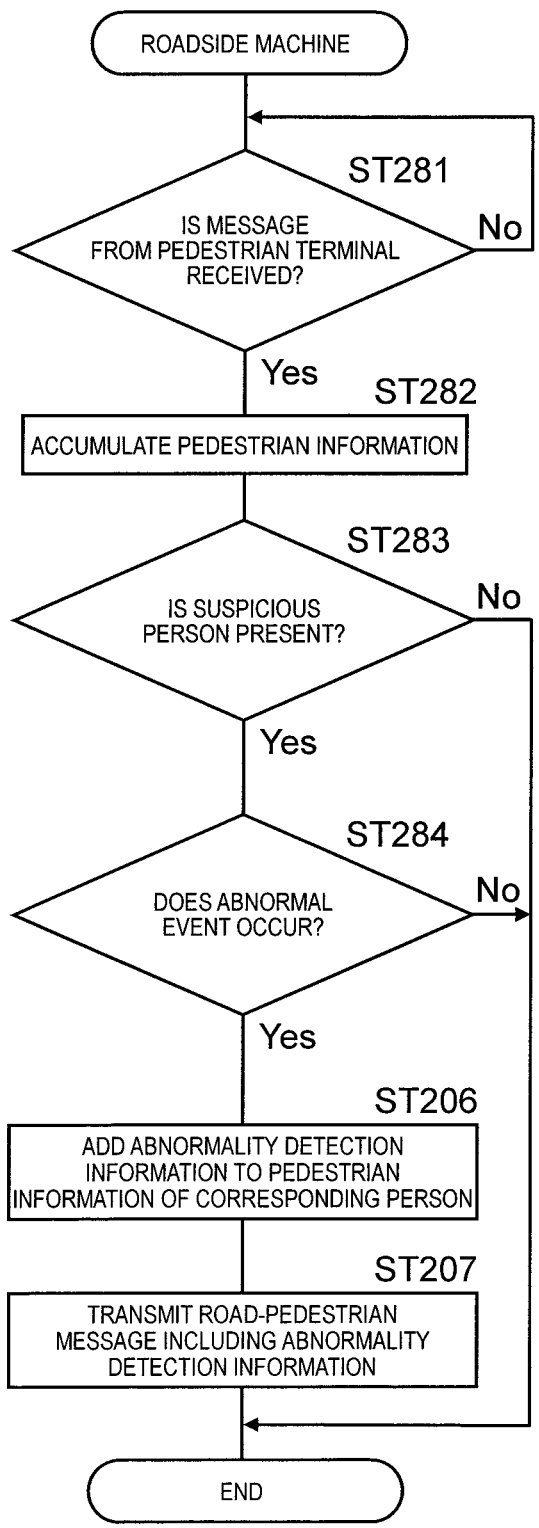
FIG. 32A is a flowchart illustrating an operation procedure of pedestrian terminal 1 and roadside machine 5 according to the fifth exemplary embodiment.

As illustrated in FIG. 32A, in roadside machine 5, in a case where the message transmitted from pedestrian terminal 1 is received by ITS communicator 41 (Yes in ST281), the pedestrian information included in the message is accumulated in storage 44 as the passage history information (ST282).

At this point, as illustrated in FIG. 33C and FIG. 33D, the pedestrian information accumulated in storage 44 as the passage history information includes each information of the time, the terminal ID (pedestrian ID) of pedestrian terminal 1, the position (the latitude and the longitude) of pedestrian terminal 1, the speed, and the azimuth and the subsidiary information.

Next, abnormality detector 52 determines whether or not the suspicious person (the person as the monitoring target), that is, a person for which the warning flag is set, is present based on the passage history information (ST283). In a case where the suspicious person is present (Yes in ST283), the suspicious person is monitored, and a determination as to whether or not the abnormal event occurs is performed (ST284). Specifically, a determination as to whether or not the suspicious person is in a state of accompanying another person as the condition of the kidnapping is performed.

In a case where it is determined that the abnormal event (kidnapping) occurs (Yes in ST284), the abnormality detection information that indicates that the abnormal event is detected is registered in the pedestrian information of the corresponding person in the passage history information (ST206). At this point, as illustrated in FIG. 33D, the terminal ID (warning ID) of pedestrian terminal 1 of the offender (the person for which the warning flag is set) is stored in the pedestrian information of the passage history information as the abnormality detection information.

Next, message controller 53 generates the message including the abnormality detection information and transmits the message to nearby pedestrian terminal 1 from ITS communicator 41 (ST207).

At this point, as illustrated in FIG. 33D, the message transmitted to pedestrian terminal 1 from roadside machine 5 includes each information of the time, the roadside machine ID of the host device, the terminal ID (warning ID) of pedestrian terminal 1 of the offender, the terminal ID of pedestrian terminal 1 of the victim, and the position (the latitude and the longitude) of pedestrian terminal 1 and the abnormality detection information (kidnapping).

Figure 32B:
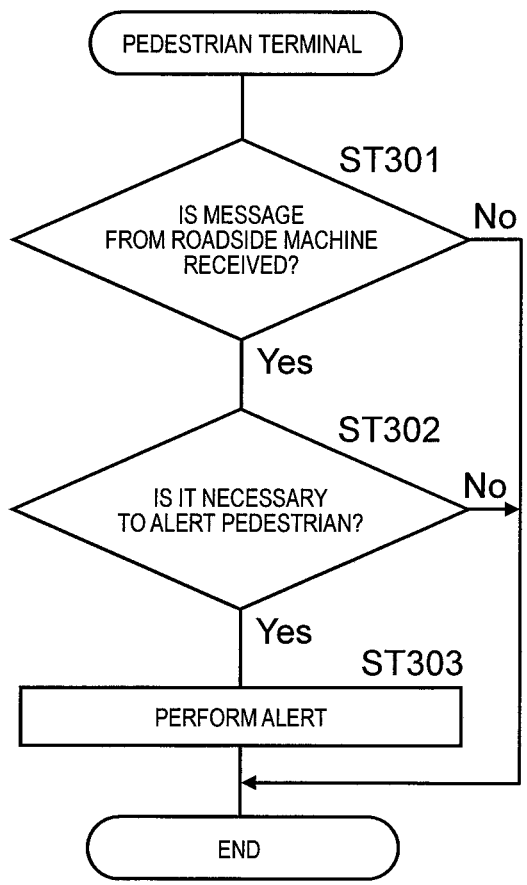
FIG. 32B is a flowchart illustrating an operation procedure of pedestrian terminal 1 and roadside machine 5 according to the fifth exemplary embodiment.

As illustrated in FIG. 32B, the operation procedure of another pedestrian terminal 1 that is present nearby is the same as the operation procedure in the first exemplary embodiment (refer to FIG. 5C). In addition, protector terminal 6 is the same as protector terminal 6 in the first exemplary embodiment.

In the present exemplary embodiment, the person detection is performed by pedestrian terminal 1, and the abnormality detection is performed by roadside machine 5. Alternatively, both of the person detection and the abnormality detection may be performed by pedestrian terminal 1. In a case where the person detection and the abnormality detection are separately performed by pedestrian terminal 1 and roadside machine 5 as in the present exemplary embodiment, a load of pedestrian terminal 1 can be reduced. In a case where all of the person detection and the abnormality detection are performed by roadside machine 5 as in the first exemplary embodiment, a special process is not necessary in pedestrian terminal 1. Thus, pedestrian terminal 1 that has a usual function can be used as it is.

Sixth Exemplary Embodiment

Figure 34:
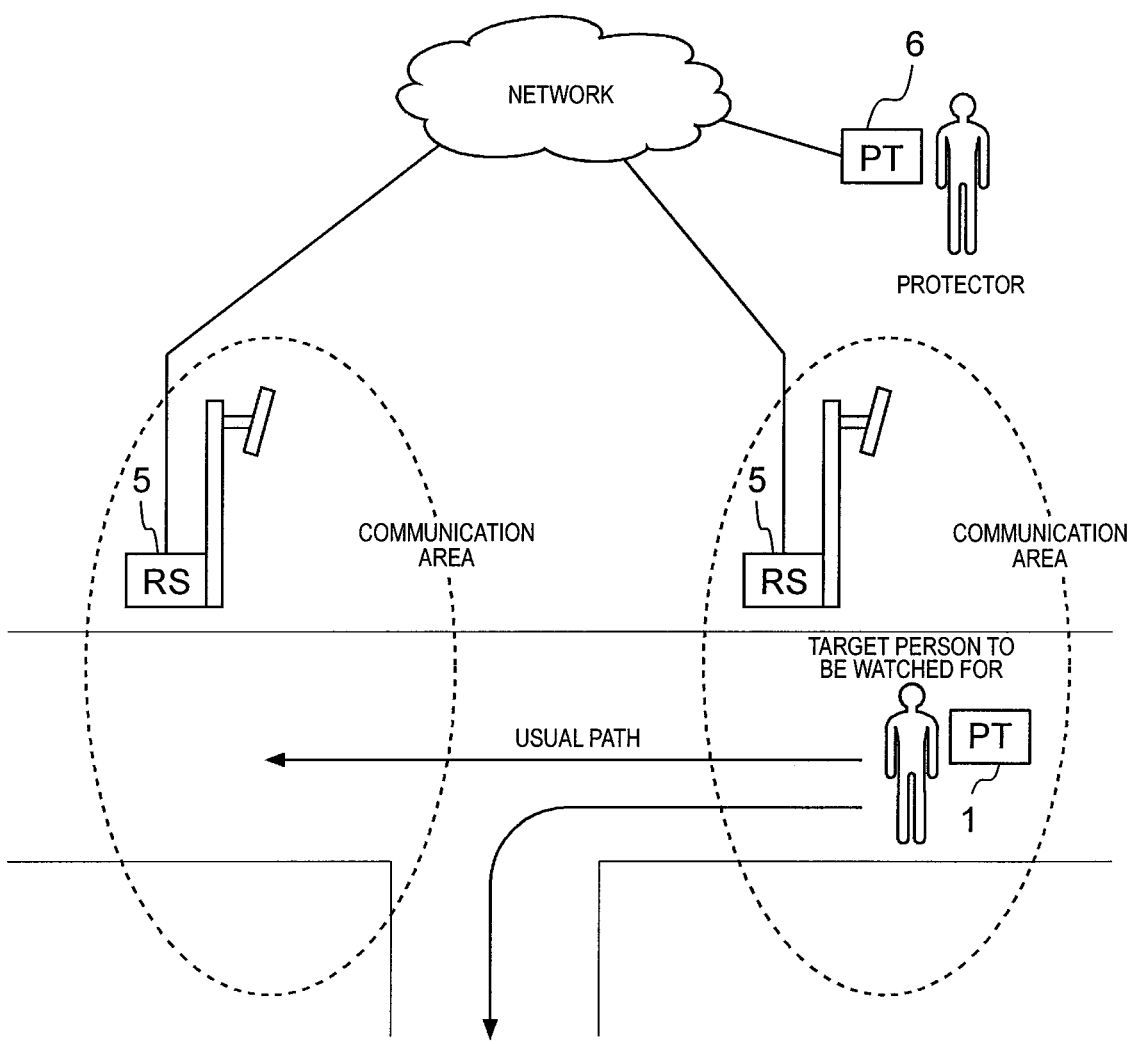
FIG. 34 is a descriptive diagram illustrating a summary of a communication system according to a sixth exemplary embodiment.

Next, a sixth exemplary embodiment will be described. Points not particularly mentioned here are the same as the above exemplary embodiment. FIG. 34 is a descriptive diagram illustrating a summary of a communication system according to the sixth exemplary embodiment.

An aged person goes out for shopping or a walk, or wanders in a case where the person has dementia. In such a case where the aged person goes out, it is mostly likely that the person always passes through a fixed location at a fixed time. In addition, a child always passes through a fixed location (a school commuting path) at a fixed time for commuting to school. Thus, in a case where the aged person or the child does not pass through the fixed location at the fixed time, it is predicted that the abnormal event occurs for the aged person or the child.

Therefore, in the present exemplary embodiment, roadside machine 5 receives the message transmitted from pedestrian terminal 1 possessed by the target person to be watched for (the aged person or the child), and the pedestrian information included in the message is accumulated as the passage history information. An expected passage time range in which the location of roadside machine 5 is to be passed through is acquired as the behavior pattern information based on the passage history information. A determination as to whether or not the target person passes through the communication area of roadside machine 5 in the expected passage time range is performed, and the occurrence of the abnormal event for the target person to be watched for is detected. A notification of a fact that the target person to be watched for does not pass through in a time range in which the target person always passes through is given to the protector along with the location information of roadside machine 5.

In a case where the target person to be watched for is approaching a location that is considered to be dangerous like a railway crossing, the notification to the protector may be performed using a different notification method from a case where the target person is present at another location. In addition, the notification to the protector may be performed using a further different notification method at a time at which a train is expected to pass through a railway crossing near the target person to be watched for.

Accordingly, the protector's watching for the child or the aged person can be assisted. That is, the protector can check safety of the aged person. In addition, the protector can recognize the abnormal event of the child such as abduction early. In addition, the protector can check a situation of wandering of the aged person. Particularly, by notifying the location information of roadside machine 5 to the protector, the protector can recognize a location through which the target person does not pass.

In the present exemplary embodiment, roadside machine 5 performs the notification to the protector. Alternatively, a management server may be disposed, and the notification may be performed to the protector from the management server by causing the management server to perform the abnormality detection based on the pedestrian information collected from roadside machine 5.

Figure 35:
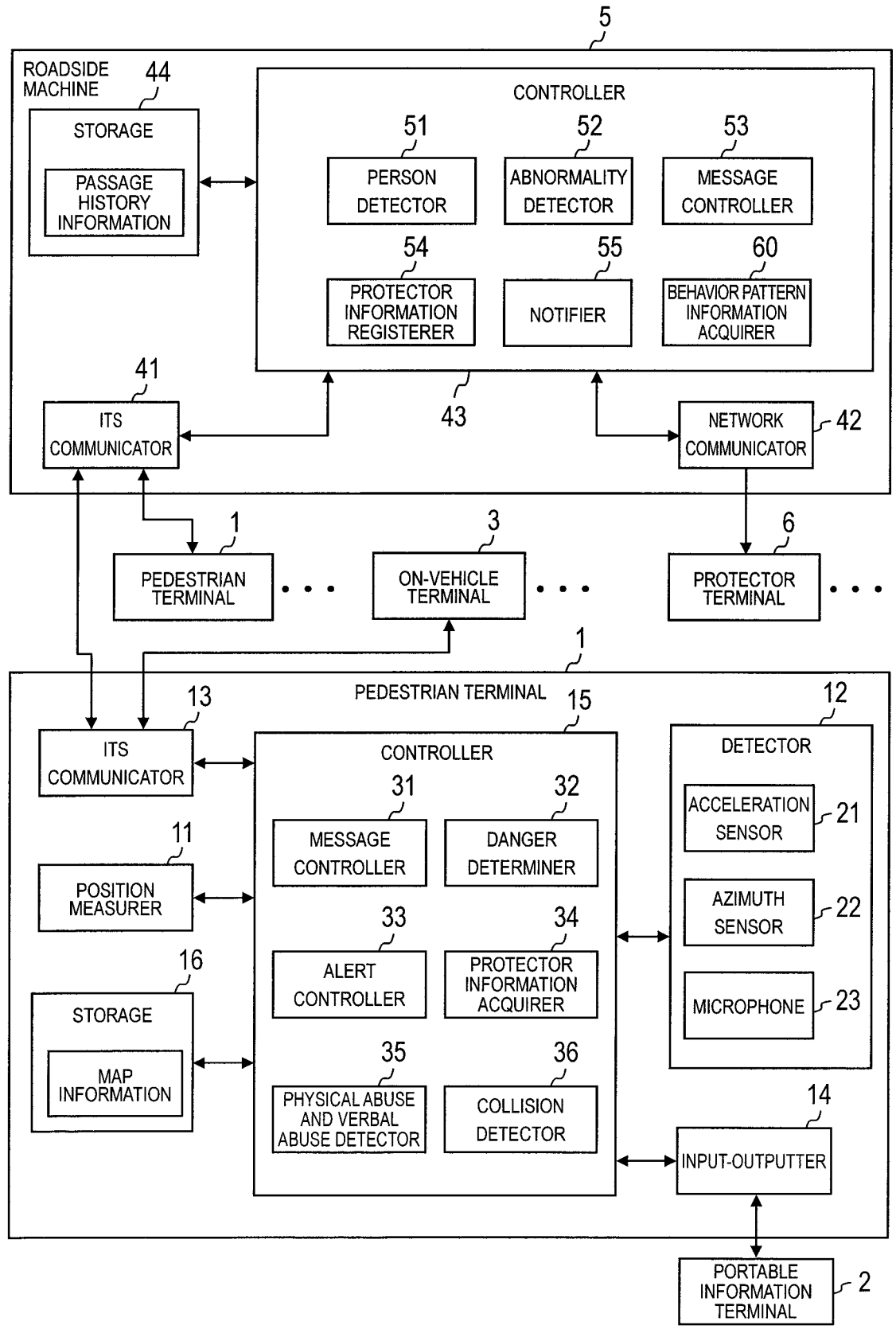
FIG. 35 is a block diagram illustrating schematic configurations of pedestrian terminal 1 and roadside machine 5 according to the sixth exemplary embodiment.

Next, schematic configurations of pedestrian terminal 1 and roadside machine 5 according to the sixth exemplary embodiment will be described. FIG. 35 is a block diagram illustrating the schematic configurations of pedestrian terminal 1 and roadside machine 5.

Pedestrian terminal 1 has the same configuration as the first exemplary embodiment (refer to FIG. 4).

While roadside machine 5 also has approximately the same configuration as the first exemplary embodiment (refer to FIG. 4), controller 43 includes behavior pattern information acquirer 60. Behavior pattern information acquirer 60 acquires the behavior pattern information of the target person based on the passage history information of storage 44. Specifically, the expected passage time range, that is, a time range in which the target always passes through, is acquired as the behavior pattern information.

In addition, person detector 51 detects the target person to be watched for based on the pedestrian information included in the message received from pedestrian terminal 1. Abnormality detector 52 determines whether or not the target person to be watched for passes through in the expected passage time range. The determination as to whether or not the target person passes through in the expected passage time range may be performed at a timing after an elapse of the expected passage time range of the target person.

In the present exemplary embodiment, the determination as to whether or not the target person passes through in the expected passage time range is performed at the timing after the elapse of the expected passage time range by setting the expected passage time range of the target person. Alternatively, an expected passage time of each target person may be set as the behavior pattern information. At a timing at which a check time that is set for each time range is reached, the determination may be performed for all target persons of which the expected passage times are included in the time range.

Next, operation procedures of pedestrian terminal 1 and roadside machine 5 according to the sixth exemplary embodiment will be described. FIG. 36A and FIG. 36B are flowcharts illustrating the operation procedures of pedestrian terminal 1 and roadside machine 5. FIG. 37 is a descriptive diagram illustrating one example of the pedestrian information included in the message.

As illustrated in FIG. 36A, position measurer 11 acquires the positional information of the host pedestrian (ST101). Message controller 31 determines whether or not to transmit the pedestrian information based on the positional information of the host pedestrian (ST102). In a case of transmitting the pedestrian information (Yes in ST102), next, the message including the pedestrian information is transmitted to roadside machine 5 from ITS communicator 13 (ST103).

At this point, as illustrated in FIG. 37, the message transmitted to roadside machine 5 from pedestrian terminal 1 includes, as the pedestrian information, each information of the time, the terminal ID of pedestrian terminal 1, the position (the latitude and the longitude) of pedestrian terminal 1, the speed, and the azimuth and the protector information that is the contact address of the protector as the subsidiary information.

As illustrated in FIG. 36B, in roadside machine 5, in a case where the message transmitted from pedestrian terminal 1 is received by ITS communicator 41 (Yes in ST201), the pedestrian information included in the message is accumulated in storage 44 as the passage history information (ST202).

Next, in roadside machine 5, person detector 51 detects the target person to be watched for based on the pedestrian information included in the message received from pedestrian terminal 1, and abnormality detector 52 determines whether or not the target person to be watched for passes through in the expected passage time range (ST291).

In a case where the target person to be watched for does not pass through in the expected passage time range (No in ST291), notifier 55 acquires the protector information related to the address of the protector from storage 44 (ST292). The abnormality detection notification including the abnormality detection information indicating that the target person to be watched for does not pass through in the expected passage time range, and the location information of roadside machine 5 is transmitted to protector terminal 6 from network communicator 42 (ST293).

Meanwhile, in a case where the target person to be watched for passes through in the expected passage time range (Yes in ST291), the operation procedure is finished without performing a particular process.

The exemplary embodiments have been described thus far as illustrations of the technology disclosed in the present application. However, the technology in the present disclosure is not limited to the exemplary embodiments and can also be applied to exemplary embodiments to which changes, replacement, addition, omission, and the like are made. In addition, new exemplary embodiments can be formed by combining each constituent described in the exemplary embodiments.

For example, in the exemplary embodiments, the kidnapping, the abandonment, the confinement, the stalking, the bullying, and the hit-and-run are detected as the abnormal event. However, such crime actions are not for limitation purposes. Actions other than crimes such as a nuisance may be detected.

In addition, application of a measure for the abandonment may be extended to a measure for missing children and the like. A missing child mostly occurs at a time of congestion at a specific location such as a leisure facility or a shopping mall. Therefore, the presence at the specific location and the occurrence of congestion may be added to the condition. Whether or not congestion occurs can be determined using a camera image or the like. Only in a case of the presence at the specific location and the occurrence of congestion, the protector may be contacted in a case where a state where the protector and the child are separated by a predetermined distance or longer continues for a predetermined amount of time or longer.

INDUSTRIAL APPLICABILITY

A roadside device, a pedestrian device, a communication system, an abnormality detection method, and an abnormality notification method according to the present invention have an effect of being able to detect occurrence of an abnormal event for a person possessing the pedestrian device, and are useful as a roadside device that is installed on a road and performs road-pedestrian communication with a pedestrian device which performs a danger determination by exchanging a message including positional information with an on-vehicle device, a pedestrian device, a communication system in which the pedestrian device and the roadside device perform the road-pedestrian communication, an abnormality detection method of detecting occurrence of an abnormal event for a person possessing the pedestrian device, an abnormality notification method of giving a notification of the occurrence of the abnormal event for the person possessing the pedestrian device from the roadside device, and the like.

REFERENCE MARKS IN THE DRAWINGS

1 PEDESTRIAN TERMINAL (PEDESTRIAN DEVICE)
2 PORTABLE INFORMATION TERMINAL
3 ON-VEHICLE TERMINAL (ON-VEHICLE DEVICE)
4 CAR NAVIGATION DEVICE
5 ROADSIDE MACHINE (ROADSIDE DEVICE)
6 PROTECTOR TERMINAL
7 MANAGEMENT SERVER (MANAGEMENT DEVICE)
11 POSITION MEASURER
12 DETECTOR
13 COMMUNICATOR
15 CONTROLLER
16 STORAGE
41 COMMUNICATOR
42 NETWORK COMMUNICATOR
43 CONTROLLER
44 STORAGE
61 NETWORK COMMUNICATOR
62 CONTROLLER
63 STORAGE
64 MONITOR (DISPLAY DEVICE)

The invention claimed is:

1. A roadside device that is installed on a road and performs road-pedestrian communication with a pedestrian device which performs a danger determination by exchanging a message including positional information with an on-vehicle device, the roadside device comprising:
   a communicator that performs the road-pedestrian communication with the pedestrian device;
   a storage in which in a case where the message transmitted from the pedestrian device is received by the communicator, pedestrian information included in the received message is accumulated as passage history information; and
   a controller that detects occurrence of an abnormal event for a person possessing the pedestrian device based on the passage history information.

2. The roadside device of claim 1,
   wherein the controller transmits the message including information indicating that the abnormal event occurs for the person possessing the pedestrian device to a nearby pedestrian device from the communicator.

3. The roadside device of claim 1, further comprising:
   a network communicator that communicates with a protector device possessed by a protector,
   wherein the controller transmits a notification that the abnormal event occurs for the person possessing the pedestrian device to the protector device from the network communicator.

4. The roadside device of claim 1,
   wherein the communicator receives the message including detection information related to at least one of an acceleration, an azimuth, an impact, and a voice detected by a detector disposed in the pedestrian device, and
   the controller detects the occurrence of the abnormal event for the person possessing the pedestrian device based on the detection information.

5. The roadside device of claim 1,
   wherein in a case where a person who does not have a passage history within a predetermined period in the past is in a state of accompanying another person, the controller determines that kidnapping occurs as the abnormal event based on the passage history information.

6. The roadside device of claim 1,
   wherein in a case where a change is made from an accompanying state of a plurality of persons having an accompanying history within a predetermined period in the past to a non-accompanying state, the controller determines that abandonment occurs as the abnormal event based on the passage history information.

7. The roadside device of claim 1,
   wherein in a case where a person who does not have a change in positional information within a predetermined period in the past is present, the controller determines that confinement occurs as the abnormal event based on the passage history information.

8. The roadside device of claim 1,
   wherein in a case where a person who does not have a passage history within a predetermined period in the past is in a state of moving like following another person, or in a case where the person is in a state of standing still and not moving on a movement path of another person, the controller determines that stalking occurs as the abnormal event based on the passage history information.

9. The roadside device of claim 1,
   wherein in a case where physical abuse and verbal abuse are performed on the person possessing the pedestrian device, the communicator receives the message including physical abuse and verbal abuse detection information from the pedestrian device, and in a case where the message including the physical abuse and verbal abuse detection information is received in an accompanying state of a plurality of persons having an accompanying history within a predetermined period in the past, the controller determines that bullying occurs as the abnormal event based on the passage history information.

10. The roadside device of claim 1, wherein in a case where an impact is detected after it is determined that there is a high danger of collision between a vehicle and a pedestrian by a danger determination in the pedestrian device, the communicator receives the message including collision detection information from the pedestrian device and receives the message transmitted from the on-vehicle device, and in a case where the vehicle running away from a collision location is detected based on positional information of the vehicle included in the message transmitted from the on-vehicle device after the message including the collision detection information is received, the controller determines that hit-and-run occurs as the abnormal event.

11. The roadside device of claim 1, wherein in a case where a person does not pass through in an expected passage time range, the controller determines that the abnormal event occurs based on the passage history information.

12. A pedestrian device that performs a danger determination by exchanging a message including positional information with an on-vehicle device, the pedestrian device comprising:

a communicator that performs road-pedestrian communication with a roadside device installed on a road and receives the message transmitted from another pedestrian device;

a storage in which pedestrian information included in the message received from the other pedestrian device by the communicator is accumulated as passage history information; and a controller that detects a person as a target of abnormality detection performed by the roadside device based on the passage history information and transmits the message including the detection result to the roadside device from the communicator.

13. A communication system comprising:

a pedestrian device that performs a danger determination by exchanging a message including positional information with an on-vehicle device; and a roadside device installed on a road, wherein the pedestrian device and the roadside device perform road-pedestrian communication, and the roadside device includes a communicator that performs the road-pedestrian communication with the pedestrian device, a storage in which in a case where the message transmitted from the pedestrian device is received by the communicator, pedestrian information included in the received message is accumulated as passage history information, and a controller that detects occurrence of an abnormal event for a person possessing the pedestrian device based on the passage history information.

14. The communication system of claim 13, further comprising:

a management device that manages the abnormal event detected by the roadside device, wherein the management device includes a communicator that communicates with the roadside device, a storage in which in a case where the passage history information transmitted from the roadside device is received by the communicator, the received passage history information is accumulated, and a controller that displays a screen of reconstruction of a situation at a time of occurrence of an abnormality in the past on a display device based on the passage history information.

15. The communication system of claim 13, further comprising:

a management device that manages the abnormal event detected by the roadside device, wherein the management device includes a communicator that communicates with the roadside device, a storage in which in a case where the passage history information transmitted from the roadside device is received by the communicator, the received passage history information is accumulated, and a controller that generates behavior pattern information related to characteristics of a behavior of an involved person until the occurrence of the abnormal event based on the passage history information, predicts the occurrence of the abnormal event based on the behavior pattern information and the most recent pedestrian information acquired from the pedestrian device, and transmits an abnormality prediction notification to the roadside device.

16. The communication system of claim 13, wherein the controller of the pedestrian device transmits service selection information related to information provision in an abnormality notification service to the communicator of the roadside device, and the controller of the roadside device generates information related to payment of an information provision fee to the person possessing the pedestrian device based on the service selection information received by the communicator.

17. The communication system of claim 13, wherein the controller of the pedestrian device transmits service selection information related to use of an abnormality notification service to the communicator of the roadside device, and the controller of the roadside device generates information related to collection of a service usage fee from a user of the abnormality notification service based on the service selection information received by the communicator.

18. The communication system of claim 13, wherein the roadside device includes a network communicator, and the controller of the roadside device acquires a frequency of occurrence of the abnormal event for each person based on the passage history information, generates information for reducing an insurance fee of an insurance subscribed by the person depending on the frequency, and transmits the information to an external unit from the network communicator.

19. An abnormality detection method for a roadside device that is installed on a road and performs road-pedestrian communication with a pedestrian device which performs a danger determination by exchanging a message including positional information with an on-vehicle device, the abnormality detection method comprising:
- receiving the message transmitted from the pedestrian device by the road-pedestrian communication;
- accumulating pedestrian information included in the received message as passage history information; and
- detecting occurrence of an abnormal event for a person possessing the pedestrian device based on the passage history information.

20. An abnormality notification method of giving a notification of occurrence of an abnormal event for a person possessing a pedestrian device to a nearby pedestrian device from a roadside device, the abnormality notification method comprising:
- by the pedestrian device,
- transmitting a message including pedestrian information to the roadside device; and
- by the roadside device,
- in a case where the message transmitted from the pedestrian device is received,
- accumulating the pedestrian information included in the message as passage history information;
- detecting the occurrence of the abnormal event for the person possessing the pedestrian device based on the passage history information; and
- transmitting the message including information indicating that the abnormal event occurs for the person possessing the pedestrian device to the nearby pedestrian device.

21. An abnormality notification method of giving a notification of occurrence of an abnormal event for a person possessing a pedestrian device to a protector device from a roadside device, the abnormality notification method comprising:
- by the pedestrian device,
- transmitting a message including pedestrian information to the roadside device; and
- by the roadside device,
- in a case where the message transmitted from the pedestrian device is received,
- accumulating the pedestrian information included in the message as passage history information;
- detecting the occurrence of the abnormal event for the person possessing the pedestrian device based on the passage history information; and
- transmitting a notification that the abnormal event occurs for the person possessing the pedestrian device to the protector device.

* * * * *